(12) United States Patent
Cui et al.

(10) Patent No.: US 11,236,201 B2
(45) Date of Patent: Feb. 1, 2022

(54) SULFUR-CONTAINING POLY(ALKENYL) ETHERS, PREPOLYMERS INCORPORATING SULFUR-CONTAINING POLY(ALKENYL) ETHERS, AND USES THEREOF

(71) Applicant: PRC-DeSoto International, Inc., Sylmar, CA (US)

(72) Inventors: Weibin Cui, Rancho Palos Verdes, CA (US); Renhe Lin, Stevenson Ranch, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 295 days.

(21) Appl. No.: 16/347,410

(22) PCT Filed: Nov. 3, 2017

(86) PCT No.: PCT/US2017/059924
§ 371 (c)(1),
(2) Date: May 3, 2019

(87) PCT Pub. No.: WO2018/085650
PCT Pub. Date: May 11, 2018

(65) Prior Publication Data
US 2019/0382532 A1    Dec. 19, 2019

Related U.S. Application Data

(60) Provisional application No. 62/417,848, filed on Nov. 4, 2016.

(51) Int. Cl.
*C08G 75/045*    (2016.01)
*C09D 181/02*    (2006.01)
*C09K 3/10*      (2006.01)

(52) U.S. Cl.
CPC ........ *C08G 75/045* (2013.01); *C09D 181/02* (2013.01); *C09K 3/1012* (2013.01); *C09K 2200/0682* (2013.01)

(58) Field of Classification Search
CPC ........ C08G 18/28; C08G 75/04; C08G 75/02; C08G 75/12; C09J 181/02
See application file for complete search history.

(56) References Cited

U.S. PATENT DOCUMENTS

| 5,912,319 | A  | 6/1999  | Zook et al.   |
|-----------|----|---------|---------------|
| 7,834,105 | B2 | 11/2010 | Sawant et al. |
| 10,287,466| B2 | 5/2019  | DeMoss et al. |
| 10,544,339| B2 | 1/2020  | DeMoss et al. |

(Continued)

FOREIGN PATENT DOCUMENTS

| JP | 2000-509758 A | 8/2000 |
| JP | 2008-530270 A | 8/2008 |

(Continued)

*Primary Examiner* — Shane Fang
(74) *Attorney, Agent, or Firm* — William R. Lambert

(57) ABSTRACT

Sulfur-containing poly(alkenyl) ethers can be incorporated into the backbone of polythioether prepolymers and can be used as curing agents in thiol-terminated polythioether prepolymer compositions. Cured sealants prepared using compositions containing sulfur-containing poly(alkenyl) ether-containing polythioether prepolymers and/or sulfur-containing poly(alkenyl) ether curing agents exhibit improved physical properties suitable for use in aerospace sealant applications.

21 Claims, 2 Drawing Sheets

(56) References Cited

U.S. PATENT DOCUMENTS

| | | |
|---|---|---|
| 2004/0247792 A1 | 12/2004 | Sawant et al. |
| 2006/0175005 A1 | 8/2006 | Sawant et al. |
| 2014/0110881 A1 | 4/2014 | Keledjian et al. |
| 2019/0256752 A1 | 8/2019 | DeMoss et al. |

FOREIGN PATENT DOCUMENTS

| | | |
|---|---|---|
| JP | 2015-533910 A | 11/2015 |
| WO | 2015/066192 A2 | 5/2015 |
| WO | 2015066192 A1 | 5/2015 |
| WO | 2016/130673 A1 | 8/2016 |
| WO | 2018005686 A1 | 1/2018 |

SULFUR-CONTAINING POLY(ALKENYL) ETHERS, PREPOLYMERS INCORPORATING SULFUR-CONTAINING POLY(ALKENYL) ETHERS, AND USES THEREOF

CROSS-REFERENCE TO RELATED APPLICATIONS

This application is a national phase entry under 35 U.S.C. § 371 of PCT International Application No. PCT/US2017/059924 filed on Nov. 3, 2017, which claims the benefit under 35 U.S.C. § 119(e) of U.S. Provisional Application No. 62/417,848 filed on Nov. 4, 2016, each of which is incorporated by reference in its entirety.

FIELD

Sulfur-containing poly(alkenyl) ethers that can be incorporated into the backbone of polythioether prepolymers and can be used as curing agents in compositions containing thiol-terminated polythioether prepolymers are disclosed. Cured sealants prepared using compositions containing sulfur-containing poly(alkenyl) ether-containing polythioether prepolymers and/or sulfur-containing poly(alkenyl) ether curing agents exhibit improved physical properties suitable for use in aerospace sealant applications.

BACKGROUND

Sulfur-containing polythioether prepolymers are known to be useful in aerospace sealant applications. Polythioether prepolymers can be prepared by reacting a polythiol with a divinyl ether to provide prepolymers that provide sealants that meet the demanding performance requirements of the aerospace industry.

Among other requirements, aerospace sealants must be resistant to aerospace fluids including aviation fuel and exhibit a low glass transition temperature and an onset of solidification at low temperature. Divinyl ethers used to prepare polythioethers have not included sulfur atoms.

It is desirable to provide polythioether prepolymers that exhibit improved properties for aerospace applications.

SUMMARY

According to the present invention, a sulfur-containing multifunctional(alkenyl) ether has the structure of Formula (10):

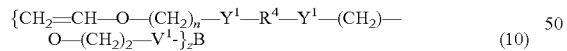  (10)

wherein,
each n is independently an integer from 1 to 4;
each $Y^1$ is independently selected from —O— and —S—; and
each $R^4$ is independently selected from $C_{2-6}$ n-alkanediyl, $C_{3-6}$ branched alkanediyl, $C_{6-8}$ cycloalkanediyl, $C_{6-10}$ alkanecycloalkanediyl, and —[(CH$_2$)$_p$—X—]$_q$—(CH$_2$)$_r$—, wherein,
each X is independently selected from —O—, —S—, and —S—S—;
each p is independently an integer from 2 to 6;
q is an integer from 1 to 5;
r is an integer from 2 to 10;
at least one $Y^1$ is —S—, or $R^4$ is —[(CH$_2$)$_p$—X—]$_q$—(CH$_2$)$_r$— and at least one X is selected from —S— and —S—S—; and B is a core of a z-valent polyfunctionalizing agent B(—V)$_z$ wherein:
z is an integer from 3 to 6; and
each V is a moiety comprising a terminal group reactive with a terminal alkenyl group; and
each —$V^1$— is derived from the reaction of V with an alkenyl group.

According to the present invention, polythioether prepolymers comprise a moiety of Formula (2):

—S—R$^1$—[S-A-S—R$^1$—]$_s$—S—  (2)

wherein,
s is an integer from 1 to 60;
each $R^1$ is independently selected from $C_{2-10}$ alkanediyl, $C_{6-8}$ cycloalkanediyl, $C_{6-10}$ alkanecycloalkanediyl, and —[(—CHR—)$_p$—X—]$_q$—(CHR)$_r$—, wherein each R is independently selected from hydrogen and methyl, wherein,
each X is independently selected from —O— and —S—;
each p is independently an integer from 2 to 6;
q is an integer from 1 to 5; and
r is an integer from 2 to 10;
each A is independently selected from a sulfur-containing moiety of Formula (3a), a moiety of Formula (4a), and a moiety derived from an alkenyl-terminated polyfunctionalizing agent, wherein from 10 mol % to 90 mol % of the A moieties comprise a sulfur-containing moiety of Formula (3a):

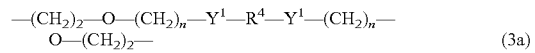

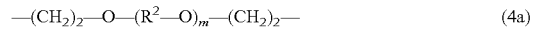

wherein,
each n is independently an integer from 1 to 4;
each $Y^1$ is independently selected from —O— and —S—;
m is an integer from 0 to 50; and
each $R^2$ is independently selected from $C_{2-6}$ n-alkanediyl, $C_{3-6}$ branched alkanediyl, $C_{6-8}$ cycloalkanediyl, $C_{6-10}$ alkanecycloalkanediyl, and —[(CH$_2$)$_p$—X—]$_q$—(CH$_2$)$_r$—, wherein,
each p is independently an integer from 2 to 6;
q is an integer from 1 to 5; and
r is an integer from 2 to 10;
$R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and —[(CH$_2$)$_p$—X—]$_q$—(CH$_2$)$_r$—, wherein,
each X is independently selected from —O—, —S—, and —S—S—;
each p is an integer from 2 to 6;
q is an integer from 1 to 5; and
r is an integer from 2 to 10; and
at least one $Y^1$ is —S—, or $R^4$ is —[(CH$_2$)$_p$—X—]$_q$—(CH$_2$)$_r$— and at least one X is selected from —S— and —S—S—,
wherein mol % is based on the total moles of A moieties in the prepolymer.

According to the present invention, polythioether prepolymers comprise reaction products of reactants comprising:
(a) a polythiol comprising a dithiol of Formula (7):

HS—R$^1$—SH  (7)

wherein, $R^1$ is selected from $C_{2-10}$ alkanediyl, $C_{6-8}$ cycloalkanediyl, $C_{6-10}$ alkanecycloalkanediyl, $C_{5-8}$ heterocycloalkanediyl, and $—[(—CHR—)_p—X—]_q—(—CHR—)_r—$, wherein:

each p is independently an integer from 2 to 6;
q is an integer from 1 to 5;
r is an integer from 2 to 10;
each R is independently selected from hydrogen and methyl; and
each X is independently selected from —O— and —S—;

(b) a sulfur-containing bis(alkenyl) ether of Formula (3):

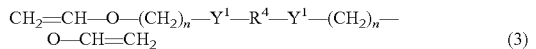

(3)

wherein,
each n is independently an integer from 1 to 4;
each $Y^1$ is independently selected from —O— and —S—; and
$R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and $—[(CH_2)_p—X—]_q—(CH_2)_r—$, wherein,
each X is independently selected from —O—, —S—, and —S—S—;
each p is independently an integer from 2 to 6;
q is an integer from 1 to 5;
r is an integer from 2 to 10; and
at least one $Y^1$ is —S—, or $R^4$ is $—[(CH_2)_p—X—]_q—(CH_2)_r—$ and at least one X is selected from —S— and —S—S—; and (c) a divinyl ether of Formula (4):

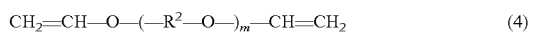

(4)

wherein,
m is an integer from 0 to 50; and
each $R^2$ is independently selected from $C_{2-6}$ n-alkanediyl, $C_{3-6}$ branched alkanediyl, $C_{6-8}$ cycloalkanediyl, $C_{6-10}$ alkanecycloalkanediyl, and $—[(CH_2)_p—X—]_q—(CH_2)_r—$, wherein,
each p is independently an integer from 2 to 6;
q is an integer from 1 to 5; and
r is an integer from 2 to 10;

wherein the reactants comprise from 10 mol % to 90 mol %, such as from 10 mol % to 90 mol %, such as from 20 mol % to 80 mol %, or from 20 mol % to 60 mol %, of the sulfur-containing bis(alkenyl) ether of Formula (3), wherein mol % is based on the total moles of the sulfur-containing bis(alkenyl) ether of Formula (3) and the divinyl ether of Formula (4).

According to the present invention, compositions comprise a sulfur-containing multifunctional(alkenyl) ether according to the present invention.

According to the present invention, a part is sealed with a composition comprising a sulfur-containing multifunctional(alkenyl) ether according to the present invention.

According to the present invention, an aerospace vehicle comprises a surface sealed with a sulfur-containing multifunctional(alkenyl) ether according to the present invention.

According to the present invention, methods of sealing a part, comprise applying the composition comprising a sulfur-containing multifunctional(alkenyl) ether according to the present invention to a part; and curing the applied composition to seal the part.

According to the present invention, compositions comprise a polythioether prepolymer according to the present invention.

According to the present invention, a part is sealed with a composition comprising a polythioether prepolymer according to the present invention.

According to the present invention, an aerospace vehicle comprises a surface sealed with a composition comprising a polythioether prepolymer according to the present invention.

According to the present invention, methods of sealing a part, comprise applying a composition comprising a polythioether prepolymer according to the present invention to a part; and curing the applied composition to seal the part.

BRIEF DESCRIPTION OF THE DRAWINGS

Those skilled in the art will understand that the drawings described herein are for illustration purposes only. The drawings are not intended to limit the scope of the present disclosure.

Figure 1:
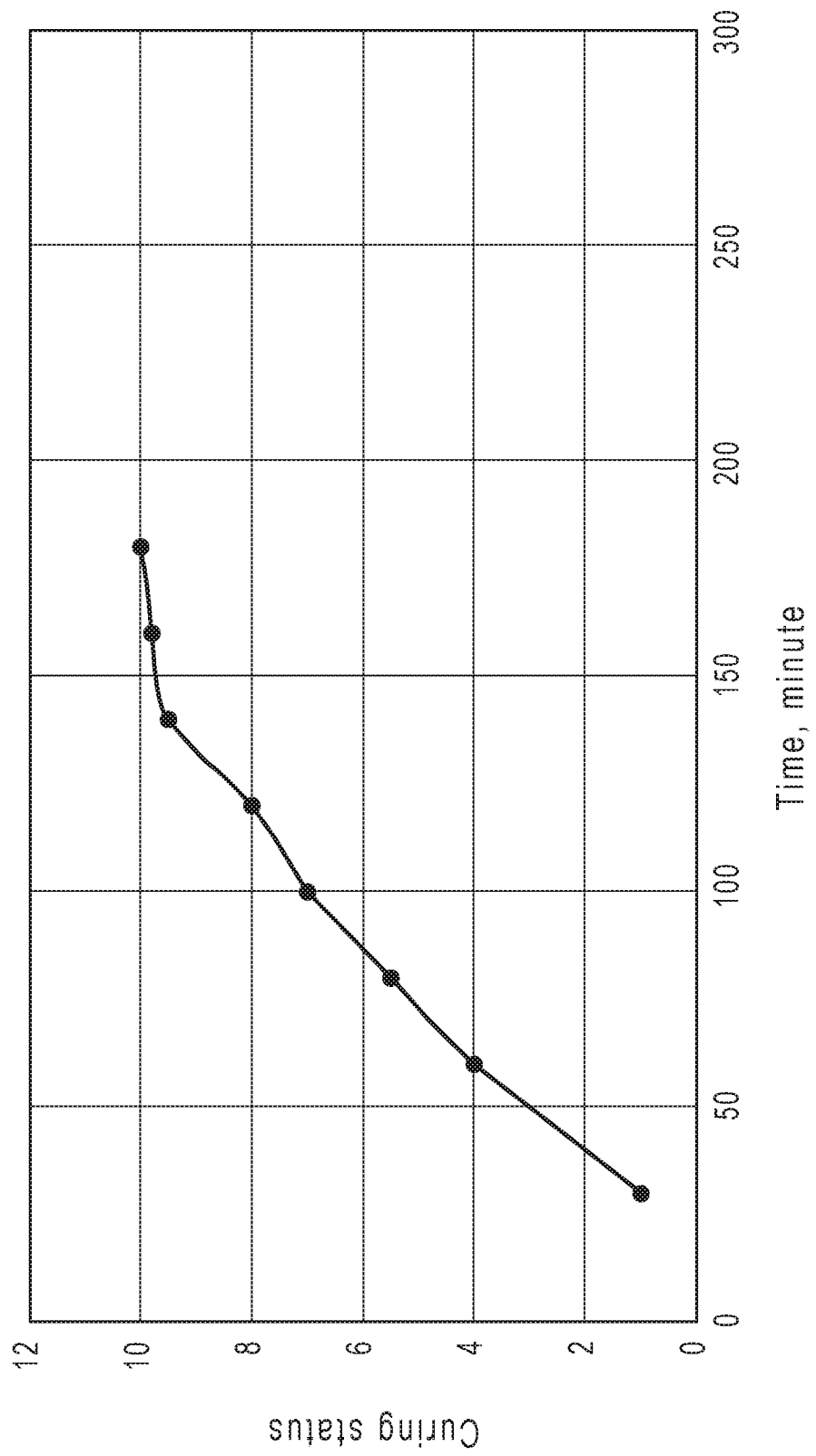
FIG. 1 is a graph showing the curing status with time of a composition comprising a sulfur-containing bis(alkenyl) ether-containing polythioether prepolymer provided by the present disclosure.

Reference is now made to certain compounds, compositions, and methods of the present invention. The disclosed compounds, compositions, and methods are not intended to be limiting of the claims. To the contrary, the claims are intended to cover all alternatives, modifications, and equivalents.

DETAILED DESCRIPTION

For purposes of the following description, it is to be understood that embodiments provided by the present disclosure may assume various alternative variations and step sequences, except where expressly specified to the contrary. Moreover, other than in the examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. Also, in this application, the use of "or"

means "and/or" unless specifically stated otherwise, even though "and/or" may be explicitly used in certain instances.

A dash ("-") that is not between two letters or symbols is used to indicate a point of bonding for a substituent or between two atoms. For example, —$CONH_2$ is bonded to another chemical moiety through the carbon atom.

"Alkanediyl" refers to a diradical of a saturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. An alkanediyl can be $C_{2-14}$ alkanediyl, $C_{2-10}$ alkanediyl, $C_{2-8}$ alkanediyl, $C_{2-6}$ alkanediyl, $C_{2-4}$ alkanediyl, or $C_{2-3}$ alkanediyl. Examples of alkanediyl groups include methane-diyl (—$CH_2$—), ethane-1,2-diyl (—$CH_2CH_2$—), propane-1,3-diyl and iso-propane-1,2-diyl (e.g., —$CH_2CH_2CH_2$— and —$CH(CH_3)CH_2$—), butane-1,4-diyl (—$CH_2CH_2CH_2CH_2$—), pentane-1,5-diyl (—$CH_2CH_2CH_2CH_2CH_2$—), hexane-1,6-diyl (—$CH_2CH_2CH_2CH_2CH_2CH_2$—), heptane-1,7-diyl, octane-1,8-diyl, nonane-1,9-diyl, decane-1,10-diyl, dodecane-1,12-diyl, and the like.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. Each cycloalkyl and/or cycloalkanediyl group(s) can be $C_{3-6}$, $C_{5-6}$, cyclohexyl or cyclohexanediyl. Each alkyl and/or alkanediyl group(s) can be $C_{1-6}$, $C_{1-4}$, $C_{1-3}$, methyl, methanediyl, ethyl, or ethane-1,2-diyl. An alkanecycloalkane group can be $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, or $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. An alkanecycloalkanediyl group can be $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, or $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkanearene" refers to a hydrocarbon group having one or more aryl and/or arenediyl groups and one or more alkyl and/or alkanediyl groups, where aryl, arenediyl, alkyl, and alkanediyl are defined here. Each aryl and/or arenediyl group(s) can be $C_{6-12}$, $C_{6-10}$, phenyl or benzenediyl. Each alkyl and/or alkanediyl group(s) can be $C_{1-6}$, $C_{1-4}$, $C_{1-3}$, methyl, methanediyl, ethyl, or ethane-1,2-diyl. An alkanearene group can be $C_{7-18}$ alkanearene, $C_{7-16}$ alkanearene, $C_{7-12}$ alkanearene, $C_{7-8}$ alkanearene, $C_{7-12}$ alkanearene, $C_{7-10}$ alkanearene, or $C_{7-9}$ alkanearene. Examples of alkanearene groups include diphenyl methane.

"Alkanearenediyl" refers to a diradical of an alkanearene group. An alkanearenediyl group can comprise $C_{7-18}$ alkanearenediyl, $C_{7-16}$ alkanearenediyl, $C_{7-12}$ alkanearenediyl, $C_{7-8}$ alkanearenediyl, $C_{7-12}$ alkanearenediyl, $C_{7-10}$ alkanearenediyl, or $C_{7-9}$ alkanearenediyl. Examples of alkanearenediyl groups include diphenyl methane-4,4'-diyl.

"Alkenyl" group refers to a group —CR=$C(R)_2$. Each R may independently be selected from, for example, hydrogen and $C_{1-3}$ alkyl. Each R can be hydrogen and an alkenyl group can have the structure —CH=$CH_2$.

"Alkoxy" refers to a —OR group where R is alkyl as defined herein. Examples of alkoxy groups include methoxy, ethoxy, n-propoxy, isopropoxy, and n-butoxy. An alkoxy group can be $C_{1-12}$ alkoxy, $C_{1-6}$ alkoxy, $C_{1-4}$ alkoxy, or $C_{1-3}$ alkoxy.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. An alkyl group can be $C_{2-6}$ alkyl, $C_{2-4}$ alkyl, or $C_{2-3}$ alkyl. Examples of alkyl groups include methyl, ethyl, n-propyl, iso-propyl, n-butyl, iso-butyl, tert-butyl, n-hexyl, n-decyl, and tetradecyl.

"Arenediyl" refers to diradical monocyclic or polycyclic aromatic group. Examples of arenediyl groups include benzene-diyl and naphthalene-diyl. An arenediyl group can be $C_{6-12}$ arenediyl, $C_{6-10}$ arenediyl, $C_6$-9 arenediyl, or benzene-diyl.

"Cycloalkanediyl" refers to a diradical saturated monocyclic or polycyclic hydrocarbon group. A cycloalkanediyl group can be $C_{3-12}$ cycloalkanediyl, $C_{3-8}$ cycloalkanediyl, $C_{3-6}$ cycloalkanediyl, or $C_{5-6}$ cycloalkanediyl. Examples of cycloalkanediyl groups include cyclohexane-1,4-diyl, cyclohexane-1,3-diyl and cyclohexane-1,2-diyl.

"Cycloalkyl" refers to a saturated monocyclic or polycyclic hydrocarbon mono-radical group. A cycloalkyl group can be $C_{3-12}$ cycloalkyl, $C_{3-8}$ cycloalkyl, $C_{3-6}$ cycloalkyl, or $C_{5-6}$ cycloalkyl.

"Heteroalkanediyl" refers to an alkanediyl group in which one or more of the carbon atoms are replaced with a heteroatom, such as N, O, S, or P. In a heteroalkanediyl, the one or more heteroatoms can be selected from N and O.

"Heterocycloalkanediyl" refers to a cycloalkanediyl group in which one or more of the carbon atoms is replaced with a heteroatom, such as N, O, S, or P. In a heterocycloalkanediyl, the one or more heteroatoms can be selected from N and O.

"Heteroarenediyl" refers to an arenediyl group in which one or more of the carbon atoms is replaced with a heteroatom, such as N, O, S, or P. In a heteroarenediyl, the one or more heteroatoms can be selected from N and O.

"Heterocycloalkanediyl" refers to a cycloalkanediyl group in which one or more of the carbon atoms is replaced with a heteroatom, such as N, O, S, or P. In a heterocycloalkanediyl, the one or more heteroatoms can be selected from N and O.

A "curable composition" refers to a composition that comprises at least two reactants capable of reacting to form a cured composition. For example, a curable composition can comprise a thiol-terminated polythioether prepolymer and a polyalkenyl capable of reacting to form a cured polymer. A curable composition may include a catalyst for the curing reaction and other components such as, for example, fillers, pigments, and adhesion promoters. A curable composition may be curable at ambient conditions such as room temperature (21° C. to 25° C.) and humidity, or may require exposure to elevated temperature, i.e. temperatures above room temperature, moisture, or other condition(s) to initiate and/or to accelerate the curing reaction. A curable composition may initially be provided as a two-part composition including a separate base component and an accelerator component. The base component can contain one of the reactants participating in the curing reaction such as a thiol-terminated polythioether prepolymer and the accelerator composition can contain the other reactant such as a polyalkenyl. The two components can be mixed before use to provide a curable composition. A curable composition can exhibit a viscosity suitable for a particular method of application. For example, a Class A sealant composition, which is suitable for brush-on applications, can be characterized by a viscosity from 1 poise to 500 poise (0.1 Pa-sec to 50 Pa-sec). A Class B sealant composition, which is suitable for fillet seal applications, can be characterized by a viscosity from 4,500 poise to 20,000 poise (450 Pa-sec to 2,000 Pa-sec). A Class C sealant composition, which is suitable for fay seal applications, can be characterized by a viscosity from 500 poise to 4,500 poise (50 Pa-sec to 450 Pa-sec). As used herein, viscosity is determined at 25° C., unless explicitly stated otherwise. After the two components of a sealant system are combined and mixed, the curing reaction can proceed and the viscosity of the curable composition can increase and at some point will no longer be workable. The period of time between when the two components are mixed to form the curable composition and when the curable composition can no longer be reasonably or practically applied to a surface for its intended purpose can be referred to as the working time. As can be appreciated, the working time can depend on a number of factors including, for example, the curing chemistry, the application method, and the temperature. The working time can also be referred to as the pot life. Once a curable composition is applied to a surface (and during application), the curing reaction can proceed to provide a cured composition. A cured composition develops a tack-free surfaces and fully cure over a period of time. A curable composition can be considered to be cured when the surface is tack-free, or can be considered cured, for example, when the hardness of the surface is 25 Shore A for a Class C sealant and 30A for a Class B sealant. Viscosity is determined according to ASTM D-2849 § 79-90 at a temperature of 25° C. and a pressure of 760 mm Hg using a Brookfield CAP 2000 viscometer with spindle #6 at 300 rpm.

"Derived from" as in "a moiety derived from a compound" refers to a moiety that is generated upon reaction of a parent compound with a reactant. For example, a bis (alkenyl) compound $CH_2=CH—R—CH=CH_2$ can react with another compound such as two compounds having thiol groups to produce the moiety $—(CH_2)_2—R—(CH_2)_2—$ derived from the reaction.

"Polyfunctionalizing agent" refers to a compound having reactive functionality of three or more, such as from 3 to 6. A polyfunctionalizing agent can have three reactive functional groups and can be referred to as a trifunctionalizing agent. Polyfunctionalizing agents can be used as precursors for synthesizing the sulfur-containing prepolymers provided by the present disclosure and/or can be used as a reactant in the polymer curing composition to increase the crosslinking density of the cured polymer network. A polyfunctionalizing agent can have reactive terminal thiol groups, reactive terminal alkenyl groups, or a combination thereof. A polyfunctionalizing agent can have a calculated molecular weight, for example, less than 1,400 Daltons, less than 1,200 Daltons, less than 1,000 Daltons, less than 800 Daltons, less than 700 Daltons, less than 600 Daltons, less than 500 Daltons, less than 400 Daltons, less than 300 Daltons, or less than 200 Daltons. For example, a polyfunctionalizing agent can have a calculated molecular weight from 100 Daltons to 2,000 Daltons, from 200 Daltons to 2,000 Daltons, from 200 Daltons to 1,800 Daltons, from 300 Daltons to 1,500 Daltons, or from 300 Daltons to 1,000 Daltons. A polyfunctionalizing agent can have the structure of Formula (1):

  (1)

where B is the core of the polyfunctionalizing agent, each V is a moiety terminated in a reactive functional group such as a thiol group, an alkenyl group, an epoxy group, an isocyanate group, or a Michael acceptor group, and z is an integer from 3 to 6, such as 3, 4, 5, or 6. In polyfunctionalizing agents of Formula (1), each —V can have the structure, for example, —R—SH or —R—CH=CH$_2$, where R can be, for example, $C_{2-10}$ alkanediyl, $C_{2-10}$ heteroalkanediyl, substituted $C_{2-10}$ alkanediyl, or substituted $C_{2-10}$ heteroalkanediyl.

When the moiety V is reacted with another compound the moiety —V$^1$— results and is said to be derived from the reaction with the other compound. For example, when V is —R—CH=CH$_2$ and is reacted, for example, with a thiol group, the moiety V$^1$ is —R—CH$_2$—CH$_2$— is derived from the reaction.

In polyfunctionalizing agents of Formula (1), B can be, for example $C_{2-8}$ alkane-triyl, $C_{2-8}$ heteroalkane-triyl, $C_{5-8}$ cycloalkane-triyl, $C_{5-8}$ heterocycloalkane-triyl, substituted $C_{5-8}$ cycloalkene-triyl, $C_{5-8}$ heterocycloalkane-triyl, $C_6$ arene-triyl, $C_{4-5}$ heteroarene-triyl, substituted $C_6$ arene-triyl, or substituted $C_{4-5}$ heteroarene-triyl.

In polyfunctionalizing agents of Formula (1), B can be, for example, $C_{2-8}$ alkane-tetrayl, $C_{2-8}$ heteroalkane-tetrayl, $C_{5-10}$ cycloalkane-tetrayl, $C_{5-10}$ heterocycloalkane-tetrayl, $C_{6-10}$ arene-tetrayl, $C_4$ heteroarene-tetrayl, substituted $C_{2-8}$ alkane-tetrayl, substituted $C_{2-8}$ heteroalkane-tetrayl, substituted $C_{5-10}$ cycloalkane-tetrayl, substituted $C_{5-10}$ heterocycloalkane-tetrayl, substituted $C_{6-10}$ arene-tetrayl, and substituted $C_{4-10}$ heteroarene-tetrayl.

Examples of suitable alkenyl-terminated polyfunctionalizing agents include triallyl cyanurate (TAC), triallylisocyanurate (TAIC), 1,3,5-triallyl-1,3,5-triazinane-2,4,6-trione, 1,3-bis(2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris (prop-2-enyl)-1,3,5-triazinane-2,4-dione, and 1,3,5-tris(2-methylallyl)-1,3,5-triazinane-2,4,6-trione, 1,2,4-trivinylcyclohexane, and combinations of any of the foregoing.

A polyfunctionalizing agent of Formula (1) can be thiol terminated.

Examples of suitable trifunctional thiol-terminated polyfunctionalizing agents include, for example, 1,2,3-propanetrithiol, 1,2,3-benzenetrithiol, 1,1,1-butanetrithiol, heptane-1,3-7-trithiol, 1,3,5-triazine-2,4-6-trithiol, isocyanurate-containing trithiols, and combinations thereof, as disclosed in U.S. Application Publication No. 2010/0010133, and the polythiols described in U.S. Pat. Nos. 4,366,307; 4,609,762; and 5,225,472. Combinations of polyfunctionalizing agents may also be used.

Examples of suitable polythiol polyfunctionalizing agents include pentaerythritol tetra(3-mercapto-propionate) (PETMP), trimethylol-propane tri(3-mercaptopropionate) (TMPMP), glycol di(3-mercaptopropionate) (GDMP), tris [2-(3-mercapto-propionyloxy)ethyl]isocyanurate (TEMPIC), di-pentaerythritol hexa(3-mercaptopropionate) (di-PETMP), tri(3-mercaptopropionate) pentaerythritol, triethylolethane tri-(3-mercaptopropionate), and combinations of any of the foregoing.

Examples of suitable mercapto-acetate polythiol polyfucntionalizing agents include pentaerythritol tetramercaptoacetate (PRTMA), trimethylolpropane trimercaptoacetate (TMPMA), glycol dimercaptoacetate (GDMA), ethyleneglycol dimercaptoacetate, di-trimethylolpropane tetramercaptoacetate, and combinations of any of the foregoing.

Examples of suitable mercapto-acrylates polythiol polyfucntionalizing agents include pentaerythritol tetraacrylate, tris[2-(3-mercaptopropionyloxy)ethyl]isocyanurate, 2,3-di(2-mercaptoethylthio)-1-propane-thiol, dimercaptodiethylsulfide (2,2'-thiodiethanethiol), dimercaptodioxaoctane (2,2'-(ethylenedioxy)diethanethiol, 1,8-dimercapto-3,6-dioxaoctane, and combinations of any of the foregoing.

Suitable polythiol polyfunctionalizing agents are commercially available, for example, from Bruno Bock Thiochemicals under the Thiocure® tradename.

"Derived from a polyfunctionalizing agent" refers to a moiety that results from the reaction of a polyfunctionalizing agent with a reactive functional group. For example, a moiety derived from the polyfunctionalizing agent triallyl cyanurate:

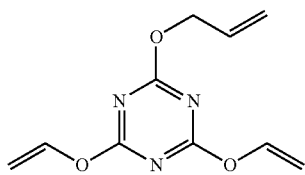 [SMILES: C=CCOc1nc(OC=C)nc(OC=C)n1]

results in a moiety having the structure:

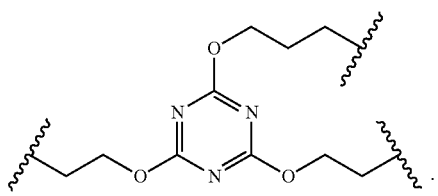 [SMILES: *CCCOc1nc(OCC*)nc(OCC*)n1]

where the segments are bonded to the other reactants.

"Prepolymer" refers to oligomers, homopolymers, and copolymers. For thiol-terminated prepolymers, molecular weights are number average molecular weights "Mn" as determined by end group analysis using iodine titration. For prepolymers that are not thiol-terminated, the number average molecular weight is determined by gel permeation chromatography using a polystyrene standard. A prepolymer such as a thiol-terminated sulfur-containing prepolymer provided by the present disclosure can be combined with a curing agent to provide a curable composition, which can cure to provide a cured polymer network. Prepolymers are liquid at room temperature (23° C.) and pressure (760 torr; 101 kPa).

"Substituted" refers to a group in which one or more hydrogen atoms are each independently replaced with the same or different substituent(s). A substituent can comprise, for example, halogen, —S(O)$_2$OH, —S(O)$_2$H, —SH, —SR where R is $C_{1-6}$ alkyl, —COOH, —NO$_2$, —NR$_2$ where each R can independently comprise hydrogen, $C_{1-3}$ alkyl, —CN, =O, $C_{1-6}$ alkyl, —CF$_3$, —OH, phenyl, $C_{2-6}$ heteroalkyl, $C_{5-6}$ heteroaryl, $C_{1-6}$ alkoxy, or —COR where R can be $C_{1-6}$ alkyl. A substituent can be —OH, —NH$_2$, or $C_{1-3}$ alkyl.

"Formed from" or "prepared from" denotes open, e.g., comprising, claim language. As such, it is intended that a composition "formed from" or "prepared from" a list of recited components comprise at least the recited components or the reaction product of at least the recited components, and can further comprise other, non-recited components used to form or prepare the composition.

"Reaction product of" means chemical reaction product(s) of at least the recited reactants, and can include partial reaction products as well as fully reacted products and other reaction products that are present in a lesser amount.

As used herein, the term "cure" or "cured" as used in connection with a composition, e.g., "composition when cured" or a "cured composition," means that any curable or crosslinkable components of the composition are at least partially reacted or crosslinked.

The term "equivalent" refers to the number of functional reactive groups of the substance. "Equivalent weight" is effectively equal to the molecular weight of a substance, divided by the valence or number of functional reactive groups of the substance.

"Derived from" as in "a moiety derived from a compound" refers to a moiety that is generated upon reaction of a parent compound with a reactant. For example, a bis (alkenyl) compound CH$_2$=CH—R—CH=CH$_2$ can react with another compound such as two compounds having thiol groups to produce the moiety —(CH$_2$)$_2$—R—(CH$_2$)$_2$— derived from the reaction.

"Derived from the reaction of —V with a thiol" refers to a moiety —V$^1$— that results from the reaction of a thiol group with a moiety comprising a terminal group reactive with a thiol group. For example, a group —V can comprise CH$_2$=CH—CH$_2$—O—, where the terminal alkenyl group CH$_2$=CH— is reactive with a thiol group —SH. Upon reaction with a thiol group, the moiety —V$^1$— is —CH$_2$—CH$_2$—CH$_2$—O—.

A "backbone" of a prepolymer refers to the segment between the reactive terminal groups. A prepolymer backbone typically includes repeating subunits. For example, the backbone of a polythiol HS—[R]$_n$—SH is —[R]$_n$—.

A "core" of a polyfunctionalizing agent B(—V)$_z$ refers to the moiety B. B can include the polyfunctionalizing agent with the terminal functional group V.

Sealants comprising polythioether prepolymers prepared using sulfur-containing poly(alkenyl) ethers can exhibit enhanced properties suitable for use in aerospace applications. Sulfur-containing poly(alkenyl) ether includes sulfur-containing bis(alkenyl)ethers and sulfur-containing multifunctional(alkenyl) ethers.

Polythioether prepolymers provided by the present disclosure comprise sulfur-containing bis(alkenyl) ethers incorporated into the polythioether prepolymer backbone.

Polythioether prepolymers provided by the present disclosure can be prepared by reacting a polythiol or combination of polythiols with a sulfur-containing poly(alkenyl) ether or combination of sulfur-containing poly(alkenyl) ethers.

Polythioether prepolymers provided by the present disclosure can be prepared by reacting a polythiol or combination of polythiols, a sulfur-containing poly(alkenyl) ether or combination of sulfur-containing poly(alkenyl) ethers, and a divinyl ether or combination of divinyl ethers.

A sulfur-containing poly(alkenyl) ether can comprise a sulfur-containing bis(alkenyl) ether, a sulfur-containing alkenyl ether having an alkenyl functionality greater than two, or a combination thereof. A sulfur-containing poly(alkenyl) ether having an alkenyl functionality greater than two is referred to as a sulfur-containing multifunctional(alkenyl) ether. As used herein, a divinyl ether and a polyvinyl ether not referred to as sulfur-containing do not contain sulfur atoms. As used herein, a sulfur-containing divinyl ether and a sulfur-containing multifunctional(alkenyl) ether contain at least one sulfur atom.

Polythioether prepolymers provided by the present disclosure can comprise a backbone of Formula (2):

$$-S-R^1-[S-A-S-R^1-]_s-S- \quad (2)$$

wherein, s is an integer from 1 to 60;

each $R^1$ is selected from $C_{2-10}$ alkanediyl, $C_{6-8}$ cycloalkanediyl, $C_{6-10}$ alkanecycloalkanediyl, and $-[(CHR)_p-X-]_q-(CH_2)_r-$, wherein each R is independently selected from hydrogen and methyl, wherein, each X is independently selected from $-O-$ and $-S-$;

each p is independently an integer from 2 to 6;

q is an integer from 1 to 5; and r is an integer from 2 to 10;

each A is selected from a sulfur-containing moiety of Formula (3a), a moiety of Formula (4a), and a moiety derived from a polyfunctionalizing agent:

$$-(CH_2)_2-O-(CH_2)_n-Y^1-R^4-Y^1-(CH_2)_n-O-(CH_2)_2- \quad (3a)$$

$$-(CH_2)_2-O-(R^2-O)_m-(CH_2)_2- \quad (4a)$$

wherein, each n is independently an integer from 1 to 4;

each $Y^1$ is independently selected from $-O-$ and $-S-$;

m is an integer from 0 to 50; and each $R^2$ is selected from $C_{2-6}$ n-alkanediyl, $C_{3-6}$ branched alkanediyl, $C_{6-8}$ cycloalkanediyl, $C_{6-10}$ alkanecycloalkanediyl, and $-[(CH_2)_p-X-]_q-(CH_2)_r-$, wherein, each p is independently an integer from 2 to 6;

q is an integer from 1 to 5; and r is an integer from 2 to 10;

$R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and $-[(CH_2)_p-X-]_q-(CH_2)_r-$, wherein, each X is independently selected from $-O-$, $-S-$, and $-S-S-$;

each p is an integer from 2 to 6;

q is an integer from 1 to 5; and r is an integer from 2 to 10;

at least one $Y^1$ is $-S-$, or $R^4$ is $-[(CH_2)_p-X-]_q-(CH_2)_r-$ and at least one X is selected from $-S-$ and $-S-S-$; and at least one A comprises a sulfur-containing moiety of Formula (3a), wherein mol % is based on the total moles of A moieties in the prepolymer.

Moieties of Formula (3a) can be derived from a sulfur-containing bis(alkenyl) ether.

Moieties of Formula (4a) can be derived from a divinyl ether.

A moiety derived from a polyfunctionalizing agent can be derived from a sulfur-containing multifunctional(alkenyl) ether, can be derived from a polyalkenyl polyfunctionalizing agent, or a combination thereof.

In moieties of Formula (2), s can be an integer, for example, from 1 to 40, from 1 to 30, from 1 to 20, or from 1 to 10.

In moieties of Formula (2), $R^1$ can be $C_{2-6}$ n-alkanediyl, such as ethane-diyl, n-propane-diyl, n-butane-diyl, n-pentane-diyl, or n-hexane-diyl.

In moieties of Formula (2), $R^1$ can be $-[(CHR)_p-X-]_q-(CH_2)_r-$.

In moieties of Formula (2), $R^1$ can be $-[(CHR)_p-X-]_q-(CH_2)_r-$, where at least one R can be $-CH_3$.

In moieties of Formula (2), $R^1$ can be $-[(CH_2)_2-X-]_q-(CH_2)_2-$.

In moieties of Formula (2), $R^1$ can be $-[(CH_2)_p-X-]_q-(CH_2)_r-$, and each X can be $-O-$.

In moieties of Formula (2), $R^1$ can be $-[(CH_2)_p-X-]_q-(CH_2)_r-$, and each X can be $-S-$, at least one X can be $-S-$, each X can be $-S-S-$, or at least one X can be $-S-S-$.

In moieties of Formula (2), $R^1$ can be $-[(CH_2)_p-X-]_q-(CH_2)_r-$, and each p can be 2, and r can be 2.

In moieties of Formula (2), $R^1$ can be $-[(CH_2)_p-X-]_q-(CH_2)_r-$, where p can be 2, 3, 4, or 5.

In moieties of Formula (2), $R^1$ can be $-[(CH_2)_p-X-]_q-(CH_2)_r-$, where q can be 1, 2, 3, 4, or 5.

In moieties of Formula (2), $R^1$ can be $-[(CH_2)_p-X-]_q-(CH_2)_r-$, where r can be, 3, 4, or 5.

In moieties of Formula (2), $R^1$ can be $-[(CH_2)_p-X-]_q-(CH_2)_r-$, where each p can be 2 and r can be 2; and q can be 1, 2, 3, 4, or 5.

In moieties of Formula (2), $R^1$ can be $-[(CH_2)_p-X-]_q-(CH_2)_r-$, where each X can be $-S-$ or at least one X can be $-S-$; each p can be 2 and r can be 2; and q can be 1, 2, 3, 4, or 5.

In moieties of Formula (2), $R^1$ can be $-[(CH_2)_p-X-]_q-(CH_2)_r-$, where each X can be $-O-$ or at least one X can be $-O-$; each p can be 2 and r can be 2; and q can be 1, 2, 3, 4, or 5.

In moieties of Formula (2), $R^1$ can be $-[(CH_2)_p-X-]_q-(CH_2)_r-$, where p is 2, r is 2, q is 1, and X is $-S-$; $R^1$ can be $-[(CH_2)_p-X-]_q-(CH_2)_r-$, where p is 2, q is 2, r is 2, and X is $-O-$; or $R^1$ can be $-[(CH_2)_p-X-]_q-(CH_2)_r-$, where p is 2, r is 2, q is 1, and X is $-O-$.

In moieties of Formula (3a), each n can be 1, 2, 3, or 4.

In moieties of Formula (3a), each $Y^1$ can be $-O-$ or each $Y^1$ can be $-S-$.

In moieties of Formula (3a), $R^4$ can be $C_{2-6}$ n-alkanediyl, such as ethane-diyl, n-propane-diyl, n-butane-diyl, n-pentane-diyl, or n-hexane-diyl.

In moieties of Formula (3a), $R^4$ can be $C_{2-6}$ n-alkanediyl; both $Y^1$ can be $-S-$ or one $Y^1$ can be $-S-$ and the other $Y^1$ can be $-O-$.

In moieties of Formula (3a), $R^4$ can be $-[(CH_2)_p-X-]_q-(CH_2)_r-$.

In moieties of Formula (3a), $R^4$ can be $-[(CH_2)_p-X-]_q-(CH_2-)_r-$, where each X can be $-O-$ or each X can be $-S-S-$ or at least one X can be $-O-$ or at least one X can be $-S-S-$.

In moieties of Formula (3a), $R^4$ can be $-[(CH_2)_p-X-]_q-(CH_2)_r-$, where each X can be $-S-$ or at least one X can be $-S-$.

In moieties of Formula (3a), $R^4$ can be $-[(CH_2)_p-X-]_q-(CH_2)_r-$, where each p can be 2 and r can be 2.

In moieties of Formula (3a), $R^4$ can be $-[(CH_2)_p-X-]_q-(CH_2)_r-$, where q can be 1, 2, 3, 4, or 5.

In moieties of Formula (3a), $R^4$ can be $-[(CH_2)_p-X-]_q-(CH_2)_r-$, where each p can be 2 and r can be 2; and q can be 1, 2, 3, 4, or 5.

In moieties of Formula (3a), $R^4$ can be $-[(CH_2)_p-X-]_q-(CH_2)_r-$, where each X can be $-S-$; each p can be 2 and r can be 2; and q can be 1, 2, 3, 4, or 5.

In moieties of Formula (3a), $R^4$ can be $-[(CH_2)_p-X-]_q-(CH_2)_r-$, where each X can be $-O-$; each p can be 2 and r can be 2; and q can be 1, 2, 3, 4, or 5.

In moieties of Formula (3a), $R^4$ can be $-[(CH_2)_p-X-]_q-(CH_2)_r-$, where each X can be $-O-$; and each $Y^1$ can be $-S-$.

In moieties of Formula (3a), $R^4$ can be $-[(CH_2)_p-X-]_q-(CH_2)_r-$, where each X can be $-S-$; and each $Y^1$ can be $-O-$.

In moieties of Formula (3a), each n can be 2, each $Y^1$ can be independently selected from $-O-$ and $-S-$, and $R^4$ can be $-[(CH_2)_p-X-]_q-(CH_2)_r-$, where each X can independently be selected from $-O-$, $-S-$, and $-S-S-$, p is 2, q is selected from 1 and 2, and r is 2.

In polythioether prepolymers of Formula (2), each A can be a moiety of Formula (3a).

In polythioether prepolymers of Formula (2), from 50 mol % to 90 mol % of the A moieties can be a sulfur-containing moiety of Formula (3a), from 60 mol % to 80 mol %, from 50 mol % to 70 mol %, or from 10 mol % to 50 mol % of the A moieties can be a sulfur-containing moiety of Formula (3a), where mol % is based n the total moles of the A moieties in the polythioether prepolymer.

In polythioether prepolymers of Formula (2), from 10 mol % to 90 mol % of the A moieties can be a sulfur-containing moiety of Formula (3a), from 10 mol % to 80 mol %, from 10 mol % to 70 mol %, from 10 mol % to 60 mol %, from 20 mol % to 90 mol %, from 20 mol % to 80 mol %, from 20 mol % to 70 mol %, from 20 mol % to 60 mol %, or from 20 mol % to 50 mol % of the A moieties can be a sulfur-containing moiety of Formula (3a), where mol % is based on the total moles of the A moieties in the polythioether prepolymer.

In polythioether prepolymers of Formula (2), from 10 mol % to 90 mol % of the A moieties can comprise a sulfur-containing moiety of Formula (3a), and from 10 mol % to 90 mol % of the A moieties can comprise a moiety of Formula (4a), where mol % is based on the total moles of the A moieties in the polythioether prepolymer.

In polythioether prepolymers of Formula (2), from 10 mol % to 80 mol %, from 10 mol % to 70 mol %, from 10 mol % to 60 mol %, from 20 mol % to 90 mol %, from 20 mol % to 80 mol %, from 20 mol % to 70 mol %, from 20 mol % to 60 mol %, or from 20 mol % to 50 mol % of the A moieties can comprise a sulfur-containing moiety of Formula (3a), and from 20 mol % to 90 mol %, from 30 mol % to 90 mol %, from 40 mol % to 90 mol %, from 10 mol % to 90 mol %, from 20 mol % to 80 mol %, from 30 mol % to 80 mol %, from 40 mol % to 80 mol %, or from 50 mol % to 80 mol % of the A moieties can comprise a moiety of Formula (4a), where mol % is based on the total moles of the A moieties in the polythioether prepolymer.

In polythioether prepolymers of Formula (2), from 0 mol % to 5 mol % of the A moieties can comprise, for example, moieties derived from a polyfunctionalizing agent, from 0.1 mol % to 5 mol %, from 0.5 mol % to 4 mol %, from 1 mol % to 3 mol % or from 0.5 mol % to 2.5 mol %, where mol % is based on the total moles of the A moieties in the polythioether prepolymer.

In sulfur-containing moieties of Formula (3a), each n can be 2, each $Y^1$ can independently be selected from $-O-$ and $-S-$, and $R^4$ can be $C_{2-4}$ alkanediyl, such as ethanediyl, n-propanediyl, or n-butanediyl.

In moieties of Formula (4a), m can be an integer, for example, from 1 to 20, from 2 to 20, from 2 to 10, from 2 to 6 or from 2 to 4. In moieties of Formula (4a), m can be, for example, 1, 2, 3, 4, 5, or 6.

In moieties of Formula (4a), each $R^2$ can independently be $C_{2-6}$ alkanediyl such as 1,2-ethane-diyl, 1,3-propane-diyl, 1,4-butane-diyl, 1,5-pentane-diyl, or 1,6-hexane-diyl. In moieties of Formula (4a), each $R^2$ can be $C_{2-6}$ n alkanediyl such as 1,2-ethane-diyl, 1,3-propane-diyl, 1,4-butane-diyl, 1,5-pentane-diyl, or 1,6-hexane-diyl.

In moieties of Formula (4a), m can be 1, 2, 3, or 4; and $R^2$ can be $C_{2-6}$ n alkanediyl such as 1,2-ethane-diyl, 1,3-propane-diyl, 1,4-butane-diyl, 1,5-pentane-diyl, or 1,6-hexane-diyl.

A sulfur-containing moiety of Formula (3a) can be derived from a sulfur-containing bis(alkenyl) ether, such as a sulfur-containing bis(alkenyl) ether of Formula (3):

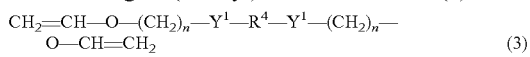
$$CH_2=CH-O-(CH_2)_n-Y^1-R^4-Y^1-(CH_2)_n-O-CH=CH_2 \quad (3)$$

where n, $Y^1$, and $R^4$ are defined as in Formula (3a).

A moiety of Formula (4a) can be derived from a divinyl ether, such as a divinyl ether of Formula (4):

$$CH_2=CH-O-(R^2-O-)_m-CH=CH_2 \quad (4)$$

where m and $R^2$ are defined as in Formula (4a).

In polythioether prepolymers comprising a backbone of Formula (2), each A can be a sulfur-containing moiety of Formula (3a).

In polythioether prepolymers comprising a backbone of Formula (2), each A can independently be a sulfur-containing moiety of Formula (3a) or a moiety of Formula (4a), where at least one A is a sulfur-containing moiety of Formula (3a).

In polythioether prepolymers comprising a backbone of Formula (2), from 20 mol % to 80 mol %, from 30 mol % to 70 mol %, or from 40 mol % to 60 mol % of the A moieties can comprise moieties of Formula (3a) and the remaining A moieties can be sulfur-containing moieties of Formula (4a) %, where mol % is based on the total moles of the A moieties in the polythioether prepolymer. For example, in a polythioether prepolymer of Formula (2), 50 mol % of the A moieties can comprise a moiety of Formula (3a) and 50 mol % of the A moieties can comprise a sulfur-containing moiety of Formula (4a).

In polythioether prepolymers comprising a backbone of Formula (2), from 10 mol % to 90 mol %, from 10 mol % to 80 mol %, from 10 mol % to 70 mol %, from 10 mol % to 60 mol %, from 20 mol % to 90 mol %, from 20 mol % to 80 mol %, from 20 mol % to 70 mol %, from 20 mol % to 60 mol %, or from 20 mol % to 50 mol % of the A moieties can comprise moieties of Formula (3a) and the remaining A moieties can be sulfur-containing moieties of Formula (4a), where mol % is based on the total moles of the A moieties in the polythioether prepolymer. For example, in a polythioether prepolymer of Formula (2), 50 mol % of the A moieties can comprise a moiety of Formula (3a) and 50 mol % of the A moieties can comprise a sulfur-containing moiety of Formula (4a).

In polythioether prepolymers comprising a backbone of Formula (2), s can be, for example, an integer from 1 to 40, from 1 to 20, from 2 to 60, from 2 to 40, from 2 to 20, from 5 to 60, from 5 to 40, from 5 to 20, from 10 to 40, or an integer from 10 to 30. Polythioether prepolymers having a backbone of Formula (2) can also comprise a combination of polythioether prepolymers having an average value of s from 1 to 40, from 1 to 20, from 2 to 60, from 2 to 40, from 2 to 20, from 5 to 60, from 5 to 40, from 5 to 20, from 10 to 40, or from 10 to 30, including non-integer values.

Polythioether prepolymers comprising a backbone having the structure of Formula (2) can be terminated, for example, in thiol, hydroxyl, isocyanate, alkenyl, epoxy, polyalkoxysilyl, amino, or Michael acceptor groups. Terminal functional groups can be selected as suitable for a particular curing chemistry.

Polythioether prepolymers comprising a backbone having the structure of Formula (2) can be difunctional, can have a functionality from 3 to 6, or can be characterized by an average non-integer functionality representing a combination of polythioether prepolymers having different functionalities.

Polythioether prepolymers comprising a backbone having the structure of Formula (2) can include a combination of polythioether prepolymers having different functionalities such as a combination of difunctional polythioether prepolymers and polythioether prepolymers having a functionality from 3 to 6. For example, a polythioether prepolymer can include a combination of difunctional polythioether prepolymers and trifunctional polythioether prepolymers. A polythioether prepolymer can have an average functionality, for example, from 2.1 to 2.8.

In polythioethers of Formula (2), each A can further be selected from a moiety derived from a polyalkenyl polyfunctionalizing agent, wherein the moiety has the structure of Formula (1a):

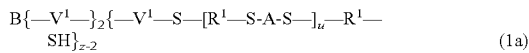

wherein,

B is a core of a z-valent polyfunctionalizing agent $B(—V)_z$, wherein:
z is an integer from 3 to 6; and
each V is a moiety comprising a terminal group reactive with terminal thiol groups; and
each $—V^1—$ is derived from the reaction of —V with a thiol group; and
each A is defined as for Formula (2).

A moiety of Formula (1a) can be derived from a polyalkenyl polyfunctionalizing agent.

Polythioether prepolymers can comprise difunctional polythioether prepolymers of Formula (2a), polyfunctional polythioether prepolymers of Formula (2b), or a combination thereof:

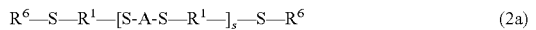

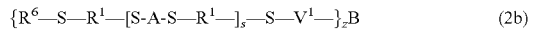

wherein,
s, $R^1$, and A are defined as in Formula (2), Formula (3a), and Formula (4a);
each $R^6$ is selected from hydrogen and a moiety comprising a terminal functional group; and
B is a core of a z-valent polyfunctionalizing agent $B(—V)_z$ wherein:
z is an integer from 3 to 6; and
each V is a moiety comprising a terminal group reactive with a thiol group; and each $—V^1—$ is derived from the reaction of —V with a thiol.

In polythioether prepolymers of Formula (2a) and Formula (2b), each $R^6$ can independently comprise a moiety having a terminal thiol, hydroxyl, isocyanate, alkenyl, epoxy, polyalkoxysilyl, amino, or Michael acceptor group. In polythioether prepolymers of Formula (2a) and Formula (2b), each $R^6$ can be hydrogen and the polythioether prepolymers of Formula (2a) and Formula (2b) comprise terminal thiol groups.

In polythioether prepolymers of Formula (2b), z can be 3, 4, 5, or 6.

In polythioether prepolymers of Formula (2b), —V can comprise a moiety having, for example, a terminal alkenyl group, a terminal epoxy group, isocyanate group, or a terminal Michael acceptor group.

In polythioether prepolymers of Formula (2a) and (2b), each $R^6$ can be hydrogen and a polythioether prepolymer can comprise a thiol-terminated polythioether prepolymer of Formula (2c), a thiol-terminated polythioether prepolymer of Formula (2d), or a combination thereof:

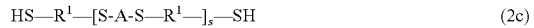

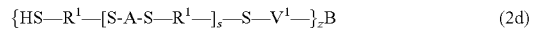

where s, $R^1$, A, B, z, and $V^1$ are defined as for Formula (2), Formula (3a), Formula (4a), and Formula (2b); and at least one A comprises a sulfur-containing moiety of Formula (3a).

Thiol-terminated polythioethers can be prepared, for example, using the methods described in U.S. Pat. No. 6,172,179, which is incorporated by reference in its entirety.

Polythiols, sulfur-containing bis(alkenyl) ethers, divinyl ethers, and polyfunctionalizing agents can be reacted in relative amounts such that the molar ratio of thiol groups to alkenyl groups is greater than 1:1, such as from 1.1:1.0 to 2.0:1.0. The reaction between the polythiols, sulfur-containing (bis)alkenyl ethers, divinyl ethers, and polyfunctionalizing agents may be catalyzed by a free radical catalyst. Suitable free radical catalysts include, for example, azo compounds, for example azobisnitriles such as azo(bis) isobutyronitrile (AIBN); organic peroxides such as benzoyl peroxide and t-butyl peroxide; and inorganic peroxides such as hydrogen peroxide. The catalyst may be, for example, a free-radical catalyst, an ionic catalyst, or ultraviolet radiation. A catalyst may or may not comprise an acidic or basic compound, and may or may not produce acidic or basic compounds upon decomposition. Examples of free-radical catalysts include azo-type catalyst, such as Vazo®-57 (Du Pont), Vazo®-64 (Du Pont), Vazo®-67 (Du Pont), V-70® (Wako Specialty Chemicals), and V-65B® (Wako Specialty Chemicals). Examples of other free-radical catalysts include alkyl peroxides, such as t-butyl peroxide. The reaction may also be effected by irradiation with ultraviolet light either with or without a cationic photoinitiating moiety.

Thiol-terminated polythioether prepolymers provided by the present disclosure may be prepared by combining at least one polythiol, at least one sulfur-containing bis(alkenyl) ether, and optionally at least one divinyl ether and/or polyfunctionalizing agent followed by addition of an appropriate catalyst, and carrying out the reaction at a temperature, for example, from 30° C. to 120° C., such as 70° C. to 90° C., for a time from 2 hours to 24 hours, such as from 2 hours to 6 hours.

Polythioether prepolymers of Formula (2a) and Formula (2b) in which each $R^6$ comprises a terminal functional group can be referred to as terminal-modified polythioether prepolymers. Terminal-modified polythioether prepolymers can be obtained by first preparing a thiol-terminated polythioether prepolymer of Formula (2c) and/or Formula (2d), and then reacting the terminal thiol groups of the thiol-terminated prepolymer with a compound comprising a moiety reactive with thiol groups and a desired terminal functional group. Examples of groups reactive with thiol groups include alkenyl, isocyanate, epoxy, and Michael acceptor groups. Examples of suitable terminal functional groups include alkenyl groups, isocyanate groups, epoxy groups, polyalkoxysilyl groups, hydroxyl groups, amino groups, and Michael acceptor groups.

For example, terminal-modified polythioether prepolymers of Formula (2a) and/or Formula (2b) in which $R^6$ comprises a terminal epoxy group can be prepared, for example, by reacting a thiol-terminated polythioether prepolymer of Formula (2c) and/or Formula (2d) with a compound having an epoxy group and a group reactive with thiol groups such as a monoepoxide of Formula (5):

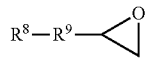 (5)

where $R^8$ comprises a group, other than an epoxy group, that is reactive with a thiol group such as an alkenyl group. $R^8$ can be derived, for example, from an alkenyl group or an olefin conjugated with an electron attracting group such as acrylate methacrylate, acrylonitrile and methacrylonitrile. $R^9$ can be selected, for example, from a $C_{2-10}$ alkanediyl group, and a $C_{2-10}$ alkyleneoxy group. For example, an epoxy-modified polythioether prepolymer of Formula (2a) and/or Formula (2b) can be prepared by reacting a thiol-terminated polythioether prepolymer of Formula (2c) and/or Formula (2d) with a monoepoxide such as a monoepoxide of Formula (5) such as allyl glycidyl ether to provide the corresponding epoxy-terminated modified polythioether prepolymer of Formula (2a) and/or Formula (2b).

For example, terminal-modified polythioether prepolymers of Formula (2a) and/or Formula (2b) in which $R^6$ comprises a hydroxyl group can be prepared by reacting a thiol-terminated polythioether prepolymer of Formula (2c) and/or Formula (2d) with a hydroxyl-functional vinyl ether. Hydroxyl vinyl ethers can be used to functionalize a thiol-terminated sulfur-containing prepolymer with a group reactive with an isocyanate group. A hydroxyl-functional vinyl ether can have the structure of Formula (6):

 (6)

where n is an integer from 1 to 10; and each R is independently selected from hydrogen and $C_{1-6}$ alkyl. In hydroxyl-functional vinyl ethers of Formula (6), n can be 1, 2, 3, 4, 5, or n can be 6. In hydroxyl-functional vinyl ethers each R can be hydrogen. In hydroxyl-functional vinyl ethers each R can be independently selected from hydrogen, methyl, ethyl, and propyl. In hydroxyl-functional vinyl ethers at least one R can be $C_{1-6}$ alkyl. Examples of suitable hydroxyl-functional vinyl ethers useful for reacting with thiol-terminated sulfur-containing prepolymers include 1,4-cyclohexane dimethylol monovinyl ether, 1-methyl-3-hydroxypropyl vinyl ether, 4-hydroxybutyl vinyl ether, and a combination of any of the foregoing. A hydroxyl-functional vinyl ether can be 4-hydroxybutyl vinyl ether.

For example, terminal-modified polythioether prepolymers of Formula (2a) and/or Formula (2b) in which $R^6$ is an isocyanate group can be prepared by reacting a hydroxyl-modified thiol-terminated polythioether prepolymer of Formula (2c) and/or Formula (2d) with a polyisocyanate. A polyisocyanate can be difunctional, n-functional where n is an integer from 3 to 6, or a combination of any of the foregoing. A polyisocyanate can be difunctional and can be referred to as a diisocyanate. A diisocyanate may be aliphatic, alicyclic, or aromatic.

Examples of suitable aliphatic diisocyanates include, 1,6-hexamethylene diisocyanate, 1,5-diisocyanato-2-methylpentane, methyl-2,6-diisocyanatohexanoate, bis(isocyanatomethyl)cyclohexane, 1,3-bis(isocyanatomethyl) cyclohexane, 2,2,4-trimethylhexane 1,6-diisocyanate, 2,4,4-trimethylhexane 1,6-diisocyanate, 2,5(6)-bis (isocyanatomethyl)bicyclo[2.2.1]heptane, 1,3,3-trimethyl-1-(isocyanatomethyl)-5-isocyanatocyclohexane, 1,8-diisocyanato-2,4-dimethyloctane, octahydro-4,7-methano-1H-indenedimethyl diisocyanate, and 1,1'-methylenebis(4-isocyanatocyclohexane), and 4,4-methylene dicyclohexyl diisocyanate ($H_{12}MDI$). Examples of suitable aromatic diisocyanates include 1,3-phenylene diisocyanate, 1,4-phenylene diisocyanate, 2,6-toluene diisocyanate (2,6-TDI), 2,4-toluene diisocyanate (2,4-TDI), a blend of 2,4-TDI and 2,6-TDI, 1,5-diisocyanatonaphthalene, diphenyl oxide 4,4'-diisocyanate, 4,4'-methylenediphenyl diisocyanate (4,4-MDI), 2,4'-methylenediphenyl diisocyanate (2,4-MDI), 2,2'-diisocyanatodiphenylmethane (2,2-MDI), diphenylmethane diisocyanate (MDI), 3,3'-dimethyl-4,4'-biphenylene isocyanate, 3,3'-dimethoxy-4,4'-biphenylene diisocyanate, 1-[(2,4-diisocyanatophenyl)methyl]-3-isocyanato-2-methyl benzene, and 2,4,6-triisopropyl-m-phenylene diisocyanate.

Examples of suitable alicyclic diisocyanates from which the diisocyanates may be selected include isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane, and 2-isocyanatomethyl-2-(3-isocyanatopropyl)-6-(2-isocyanatoethyl)-bicyclo[2.2.1]-heptane.

Examples of suitable aromatic diisocyanates in which the isocyanate groups are not bonded directly to the aromatic ring include, but are not limited to, bis(isocyanatoethyl) benzene, α,α,α',α'-tetramethylxylene diisocyanate, 1,3-bis (1-isocyanato-1-methylethyl)benzene, bis(isocyanatobutyl) benzene, bis(isocyanatomethyl)naphthalene, bis (isocyanatomethyl)diphenyl ether, bis(isocyanatoethyl) phthalate, and 2,5-di(isocyanatomethyl)furan. Aromatic diisocyanates having isocyanate groups bonded directly to the aromatic ring include phenylene diisocyanate, ethylphenylene diisocyanate, isopropylphenylene diisocyanate, dimethylphenylene diisocyanate, diethylphenylene diisocyanate, diisopropylphenylene diisocyanate, naphthalene diisocyanate, methylnaphthalene diisocyanate, biphenyl diisocyanate, 4,4'-diphenylmethane diisocyanate, bis(3-methyl-4-isocyanatophenyl)methane, bis(isocyanatophenyl) ethylene, 3,3'-dimethoxy-biphenyl-4,4'-diisocyanate, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate, dichlorocarbazole diisocyanate, 4,4'-diphenylmethane diisocyanate, p-phenylene diisocyanate, 2,4-toluene diisocyanate, and 2,6-toluene diisocyanate.

Isocyanate-terminated polythioether prepolymers may be synthesized by reacting, for example, a diisocyanate with an appropriately terminated sulfur-containing bis(alkenyl) ether-containing polythioether such as, for example, a hydroxyl-terminated polythioether, at a suitable temperature such as from 50° C. to 100° C. for a suitable time such as from 1 hour to 4 hours, in the presence of a tin catalyst, such as dibutyltin dilaurate.

For example, terminal-modified polythioether prepolymers of Formula (2a) and/or Formula (2b) in which $R^6$ comprises an alkenyl group can be prepared by reacting thiol-terminated polythioether prepolymers of Formula (2c)

and/or Formula (2d) with a divinyl ether or a sulfur-containing bis(alkenyl) ether provided by the present disclosure.

For example, terminal-modified polythioether prepolymers of Formula (2a) and/or Formula (2b) in which $R^6$ comprises a polyalkoxysilyl group can be prepared by reacting thiol-terminated polythioether prepolymers of Formula (2c) and/or Formula (2d) with an isocyanatoalkyltrialkoxysilane such as a 3-isocyanatopropyltrimethoxysilane or 3-isocyanatopropyltriethoxysilane in the presence of dibutyltin dilaurate to provide the corresponding polyalkoxysilyl-terminated modified polythioether prepolymer of Formula (2a) and/or Formula (2b).

For example, terminal-modified polythioether prepolymers of Formula (2a) and/or Formula (2b) in which $R^6$ comprises an amino group can be prepared by reacting thiol-terminated polythioether prepolymers of Formula (2c) and/or Formula (2d) with a monofunctional 4-amino butyl vinyl ether with a free-radical initiator. Alternatively, an amino-terminated polythioether may be obtained by reacting an isocyanate-terminated polythioether with a diamine such as 4-(aminomethyl)aniline to provide the corresponding amino-terminated polythioether prepolymer. Amino-terminated polythioether prepolymers may also be obtained by reacting a thiol-terminated polythioether prepolymer with an amino-substituted benzoate such as ethyl-4-aminobenzoate in the presence of $Bu_2SnO$ or NaOMe at elevated temperature to provide the corresponding amino-terminated polythioether prepolymer.

For example, terminal-modified polythioether prepolymers of Formula (2a) and/or Formula (2b) in which $R^6$ comprises a Michael acceptor group can be prepared by reacting thiol-terminated polythioether prepolymers of Formula (2c) and/or Formula (2d) with a compound having a terminal Michael acceptor group and a group reactive with thiol groups such as a divinylsulfone, in the presence of an amine catalyst. Michael acceptor/polythioether chemistries and compounds are disclosed in U.S. Pat. No. 8,871,896, which is incorporated by reference in its entirety.

Polythioether prepolymers provided by the present disclosure can comprise reaction products of reactants comprising a polythiol or a combination of polythiols and a sulfur-containing bis(alkenyl) ether or a combination of sulfur-containing bis(alkenyl) ethers. Such prepolymers can include polythioether prepolymers comprising a backbone having the structure of Formula (2) in which each A comprises a sulfur-containing moiety of Formula (3a).

For example, polythioether prepolymers provided by the present disclosure can comprise reaction products of reactants comprising:

(a) a polythiol comprising a dithiol of Formula (7):

(7)

where, each $R^1$ is selected from $C_{2-10}$ alkanediyl, $C_{6-8}$ cycloalkanediyl, $C_{6-10}$ alkanecycloalkanediyl, $C_{5-8}$ heterocycloalkanediyl, and $-[(CHR)_p-X-]_q-(CH_2)_r-$, wherein:
 each p is independently an integer from 2 to 6;
 q is an integer from 1 to 5;
 r is an integer from 2 to 10;
 each R is independently selected from hydrogen and methyl; and
 each X is independently selected from —O— and —S; and (b) a sulfur-containing bis(alkenyl) ether of Formula (3):

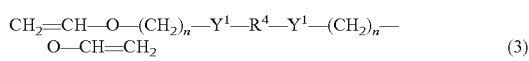

(3)

wherein,
 each n is independently an integer from 1 to 4;
 each $Y^1$ is independently selected from —O— and —S—; and
 $R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and $-[(CH_2)_p-X-]_q-(CH_2)_r-$, wherein, each X is independently selected from —O—, —S—, and —S—S—;
 each p is independently an integer from 2 to 6;
 q is an integer from 1 to 5; and
 r is an integer from 2 to 10; and
 at least one $Y^1$ is —S—, or $R^4$ is $-[(CH_2)_p-X-]_q-(CH_2)_r-$ and at least one X is selected from —S— and —S—S—.

In dithiols of Formula (7), $R^1$ can be $C_{2-6}$ n-alkanediyl, such as ethane-diyl, n-propane-diyl, n-butane-diyl, n-pentane-diyl, or n-hexane-diyl.

In dithiols of Formula (7), $R^1$ can be $-[(CHR)_p-X-]_q-(CH_2)_r-$.

In dithiols of Formula (7), $R^1$ can be $-[(CHR)_p-X-]_q-(CH_2)_r-$, where at least one R can be $-CH_3$.

In dithiols of Formula (7), $R^1$ can be $-[(CH_2)_p-X-]_q-(CH_2)_r-$.

In dithiols of Formula (7), $R^1$ can be $-[(CH_2)_p-X-]_q-(CH_2)_r-$, and each X can be —O—.

In dithiols of Formula (7), $R^1$ can be $-[(CH_2)_p-X-]_q-(CH_2)_r-$, and each X can be —S— at least one X can be —S—, each X can be —S—S—, or at least one X can be —S—S—.

In dithiols of Formula (7), $R^1$ can be $-[(CH_2)_p-X-]_q-(CH_2)_r-$, and each p can be 2 and r can be 2.

In dithiols of Formula (7), $R^1$ can be $-[(CH_2)_p-X-]_q-(CH_2)_r-$, where p can be 2, 3, 4, or 5.

In dithiols of Formula (7), $R^1$ can be $-[(CH_2)_p-X-]_q-(CH_2)_r-$, where q can be 1, 2, 3, 4, or 5.

In dithiols of Formula (7), $R^1$ can be $-[(CH_2)_p-X-]_q-(CH_2)_r-$, where r can be 2, 3, 4, or 5.

In dithiols of Formula (7), $R^1$ can be $-[(CH_2)_p-X-]_q-(CH_2)_r-$, where each p can be 2 and r can be 2; and q can be 1, 2, 3, 4, or 5.

In dithiols of Formula (7), $R^1$ can be $-[(CH_2)_p-X-]_q-(CH_2)_r-$, where each X can be —S— or at least one X can be —S—; each p can be 2 and r can be 2; and q can be 1, 2, 3, 4, or 5.

In dithiols of Formula (7), $R^1$ can be $-[(CH_2)_p-X-]_q-(CH_2)_r-$, where each X can be —O— or at least one X can be —O—; each p can be 2 and r can be 2; and q can be 1, 2, 3, 4, or 5.

In dithiols of Formula (7), $R^1$ can be $-[(CH_2)_p-X-]_q-(CH_2)_r-$, where p is 2, r is 2, q is 1, and X is —S—; $R^1$ can be $-[(CH_2)_p-X-]_q-(CH_2)_r-$, where p is 2, q is 2, r is 2, and X is —O—; or $R^1$ can be $-[(CH_2)_p-X-]_q-(CH_2)_r-$, where p is 2, r is 2, q is 1, and X is —O—.

In sulfur-containing bis(alkenyl) ethers of Formula (3), each n can be 1, 2, 3, or 4.

In sulfur-containing bis(alkenyl) ethers of Formula (3), each $Y^1$ can be —O— or each $Y^1$ can be —S—.

In sulfur-containing bis(alkenyl) ethers of Formula (3), $R^4$ can be $C_{2-6}$ n-alkanediyl, such as ethane-diyl, n-propane-diyl, n-butane-diyl, n-pentane-diyl, or n-hexane-diyl.

In sulfur-containing bis(alkenyl) ethers of Formula (3), $R^4$ can be $C_{2-6}$ n-alkanediyl; both $Y^1$ can be —S— or one $Y^1$ can be —S— and the other $Y^1$ can be —O—.

In sulfur-containing bis(alkenyl) ethers of Formula (3), $R^4$ can be $-[(CH_2)_p-X-]_q-(CH_2)_r-$.

In sulfur-containing bis(alkenyl) ethers of Formula (3), $R^4$ can be $-[(CH_2)_p-X-]_q-(CH_2)_r-$, where each X can be $-O-$, each X can be $-S-S-$, at least one X can be $-O-$, or at least one X can be $-S-S-$.

In sulfur-containing bis(alkenyl) ethers of Formula (3), $R^4$ can be $-[(CH_2)_p-X-]_q-(CH_2)_r-$, where each X can be $-S-$ or at least one X can be $-S-$.

In sulfur-containing bis(alkenyl) ethers of Formula (3), $R^4$ can be $-[(CH_2)_p-X-]_q-(CH_2)_r-$, where each p can be 2 and r can be 2.

In sulfur-containing bis(alkenyl) ethers of Formula (3), $R^4$ can be $-[(CH_2)_p-X-]_q-(CH_2)_r-$, where q can be 1, 2, 3, 4, or 5.

In sulfur-containing bis(alkenyl) ethers of Formula (3), $R^4$ can be $-[(CH_2)_p-X-]_q-(CH_2)_r-$, where each p can be 2 and r can be 2; and q can be 1, 2, 3, 4, or 5.

In sulfur-containing bis(alkenyl) ethers of Formula (3), $R^4$ can be $-[(CH_2)_p-X-]_q-(CH_2)_r-$, where each X can be $-S-$; each p can be 2 and r can be 2; and q can be 1, 2, 3, 4, or 5.

In sulfur-containing bis(alkenyl) ethers of Formula (3), $R^4$ can be $-[(CH_2)_p-X-]_q-(CH_2)_r-$, where each X can be $-O-$; each p can be 2 and r can be 2; and q can be 1, 2, 3, 4, or 5.

In sulfur-containing bis(alkenyl) ethers of Formula (3), $R^4$ can be $-[(CH_2)_p-X-]_q-(CH_2)_r-$, where each X can be $-O-$; and each $Y^1$ can be $-S-$.

In sulfur-containing bis(alkenyl) ethers of Formula (3), $R^4$ can be $-[(CH_2)_p-X-]_q-(CH_2)_r-$, where each X can be $-S-$; and each $Y^1$ can be $-O-$.

In sulfur-containing bis(alkenyl) ethers of Formula (3), each n can be 2, each $Y^1$ can be independently selected from $-O-$ and $-S-$, and $R^4$ can be $-[(CH_2)_p-X-]_q-(CH_2)_r-$, where each X is independently selected from $-O-$, $-S-$, and $-S-S-$, p is 2, q is selected from 1 and 2, and r is 2.

In sulfur-containing bis(alkenyl) ethers of Formula (3), each n can be 2, each $Y^1$ can be independently selected from $-O-$ and $-S-$, and $R^4$ can be $C_{2-4}$ alkanediyl, such as ethanediyl, n-propanediyl, or n-butanediyl.

A polythiol can comprise a dithiol, a polythiol having a thiol functionality from 3 to 6, or a combination of a dithiol and a polythiol having a thiol functionality from 3 to 6.

For example, in addition to a polythiol of Formula (7) and a sulfur-containing bis(alkenyl) ether of Formula (3), reactants used to prepare a polythioether prepolymer provided by the present disclosure can further include a polyfunctionalizing agent of Formula (1):

$$B(-V)_z \qquad (1)$$

wherein,

B comprises a core of a z-valent polyfunctionalizing agent $B(-V)_z$;

z is an integer from 3 to 6; and each $-V$ is independently a moiety comprising a terminal group reactive with a thiol group.

In polyfunctionalizing agents having the structure of Formula (1), z can be 3, 4, 5, or 6.

In polythioether prepolymers of Formula (2b), $V^1$ can comprise a moiety derived from a moiety having, for example, a terminal alkenyl group, a terminal epoxy group, isocyanate, or a terminal Michael acceptor group.

In polyfunctionalizing agents having the structure of Formula (1), each V can comprise a terminal alkenyl group. Polyfunctionalizing agents suitable for preparing polyfunctional thiol-terminated polythioether prepolymers can include trifunctionalizing agents, that is, compounds where z is 3. Suitable trifunctionalizing agents include, for example, triallyl cyanurate (TAC) and trimethylolpropane trivinyl ether. Combinations of polyfunctionalizing agents may also be used.

Polythioether prepolymers provided by the present disclosure can comprise sulfur-containing bis(alkenyl) ethers incorporated into the prepolymer backbone.

Polythioether prepolymers provided by the present disclosure can comprise reaction products of reactants comprising a polythiol or a combination of polythiols, and a sulfur-containing bis(alkenyl) ether or a combination of sulfur-containing bis(alkenyl) ethers.

Polythioether prepolymers provided by the present disclosure can comprise reaction products of reactants comprising a polythiol or a combination of polythiols, a sulfur-containing bis(alkenyl) ether or a combination of sulfur-containing bis(alkenyl) ethers, a divinyl ether or combination of divinyl ethers, and a polyfunctionalizing agent or combination of polyfunctionalizing agents.

Polythioether prepolymers provided by the present disclosure can comprise reaction products of reactants comprising:

(a) a polythiol comprising a dithiol of Formula (7):

$$HS-R^1-SH \qquad (7)$$

wherein $R^1$ is selected from $C_{2-10}$ alkanediyl, $C_{6-8}$ cycloalkanediyl, $C_{6-10}$ alkanecycloalkanediyl, $C_{5-8}$ heterocycloalkanediyl, and $-[(CHR)_p-X-]_q-(CH_2)_r-$, wherein:

each p is independently an integer from 2 to 6;

q is an integer from 1 to 5;

r is an integer from 2 to 10;

each R is independently selected from hydrogen and methyl; and each X is independently selected from $-O-$ and $-S-$;

(b) a sulfur-containing bis(alkenyl) ether of Formula (3):

$$CH_2=CH-O-(CH_2)_n-Y^1-R^4-Y^1-(CH_2)_n-O-CH=CH_2 \qquad (3)$$

wherein, each n is independently an integer from 1 to 4;

each $Y^1$ is independently selected from $-O-$ and $-S-$; and $R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and $-[(CH_2)_p-X-]_q-(CH_2)_r-$, wherein, each X is independently selected from $-O-$, $-S-$, and $-S-S-$;

each p is independently an integer from 2 to 6;

q is an integer from 1 to 5; and r is an integer from 2 to 10; and at least one $Y^1$ is $-S-$, or $R^4$ is $-[(CH_2)_p-X-]_q-(CH_2)_r-$ at least one X is selected from $-S-$ and $-S-S-$; and (c) a divinyl ether of Formula (4):

$$CH_2=CH-O-(-R^2-O-)_m-CH=CH_2 \qquad (4)$$

wherein, m is an integer from 0 to 50; and each $R^2$ is independently selected from $C_{2-6}$ n-alkanediyl, $C_{3-6}$ branched alkanediyl, $C_{6-8}$ cycloalkanediyl, $C_{6-10}$ alkanecycloalkanediyl, and $-[(CH_2)_p-X-]_q-(CH_2)_r-$, wherein, each p is independently an integer from 2 to 6;

q is an integer from 1 to 5; and r is an integer from 2 to 10.

The reactants can comprise from 10 mol % to 90 mol %, such as from 20 mol % to 80 mol %, or from 20 mol % to 60 mol %, of the sulfur-containing bis(alkenyl) ether of Formula (3), wherein mol % is based on the total moles of the sulfur-containing bis(alkenyl) ether of Formula (3) and the divinyl ether of Formula (4).

A dithiol, a sulfur-containing bis(alkenyl) ether, and a divinyl ether can include any of those disclosed herein.

The reactants can further comprise a polyfunctionalizing agent of Formula (1):

wherein,

B is a core of a z-valent polyfunctionalizing agent $B(-V)_z$, z is an integer from 3 to 6; and each —V is a moiety comprising terminal group reactive with a thiol group.

In polyfunctionalizing agents of Formula (1), each V can be terminated in an alkenyl group. Polyfunctionalizing agents of Formula (1) can comprise alkenyl-terminated polyfunctionalizing agents. Examples of suitable polyalkenyl functionalizing agents of Formula (1) include triallyl cyanurate and triallyl isocyanurate. A polyalkenyl functionalizing agent can include a sulfur-containing multifunctional (alkenyl) ether provided by the present disclosure.

The reactants can include an approximately stoichiometric equivalence of thiol groups to alkenyl groups. The thiol groups can include those derived from the polythiols including a dithiol and a thiol-terminated polyfunctionalizing agent. The reactants can comprise an excess of thiol groups to provide a thiol-terminated polythioether prepolymer.

The alkenyl component of the reactants include the sulfur-containing bis(alkenyl) ether, the divinyl ether, and an alkenyl-terminated polyfunctionalizing agent. The alkenyl component can include from 20 mol % to 80 mol % of the sulfur-containing bis(alkenyl) ether with the remainder being the divinyl ether and the alkenyl-terminated polyfunctionalizing agent. For example, the alkenyl component can comprise 40 mol % of the sulfur-containing bis(alkenyl) ether and 60 mol % of the divinyl ether. The alkenyl component can comprise from 30 mol % to 70 mol %, from 40 mol % to 60 mol %, or from 45 mol % to 55 mol % of the sulfur-containing bis(alkenyl) ether with the remainder being the divinyl ether, where mol % is based on the total mol % of the alkenyl component.

The alkenyl component can include from 10 mol % to 90 mol %, from 10 mol % to 80 mol %, from 10 mol % to 70 mol %, from 10 mol % to 60 mol %, from 20 mol % to 90 mol %, from 20 mol % to 80 mol %, from 20 mol % to 70 mol %, from 20 mol % to 60 mol %, or from 20 mol % to 50 mol % of the sulfur-containing bis(alkenyl) ether with the remainder being the divinyl ether and/or the alkenyl-terminated polyfunctionalizing agent, where mol % is based on the total mol % of the alkenyl component. The sulfur-containing bis(alkenyl) ether can comprise a difunctional sulfur-containing bis(alkenyl) ether, a polyfunctional sulfur-containing multifunctional(alkenyl) ether or a combination thereof. For example, the sulfur-containing multifunctional (alkenyl) ether can have an alkenyl functionality of 3, 4, 5, or 6.

The reactants can be reacted in the presence of a suitable catalyst at elevated temperature to provide a sulfur-containing bis(alkenyl) ether-containing polythioether prepolymer. Examples of suitable catalysts include amine catalysts. Examples of suitable tertiary-amine catalysts include NN-dimethylethanolamine (DMEA), triethylene diamine (TEDA), bis(2-dimethylaminoethyl)ether (BDMEE), N-ethylmorpholine, N',N'-dimethylpiperazine, N,N,N,N,N',N'-pentamethyl-diethylene-triamine (PMDETA), NN-dimethylcyclohexylamine (DMCHA), NN-dimethylbenzylamine (DMBA), NN-dimethylcethylamine, N,N,N',N",N"-pentamethyl-dipropylene-triamine (PMDPTA), tritethylamine, 1-(2-hydroxypropl)imidazole, 1,8-diazabicyclo[5.4.0]undec-7-ene (DBU), and 1,4-diazabicyclo[2.2.2]octane (DABCO®) such as DABCO® 33-LV (Air Products and Chemicals).

In dithiols of Formula (7), $R^1$ can be $C_{2-6}$ n-alkanediyl, such as ethane-diyl, n-propane-diyl, n-butane-diyl, n-pentane-diyl, or n-hexane-diyl.

In dithiols of Formula (7), $R^1$ can be $-[(CHR)_p-X-]_q-(CH_2)_r-$.

In dithiols of Formula (7), $R^1$ can be $-[(CHR)_p-X-]_q-(CH_2)_r-$, where at least one R can be $-CH_3$.

In dithiols of Formula (7), $R^1$ can be $-[(CH_2)_p-X-]_q-(CH_2)_r-$.

In dithiols of Formula (7), $R^1$ can be $-[(CH_2)_p-X-]_q-(CH_2)_r-$, and each X can be $-O-$.

In dithiols of Formula (7), $R^1$ can be $-[(CH_2)_p-X-]_q-(CH_2)_r-$, and each X can be $-S-$ at least one X can be $-S-$, each X can be $-S-S-$, or at least one X can be $-S-S-$.

In dithiols of Formula (7), $R^1$ can be $-[(CH_2)_p-X-]_q-(CH_2)_r-$, each p can be 2, and r can be 2.

In dithiols of Formula (7), $R^1$ can be $-[(CH_2)_p-X-]_q-(CH_2)_r-$, where p can be 2, 3, 4, or 5.

In dithiols of Formula (7), $R^1$ can be $-[(CH_2)_p-X-]_q-(CH_2)_r-$, where q can be 1, 2, 3, 4, or 5.

In dithiols of Formula (7), $R^1$ can be $-[(CH_2)_p-X-]_q-(CH_2)_r-$, where r can be 1, 2, 3, 4, or 5.

In dithiols of Formula (7), $R^1$ can be $-[(CH_2)_p-X-]_q-(CH_2)_r-$, where each p can be 2, r can be 2, and q can be 1, 2, 3, 4, or 5.

In dithiols of Formula (7), $R^1$ can be $-[(CH_2)_p-X-]_q-(CH_2)_r-$, where each X can be $-S-$ or at least one X can be $-S-$; each p can be 2, r can be 2, and q can be 1, 2, 3, 4, or 5.

In dithiols of Formula (7), $R^1$ can be $-[(CH_2)_p-X-]_q-(CH_2)_r-$, where each X can be $-O-$ or at least one X can be $-O-$, each p can be 2, r can be 2; and q can be 1, 2, 3, 4, or 5.

Examples of suitable dithiols include dimercaptodiethylsulfide (DMDS) (in Formula (7), $R^1$ is $-[(CH_2)_p-X-]_q-(CH_2)_r-$, where p is 2, r is 2, q is 1, and X is $-S-$); dimercaptodioxaoctane (DMDO) (in Formula (7), $R^1$ is $-[(CH_2)_p-X-]_q-(CH_2)_r-$, wherein p is 2, q is 2, r is 2, and X is $-O-$); and 1,5-dimercapto-3-oxapentane (in Formula (7), $R^1$ is $-[(CH_2)_p-X-]_q-(CH_2)_r-$, wherein p is 2, r is 2, q is 1, and X is $-O-$).

Other examples of suitable dithiols of Formula (7) include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing. A dithiol may have one or more pendent groups selected from $C_{1-6}$ alkyl, $C_{1-6}$ alkoxy, and a hydroxyl group. Suitable alkyl pendent groups include, for example, $C_{1-6}$ n-alkyl, $C_{3-6}$ branched alkyl, cyclopentyl, and cyclohexyl.

Examples of dithiols having pendent methyl groups include, methyl-substituted DMDS, such as HS—CH$_2$CH(—CH$_3$)—S—CH$_2$CH$_2$—SH, HS—CH(—CH$_3$)CH$_2$—S—CH$_2$CH$_2$—SH and dimethyl substituted DMDS, such as HS—CH$_2$CH(—CH$_3$)—S—CH(—CH$_3$)CH$_2$—SH and HS—CH(—CH$_3$)CH$_2$—S—CH$_2$CH(—CH$_3$)—SH.

A sulfur-containing bis(alkenyl) ether can have the structure of Formula (3):

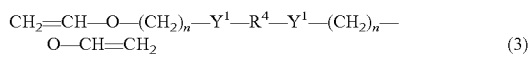
(3)

wherein,
each n is independently an integer from 1 to 4;
each $Y^1$ is independently selected from —O— and —S—; and
$R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and —[(CH$_2$)$_p$—X—]$_q$—(CH$_2$)$_r$—, wherein,
each X is independently selected from —O—, —S—, and —S—S—;
p is an integer from 2 to 6;
q is an integer from 1 to 5; and
r is an integer from 2 to 10; and
at least one $Y^1$ is —S—, or $R^4$ is —[(CH$_2$)$_p$—X—]$_q$—(CH$_2$)$_r$— and at least one X is selected from —S— and —S—S—.

In sulfur-containing bis(alkenyl) ethers of Formula (3), each n can be 1, 2, 3, or 4.

In sulfur-containing bis(alkenyl) ethers of Formula (3), each $Y^1$ can be —O— or each $Y^1$ can be —S—.

In sulfur-containing bis(alkenyl) ethers of Formula (3), $R^4$ can be $C_{2-6}$ n-alkanediyl, such as ethane-diyl, n-propane-diyl, n-butane-diyl, n-pentane-diyl, or n-hexane-diyl.

In sulfur-containing bis(alkenyl) ethers of Formula (3), $R^4$ can be $C_{2-6}$ n-alkanediyl; both $Y^1$ can be —S— or one $Y^1$ can be —S— and the other $Y^1$ can be —O—.

In sulfur-containing bis(alkenyl) ethers of Formula (3), $R^4$ can be —[(CH$_2$)$_p$—X—]$_q$—(CH$_2$)$_r$—.

In sulfur-containing bis(alkenyl) ethers of Formula (3), $R^4$ can be —[(CH$_2$)$_p$—X—]$_q$—(CH$_2$)$_r$—, where each X can be —O— or each X can be —S—S— or at least one X can be —O— or at least one X can be —S—S—.

In sulfur-containing bis(alkenyl) ethers of Formula (3), $R^4$ can be —[(CH$_2$)$_p$—X—]$_q$—(CH$_2$)$_r$—, where each X can be —S— or at least one X can be —S—.

In sulfur-containing bis(alkenyl) ethers of Formula (3), $R^4$ can be —[(CH$_2$)$_p$—X—]$_q$—(CH$_2$)$_r$—, where each p can be 2 and r can be 2.

In sulfur-containing bis(alkenyl) ethers of Formula (3), $R^4$ can be —[(CH$_2$)$_p$—X—]$_q$—(CH$_2$)$_r$—, where q can be 1, 2, 3, 4, or 5.

In sulfur-containing bis(alkenyl) ethers of Formula (3), $R^4$ can be —[(CH$_2$)$_p$—X—]$_q$—(CH$_2$)$_r$—, where each p can be 2, r can be 2, and q can be 1, 2, 3, 4, or 5.

In sulfur-containing bis(alkenyl) ethers of Formula (3), $R^4$ can be —[(CH$_2$)$_p$—X—]$_q$—(CH$_2$)$_r$—, where each X can be —S—; each p can be 2, r can be 2, and q can be 1, 2, 3, 4, or 5.

In sulfur-containing bis(alkenyl) ethers of Formula (3), $R^4$ can be —[(CH$_2$)$_p$—X—]$_q$—(CH$_2$)$_r$—, where each X can be —O—; each p can be 2, r can be 2, and q can be 1, 2, 3, 4, or 5.

In sulfur-containing bis(alkenyl) ethers of Formula (3), $R^4$ can be —[(CH$_2$)$_p$—X—]$_q$—(CH$_2$)$_r$—, where each X can be —O—; and each $Y^1$ can be —S—.

In sulfur-containing bis(alkenyl) ethers of Formula (3), $R^4$ can be —[(CH$_2$)$_p$—X—]$_q$—(CH$_2$)$_r$—, where each X can be —S—; and each $Y^1$ can be —O—.

In sulfur-containing bis(alkenyl) ethers of Formula (3), each n can be 2, each $Y^1$ can be independently selected from —O— and —S—, and $R^4$ can be —[(CH$_2$)$_p$—X—]$_q$—(CH$_2$)$_r$—, where each X is independently selected from —O—, —S—, and —S—S—, p can be 2, q can be selected from 1 and 2, and r can be 2.

In sulfur-containing bis(alkenyl) ethers of Formula (3), each n can be 2, each $Y^1$ can independently be selected from —O— and —S—, and $R^4$ can be $C_{2-4}$ alkanediyl, such as ethanediyl, n-propanediyl, or n-butanediyl.

Sulfur-containing bis(alkenyl) ethers can comprise sulfur-containing bis(alkenyl) ethers of Formula (3b), Formula (3d), Formula (3d), Formula (3e), Formula (3f), Formula (3g), Formula (3h), Formula (3i), or a combination of any of the foregoing:

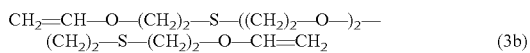
(3b)

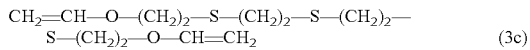
(3c)

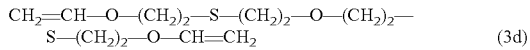
(3d)

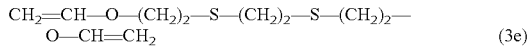
(3e)

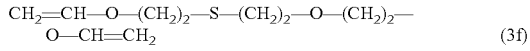
(3f)

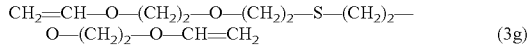
(3g)

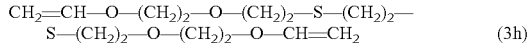
(3h)

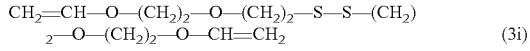
(3i)

Examples of suitable sulfur-containing bis(alkenyl) ethers include 3,9,12,18-tetraoxa-6,15-dithiaicosa-1,19-diene, 3,6,15,18-tetraoxa-9,12-dithiaicosa-1,19-diene, 3,15-dioxa-6,9,12-trithiaheptadeca-1,16-diene, 3,9,15-trioxa-6,12-dithiaheptadeca-1,16-diene, 3,6,12,15-tetraoxa-9-thiaheptadeca-1,16-diene, 3,12-dioxa-6,9-dithiatetradeca-1,13-diene, 3,6,12-trioxa-9-thiatetradeca-1,13-diene, 3,6,13,16-tetraoxa-9,10-dithiaoctadeca-1,17-diene, and combinations of any of the foregoing.

A sulfur-containing bis(alkenyl) ether provided by the present disclosure can be liquid at room temperature. A sulfur-containing bis(alkenyl) ether can have a number average molecular weight from 200 Daltons to 2,000 Daltons, from 200 Daltons to 1,500 Daltons, from 200 Daltons to 1,000 Daltons, from 200 Daltons to 800 Daltons, or from 300 Daltons to 500 Daltons, where the molecular weight is determined using gel permeation chromatography using a polystyrene standard.

Sulfur-containing bis(alkenyl) ethers can be prepared by reacting a dithiol, a diol, or a compound comprising both terminal thiol and hydroxyl groups with a chlorovinyl ether.

A sulfur-containing bis(alkenyl) ether can comprise reaction products of reactants comprising:
(a) a compound of Formula (8):

(8)

wherein,
    each Y is independently selected from —OH and —SH;
    $R^4$ is selected $C_{2-6}$ n-alkanediyl, $C_{3-6}$ branched alkanediyl, $C_{6-8}$ cycloalkanediyl, $C_{6-10}$ alkanecycloalkanediyl, and $—[(CH_2)_p—X—]_q—(CH_2)_r—$, wherein,
    each X is independently selected from —O—, —S—, and —S—S—;
    each p is independently an integer from 2 to 6;
    q is an integer from 1 to 5; and
    r is an integer from 2 to 10; and
    at least one Y is —SH, or $R^4$ is $—[(CH_2)_p—X—]_q—(CH_2)_r—$ and at least one X is selected from —S— and —S—S—; and
(b) a chlorovinyl ether of Formula (9):

$CH_2=CH—O—(CH_2)_n—Cl$        (9)

wherein n is an integer from 1 to 6.

Compounds of Formula (8) can be dithiols in which each Y is —SH.

Compounds of Formula (8) can be diols in which each Y is —OH.

In compounds of Formula (8), one Y can be —SH and the other Y can be —OH.

In compounds of Formula (8), $R^4$ can be $C_{2-6}$ n-alkanediyl, such as ethane-diyl, n-propane-diyl, n-butane-diyl, n-pentane-diyl, or n-hexane-diyl.

In compounds of Formula (8), $R^4$ can be $—[(CH_2)_p—X—]_q—(CH_2)_r—$.

In compounds of Formula (8), $R^4$ can be $—[(CH_2)_p—X—]_q—(CH_2)_r—$, where each X can be —O— or each X can be —S—S—.

In compounds of Formula (8), $R^4$ can be $—[(CH_2)_p—X—]_q—(CH_2)_r—$, where each X can be —S—.

In compounds of Formula (8), $R^4$ can be $—[(CH_2)_p—X—]_q—(CH_2)_r—$, where each p can be 2 and r can be 2.

In compounds of Formula (8), $R^4$ can be $—[(CH_2)_p—X—]_q—(CH_2)_r—$, where q can be 1, 2, 3, 4, or 5.

In compounds of Formula (8), $R^4$ can be $—[(CH_2)_p—X—]_q—(CH_2)_r—$, where each p can be 2 and r can be 2; and q can be 1, 2, 3, 4, or 5.

In compounds of Formula (8), $R^4$ can be $—[(CH_2)_p—X—]_q—(CH_2)_r—$, where each X can be —S—; each p can be 2, r can be 2, and q can be 1, 2, 3, 4, or 5.

In compounds of Formula (8), $R^4$ can be $—[(CH_2)_p—X—]_q—(CH_2)_r—$, where each X can be —O—; each p can be 2, r can be 2, and q can be 1, 2, 3, 4, or 5.

In compounds of Formula (8), $R^4$ can be $—[(CH_2)_p—X—]_q—(CH_2)_r—$, at least one X can be —O— and at least one X can be —S—.

A compound of Formula (8) can comprise dimercaptodioxaoctane (DMDO), dimercaptodiethylsulfide (DMDS), 2,2-thiodiethanethiol, 2-mercaptoethyl ether, 1,2-ethanedithiol, mercaptoethanol, thiodiglycol, 3,6-dithia-1,8-octanediol, 2-hydroxyethyldisulfide, or a combination of any of the foregoing.

A compound of Formula (8) can comprise a compound of Formula (8a), Formula (8b), Formula (8c), Formula (8d), Formula (8e), Formula (8f), Formula (8g), Formula (8h), or a combination of any of the foregoing:

$HS—(CH_2)_2—O—(CH_2)_2—O—(CH_2)_2—SH$      (8a)

$HS—(CH_2)_2—S—(CH_2)_2—SH$      (8b)

$HS—(CH_2)_2—O—(CH_2)_2—SH$      (8c)

$HS—(CH_2)_2—SH$      (8d)

$HS—(CH_2)_2—OH$      (8e)

$HO—(CH_2)_2—S—(CH_2)_2—OH$      (8f)

$HO—(CH_2)_2—S—(CH_2)_2—S—(CH_2)_2—OH$      (8g)

$HO—(CH_2)_2—S—S—(CH_2)_2—OH$      (8h)

In chlorovinyl ethers of Formula (9), n can be 1, 2, 3, 4, 5, or 6. For example, a chlorovinyl ether of Formula (9) can comprise (chloromethoxy)ethane, (2-chloroethoxy)ethane, 1-chloro-3-(vinyloxy)propane, 1-chloro-4-(vinyloxy)butane, 1-chloro-5-(vinyloxy)pentane, 1-chloro-6-(vinyloxy) hexane, or a combination of any of the foregoing.

Sulfur-containing bis(alkenyl) ethers can be prepared by reacting a dithiol, a diol, or a compound comprising both terminal thiol and hydroxyl groups with a chlorovinyl ether in the presence of a catalyst such as potassium hydroxide at an elevated temperature such as, for example, 80° C.

Divinyl ethers can have the structure of Formula (4):

$CH_2=CH—O—(—R^2—O—)_mCH=CH_2$      (4)

wherein,
m is an integer from 0 to 50; and
each $R^2$ is independently selected from $C_{2-6}$ n-alkanediyl, $C_3$-6 branched alkanediyl, $C_{6-8}$ cycloalkanediyl, $C_{6-10}$ alkanecycloalkanediyl, and $—[(CH_2)_p—X—]_q—(CH_2)_r—$, wherein,
each p is independently an integer from 2 to 6;
q is an integer from 1 to 5; and
r is an integer from 2 to 10.

In divinyl ethers of Formula (4), m can be an integer from 0 to 50, such as an integer from 1 to 6, from 1 to 4, or from 1 to 3.

In divinyl ethers of Formula (4), m can be 1, 2, 3, 4, 5, or 6.

In divinyl ethers of Formula (4), each $R^2$ can independently be $C_{2-6}$ alkanediyl such as 1,2-ethane-diyl, 1,3-propane-diyl, 1,4-butane-diyl, 1,5-pentane-diyl, or 1,6-hexane-diyl.

In divinyl ethers of Formula (4), each $R^2$ can be $—[(CH_2)_p—X—]_q—(CH_2)_r—$.

In divinyl ethers of Formula (3), each $R^2$ can be $—[(CH_2)_p—X—]_q—(CH_2)_r—$, where each p can be 2, each r can be 2, and q can be 1, 2, 3, 4, or 5.

Examples of suitable divinyl ethers include divinyl ether, ethylene glycol divinyl ether (EG-DVE), butanediol divinyl ether (BD-DVE), hexanediol divinyl ether (HD-DVE), diethylene glycol divinyl ether (DEG-DVE), triethylene glycol divinyl ether (TEG-DVE), tetraethylene glycol divinyl ether, and cyclohexanedimethanol divinyl ether.

Suitable divinyl ethers include, for example, compounds having at least one oxyalkanediyl group, such as from 1 to 4 oxyalkanediyl groups, i.e., compounds in which m in Formula (4) is an integer from 1 to 4. In Formula (4), m can be an integer ranging from 2 to 4. It is also possible to employ commercially available divinyl ether mixtures that are characterized by a non-integer average value for the number of oxyalkanediyl units per molecule. Thus, m in Formula (4) can also take on rational number values, for example, ranging from 0 to 10.0, such as from 1.0 to 10.0, from 1.0 to 4.0, from 2.0 to 4.0 or from 2.1 to 3.9.

Examples of suitable divinyl ethers include, divinyl ether, ethylene glycol divinyl ether (EG-DVE) ($R^2$ in Formula (4) is ethanediyl and m is 1), butanediol divinyl ether (BD-DVE) ($R^2$ in Formula (4) is butanediyl and m is 1), hexanediol divinyl ether (HD-DVE) ($R^2$ in Formula (4) is hexanediyl and m is 1), diethylene glycol divinyl ether (DEG-DVE) ($R^2$ in Formula (4) is ethanediyl and m is 2), triethylene glycol divinyl ether ($R^2$ in Formula (4) is ethanediyl and m is 3), tetraethylene glycol divinyl ether (TEG-DVE) ($R^2$ in Formula (4) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such divinyl ether monomers. A divinyl ether may have one or more pendant groups selected from alkyl groups, hydroxyl groups, alkoxy groups, and amino groups.

Divinyl ethers in which $R^2$ in Formula (4) is $C_{3-6}$ branched alkanediyl may be prepared by reacting a polyhydroxyl compound with acetylene. Examples of divinyl ethers of this type include compounds in which $R^2$ in Formula (4) is an alkyl-substituted methanediyl group such as —CH(CH$_3$)— (for example Pluriol® blends such as Pluriol®E-200 divinyl ether (BASF Corporation), for which $R^2$ in Formula (4) is ethanediyl and m is 3.8) or an alkyl-substituted ethanediyl (for example —CH$_2$CH(CH$_3$)— such as DPE polymeric blends including DPE-2 and DPE-3, International Specialty Products).

Other useful divinyl ethers include compounds in which $R^2$ in Formula (4) is polytetrahydrofuryl (poly-THF) or polyoxyalkanediyl, such as those having an average of about 3 monomer units.

Sulfur-containing bis(alkenyl) ethers of Formula (3) are difunctional. Sulfur-containing alkenyl ethers provided by the present disclosure also include sulfur-containing multifunctional(alkenyl) ethers having an alkenyl functionality greater than two, such as an alkenyl functionality from 3 to 6.

For example, a sulfur-containing multifunctional(alkenyl) ether can have the structure of Formula (1):

(1)

wherein,
B comprises a core of a z-valent sulfur-containing poly (alkenyl) ether;
z is an integer from 3 to 6; and
each V comprises a sulfur-containing alkenyl ether moiety having a terminal alkenyl group.

A sulfur-containing multifunctional(alkenyl) ether can be derived from a sulfur-containing bis(alkenyl) ether of Formula (3), for example, by reacting a sulfur-containing bis (alkenyl) ether of Formula (3) with a polyfunctionalizing agent of Formula (1), where each V comprises terminal groups reactive with alkenyl groups, such as thiol groups.

A sulfur-containing multifunctional(alkenyl) ether can have the structure of Formula (10):

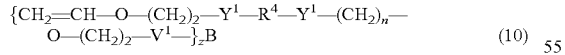
(10)

where n, $Y^1$, and $R^4$ are defined as in Formula (3a), z and B are defined as in Formula (1), and —$V^1$— can be derived from the reaction of —V with an alkenyl group.

In sulfur-containing multifunctional (alkenyl) ethers of Formula (10), B(—V)$_z$ can be a polythiol such as any of those disclosed herein, such as 1,2,3-propane trithiol and isocyanurate-containing trithiols.

Sulfur-containing multifunctional(alkenyl) ethers of Formula (10) can be prepared by reacting a sulfur-containing bis(alkenyl) ether of Formula (3) with a thiol-terminated polyfunctionalizing agent B(—V)$_z$ in the presence of a suitable catalyst such as an amine catalyst.

Sulfur-containing multifunctional(alkenyl) ethers can be used to prepare sulfur-containing multifunctional(alkenyl) ether-containing polythioether prepolymers provided by the present disclosure. For example, the reactants can include sulfur-containing multifunctional(alkenyl) ethers as part of the alkenyl component. Sulfur-containing multifunctional (alkenyl) ethers can be the only polyfunctional reactant having a functionality greater than 2 or may be used in combination with an alkenyl-terminated polyfunctionalizing agent such as triallyl cyanurate or triallylisocyanurate.

For example, polythioether prepolymers provided by the present disclosure can comprise reaction products of reactants comprising:
(a) a dithiol of Formula (7):

(7)

wherein $R^1$ is selected from $C_{2-10}$ alkanediyl, $C_{6-8}$ cycloalkanediyl, $C_{6-10}$ alkanecycloalkanediyl, $C_{5-8}$ heterocycloalkanediyl, and —[(CHR)$_p$—X—]$_q$—(CH$_2$)$_r$—,
wherein:
each p is independently an integer from 2 to 6;
q is an integer from 1 to 5;
r is an integer from 2 to 10;
each R is independently selected from hydrogen and methyl; and
each X is independently selected from —O— and —S.
(b) a sulfur-containing poly(alkenyl) ether, wherein the sulfur-containing poly(alkenyl) ether comprises a sulfur-containing bis(alkenyl) ether of Formula (3), a sulfur-containing multifunctional(alkenyl) ether of Formula (10), or a combination thereof:

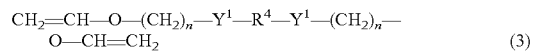
(3)

wherein,
each n is independently an integer from 1 to 4;
each $Y^1$ is independently selected from —O— and —S—; and
$R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and —[(CH$_2$)$_p$—X—]$_q$—(CH$_2$)$_r$—,
wherein,
each X is independently selected from —O—, —S—, and —S—S—;
each p is independently an integer from 2 to 6;
q is an integer from 1 to 5; and
r is an integer from 2 to 10; and
at least one $Y^1$ is —S—, or $R^4$ is —[(CH$_2$)$_p$—X—]$_q$—(CH$_2$)$_r$— at least one X is selected from —S— and —S—S—;

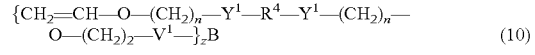
(10)

wherein,
B comprises a core of a z-valent polyfunctionalizing agent B(—V)$_z$;
z is an integer from 3 to 6; and
each —V is independently a moiety comprising a terminal alkenyl group or a terminal thiol group; and
(c) a divinyl ether of Formula (4):

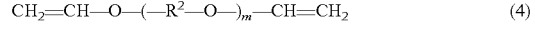
(4)

wherein,
m is an integer from 0 to 50; and
each $R^2$ is independently selected from $C_{2-6}$ n-alkanediyl, $C_{3-6}$ branched alkanediyl, $C_{6-8}$ cycloalkanediyl, and $C_{6-10}$ alkanecycloalkanediyl, and —[(CH$_2$)$_p$—X—]$_q$—(CH$_2$)$_r$—, and —[(CH$_2$)$_p$—X—]$_q$—(CH$_2$)$_r$—, wherein, each p is independently an integer ranging from 2 to 6;
q is an integer from 1 to 5; and
r is an integer from 2 to 10.

The reactants can comprise from 10 mol % to 90 mol %, such as from 10 mol % to 80 mol %, from 20 mol % to 80 mol %, or from 40 mol % to 60 mol %, of the sulfur-containing bis(alkenyl) ether of Formula (3), wherein mol % is based on the total moles of the sulfur-containing bis (alkenyl) ether of Formula (3) and the and the divinyl ether of Formula (4). The reactants can comprise from 10 mol % to 90 mol % of the sulfur-containing bis(alkenyl) ether of Formula (3), wherein mol % is based on the total moles of the sulfur-containing bis(alkenyl) ether of Formula (3) and the divinyl ether of Formula (4).

The reactants can also include a polyfunctionalizing agent having terminal alkenyl groups such as, for example, triallyl cyanurate (TAC).

Sulfur-containing multifunctional(alkenyl) ethers can also be terminated in a suitable functional group as appropriate for a particular curing chemistry. For example, a sulfur-containing multifunctional(alkenyl) ether can comprise a terminal thiol, epoxy, isocyanate, hydroxyl, amino, or Michael acceptor group. Sulfur-containing multifunctional (alkenyl) ethers can have the structure of Formula (10a):

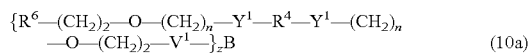

$$\{R^6—(CH_2)_2—O—(CH_2)_n—Y^1—R^4—Y^1—(CH_2)_n—O—(CH_2)_2—V^1—\}_zB \quad (10a)$$

where n, Y$^1$, and R$^4$ are defined as in Formula (3), z and B are defined as in Formula (1), V$^1$ can be derived from the reaction of V with an alkenyl group, and each R$^6$ can comprise a suitable terminal functional group such as a thiol, hydroxyl, isocyanate, alkenyl, epoxy, amine, or Michael acceptor group.

Polythioether prepolymers provided by the present disclosure can be liquid at room temperature and can have a glass transition temperature T$_g$, for example, less than −20° C., less than −30° C., or less than −40° C., determined by Dynamic Mechanical Analysis (DMA) using a TA Instruments Q800 apparatus with a frequency of 1 Hz, an amplitude of 20 microns, and a temperature ramp of −80° C. to 25° C., with the T$_g$ identified as the peak of the tan δ curve.

The polythioether prepolymers can have a viscosity, for example, from 20 poise to 200 poise (2 Pa-sec to 20 Pa-sec) or from 40 poise to 140 poise (4 Pa-sec to 14 Pa-sec) determined according to ASTM D-2849 § 79-90 at a temperature of 25° C. and a pressure of 760 mm Hg using a Brookfield CAP 2000 viscometer with spindle #6 at 300 rpm.

Polythioether prepolymers provided by the present disclosure can be characterized by a number average molecular weight and/or a molecular weight distribution. Polythioether prepolymers can exhibit a number average molecular weight ranging from 500 Daltons to 20,000 Daltons, from 2,000 Daltons to 5,000 Daltons, or from 1,000 Daltons to 4,000 Daltons. Polythioether prepolymers can exhibit a polydispersity (Mw/Mn; weight average molecular weight/number average molecular weight) ranging from 1 to 20, or from 1 to 5. For thiol-terminated polythioether prepolymers, the average number molecular weight and molecular weight distribution of polythioether prepolymers may be determined by end group analysis using iodine titration. For other polythioether prepolymers the molecular weight can be determined by gel permeation chromatography using a polystyrene standard.

Sulfur-containing poly(vinyl)ether-containing polythioether prepolymers provided by the present disclosure can exhibit a lower onset of solidification temperature than comparable polythioether prepolymers prepared using poly (vinyl) ethers that do not contain sulfur atoms. The onset of solidification temperature refers to the temperature at which the liquid polythioether prepolymer begins to solidify. For example, sulfur-containing poly(vinyl)ether-containing polythioether prepolymers provided by the present disclosure are liquid at room temperature (70° F. to 75° F.; 21° C. to 25° C.), and can begin to solidify at a temperature less than 65° F. (18.3° C.), less than 60° F. (15.5° C.), less than 55 C (12.8° C.), less than 50° F. (10° C.), or less than 45° F. (7.2° C.). A sulfur-containing poly(vinyl)ether-containing polythioether prepolymer can begin to solidify at temperatures, for example, within a range from 65° F. to 60° F. (18.3° C. to 15.5° C.), from 60° F. to 55° F. (15.5° C. to 12.8° C.), from 55° F. to 50° F. (12.8° C. to 100 C), or from 50° F. to 45° F. (10° C. to 7.2° C.). A polythioether prepolymer prepared using a divinyl ether without sulfur atoms will begin to solidify at temperatures within a range from 60° F. to 65° F.

During storage, at temperatures less than the onset temperature of solidification, a polythioether prepolymer can solidify. The prepolymer must then be heated to liquify the prepolymer so that it can be mixed with a curing agent and applied to a surface. By reducing the temperature at which a prepolymer solidifies can eliminate the need to heat the prepolymer to a liquid before use.

Compositions provided by the present disclosure can comprise a sulfur-containing bis(alkenyl) ether-containing polythioether prepolymer provided by the present disclosure such as a polythioether prepolymer of Formula (2), a thiol-terminated polythioether prepolymer of Formula (2c) and/or Formula (2d), a terminal-modified polythioether prepolymer of Formula (2a) and/or Formula (2b), or a combination of any of the foregoing.

A composition can comprise a polythioether prepolymer provided by the present disclosure as the only sulfur-containing prepolymer in the composition or may contain additional sulfur-containing prepolymers. For example, in addition to a sulfur-containing bis(alkenyl) ether-containing polythioether prepolymer provided by the present disclosure, a composition may comprise a thiol-terminated polythioether prepolymer of Formula (11a) and/or Formula (11b), and/or depending on the curing chemistry, may comprise a terminal-modified polythioether prepolymer of Formula (11c) and/or Formula (11d):

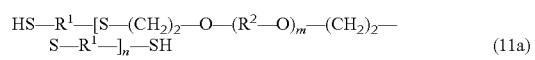

$$HS—R^1—[S—(CH_2)_2—O—(R^2—O)_m—(CH_2)_2—S—R^1—]_n—SH \quad (11a)$$

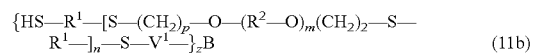

$$\{HS—R^1—[S—(CH_2)_p—O—(R^2—O)_m(CH_2)_2—S—R^1—]_n—S—V^1—\}_zB \quad (11b)$$

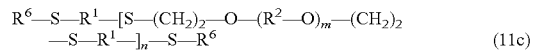

$$R^6—S—R^1—[S—(CH_2)_2—O—(R^2—O)_m—(CH_2)_2—S—R^1—]_n—S—R^6 \quad (11c)$$

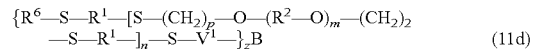

$$\{R^6—S—R^1—[S—(CH_2)_p—O—(R^2—O)_m—(CH_2)_2—S—R^1—]_n—S—V^1—\}_zB \quad (11d)$$

where,
each R$^1$ is selected from C$_{2-10}$ alkanediyl, C$_{6-8}$ cycloalkanediyl, C$_{6-14}$ alkanecycloalkanediyl, C$_{5-8}$ heterocycloalkanediyl, and —[(CHR)$_p$—X—]$_q$—(CH$_2$)$_r$—, wherein:
p is an integer from 2 to 6;
q is an integer from 1 to 5;
r is an integer from 2 to 10;

each R is independently selected from hydrogen and methyl; and each X is independently selected from —O— and —S—;

each $R^2$ is selected from $C_{1-10}$ alkanediyl, $C_{6-8}$ cycloalkanediyl, $C_{6-14}$ alkanecycloalkanediyl, and —[(CH$_2$)$_p$—X—]$_q$—(CH$_2$)$_r$—, wherein p, q, r, R, and X are as defined as for $R^1$;

m is an integer from 0 to 50;

n is an integer from 1 to 60;

B is a core of a z-valent polyfunctionalizing agent B(—V)$_z$, wherein:

z is an integer from 3 to 6; and each V is a group comprising a terminal group reactive with a thiol group; and each —$V^1$— is derived from the reaction of —V with a thiol.

In prepolymers of Formula (11a)-(11d), $R^1$ can be —[(CH$_2$)$_p$—X—]$_q$—(CH$_2$)$_r$—, where p can be 2, X can be —O—, q can be 2, r can be 2, $R^2$ can be ethanediyl, m can be 2, and n can be 9.

In prepolymers of Formula (11a)-(11d), $R^1$ can be selected from $C_{2-6}$ alkanediyl and —[(CHR)$_p$—X—]$_q$—(CHR)$_r$—.

In prepolymers of Formula (11a)-(11d), $R^1$ can be —[(CHR)$_p$—X—]$_q$—(CH$_2$)$_r$ where X can be —O— or X can be —S—.

In prepolymers of Formula (11a)-(11d), $R^1$ can be —[(CHR)$_p$—X—]$_q$—(CH$_2$)$_r$—, p can be 2, r can be 2, q can be 1, and X can be —S—; or p can be 2, q can be 2, r can be 2, and X can be —O—; or p can be 2, r can be 2, q can be 1, and X can be —O—.

In prepolymers of Formula (11a)-(11d), $R^1$ can be —[(CHR)$_p$—X—]$_q$—(CH$_2$)$_r$—, each R can be hydrogen or at least one R can be methyl.

In prepolymers of Formula (11a)-(11d), each $R^1$ can be the same or at least one $R^1$ can be different.

In prepolymers of Formula (11a)-(11d), $R^1$ can be $C_{2-6}$ n-alkanediyl, such as ethane-diyl, n-propane-diyl, n-butane-diyl, n-pentane-diyl, or n-hexane-diyl.

In prepolymers of Formula (11a)-(11d), $R^1$ can be —[(—CHR—)$_p$—X—]$_q$—(—CH$_2$—)$_r$—.

In prepolymers of Formula (11a)-(11d), $R^1$ can be —[(—CHR—)$_p$—X—]$_q$—(—CH$_2$—)$_r$—, where at least one R can be —CH$_3$.

In prepolymers of Formula (11a)-(11d), $R^1$ can be —[(CH$_2$)$_p$—X—]$_q$—(CH$_2$)$_r$—.

In prepolymers of Formula (11a)-(11d), $R^1$ can be —[(CH$_2$)$_p$—X—]$_q$—(CH$_2$)$_r$—, and each X can be —O—.

In prepolymers of Formula (11a)-(11d), $R^1$ can be —[(CH$_2$)$_p$—X—]$_q$—(CH$_2$)$_r$—, and each X can be —S— at least one X can be —S—, each X can be —S—S—, or at least one X can be —S—S—.

In prepolymers of Formula (11a)-(11d), $R^1$ can be —[(CH$_2$)$_p$—X—]$_q$—(CH$_2$)$_r$—, and each p can be 2 and r can be 2.

In prepolymers of Formula (11a)-(11d), $R^1$ can be —[(CH$_2$)$_p$—X—]$_q$—(CH$_2$)$_r$—, where p can be 2, 3, 4, or 5.

In prepolymers of Formula (11a)-(11d), $R^1$ can be —[(CH$_2$)$_p$—X—]$_q$—(CH$_2$)$_r$—, where q can be 1, 2, 3, 4, or 5.

In prepolymers of Formula (11a)-(11d), $R^1$ can be —[(CH$_2$)$_p$—X—]$_q$—(CH$_2$)$_r$—, where r can be 2, 3, 4, or 5.

In prepolymers of Formula (11a)-(11d), $R^1$ can be —[(CH$_2$)$_p$—X—]$_q$—(CH$_2$)$_r$—, where each p can be 2 and r can be 2; and q can be 1, 2, 3, 4, or 5.

In prepolymers of Formula (11a)-(11d), $R^1$ can be —[(CH$_2$)$_p$—X—]$_q$—(CH$_2$)$_r$—, where each X can be —S— or at least one X can be —S—; each p can be 2 and r can be 2; and q can be 1, 2, 3, 4, or 5.

In prepolymers of Formula (11a)-(11d), $R^1$ can be —[(CH$_2$)$_p$—X—]$_q$—(CH$_2$)$_r$—, where each X can be —O— or at least one X can be —O—; each p can be 2 and r can be 2; and q can be 1, 2, 3, 4, or 5.

In prepolymers of Formula (11a)-(11d), $R^1$ can be —[(—CH$_2$—)$_p$—X—]$_q$—(CH$_2$)$_r$—, where p is 2, r is 2, q is 1, and X is —S—; $R^1$ can be —[(CH$_2$)$_p$—X—]$_q$—(CH$_2$)$_r$—, where p is 2, q is 2, r is 2, and X is —O—; or $R^1$ can be —[(CH$_2$)$_p$—X—]$_q$—(CH$_2$)$_r$—, where p is 2, r is 2, q is 1, and X is —O—.

In prepolymers of Formula (11a)-(11d), s can be an integer, for example, from 1 to 40, from 1 to 30, from 1 to 20, or from 1 to 10.

In prepolymers of Formula (11a)-(11d), each $R^2$ can be independently $C_{2-6}$ n alkanediyl such as 1,2-ethane-diyl, 1,3-propane-diyl, 1,4-butane-diyl, 1,5-pentane-diyl or 1,6-hexane-diyl. In moieties of Formula (3a), each $R^2$ can be $C_{2-6}$ n alkanediyl such as 1,2-ethane-diyl, 1,3-propane-diyl, 1,4-butane-diyl, 1,5-pentane-diyl or 1,6-hexane-diyl.

In prepolymers of Formula (11a)-(11d), m can be 1, 2, 3, or 4; and $R^2$ can be $C_{2-6}$ n alkanediyl such as 1,2-ethane-diyl, 1,3-propane-diyl, 1,4-butane-diyl, 1,5-pentane-diyl or 1,6-hexane-diyl.

In prepolymers of Formula (11b) and (11 d), z can be 3, 4, 5, or 6; and $V^1$ can be derived from a reaction of an alkenyl group with a thiol group.

Various methods can be used to prepare such polythioether prepolymers. Examples of suitable thiol-terminated polythioether prepolymers, and methods for their production, are described, for example, in U.S. Pat. No. 6,172,179. Such thiol-terminated polythioether prepolymers may be difunctional, that is, linear prepolymers having two thiol terminal groups, or multifunctional, that is, branched prepolymers have three or more thiol terminal groups. Thiol-terminated polythioether prepolymers may also comprise a combination of difunctional and multifunctional thiol-terminated polythioether prepolymers. Suitable thiol-terminated polythioether prepolymers are commercially available, for example, as Permapol® P3.1E, from PPG Aerospace.

Suitable thiol-terminated polythioether prepolymers may be produced by reacting a divinyl ether or combination of divinyl ethers with an excess of dithiol or a mixture of dithiols. For example, dithiols suitable for use in preparing thiol-terminated polythioether prepolymers include those of Formula (7), other dithiols disclosed herein, or combinations of any of the dithiols disclosed herein.

A dithiol can have the structure of Formula (7):

$$HS—R^1—SH \qquad (7)$$

wherein:

$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and —[(CHR)$_p$—X—]$_q$—(CH$_2$)$_r$;

wherein:

each R is independently selected from hydrogen and methyl;

each X is independently selected from —O— and —S—;

p is an integer from 2 to 6;

q is an integer from 1 to 5; and r is an integer from 2 to 10.

Suitable divinyl ethers for preparing thiol-terminated polythioether prepolymers include divinyl ethers of Formula (4):

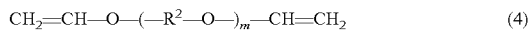 (4)

where $R^2$ in Formula (4) comprises $C_{2-6}$ n-alkanediyl group, a $C_{3-6}$ branched alkanediyl group, a $C_{6-8}$ cycloalkanediyl group, a $C_{6-10}$ alkanecycloalkanediyl group, or $-[(CH_2)_p-X-]_q-(CH_2)_r-$, where p is an integer ranging from 2 to 6, q is an integer from 1 to 5, and r is an integer from 2 to 10. In a divinyl ether of Formula (4), $R^2$ can be a $C_{2-6}$ n-alkanediyl group, a $C_{3-6}$ branched alkanediyl group, a $C_{6-8}$ cycloalkanediyl group, a $C_{6-10}$ alkanecycloalkanediyl group, or $-[(CH_2)_p-X-]_q-(CH_2)_r-$.

Two or more types of divinyl ether monomers of Formula (4) may be used. Thus, two dithiols of Formula (7) and one divinyl ether monomer of Formula (4), one dithiol of Formula (7) and two divinyl ether monomers of Formula (4), two dithiols of Formula (7) and two divinyl ether monomers of Formula (4), and more than two dithiols or divinyl ethers of one or both Formula (7) and Formula (4), may be used to produce a variety of thiol-terminated polythioether prepolymers.

A divinyl ether monomer can comprise 20 mole percent to less than 50 mole percent of the reactants used to prepare a thiol-terminated polythioether prepolymer, or 30 mole percent to less than 50 mole percent.

Relative amounts of dithiols and divinyl ethers can be selected to yield polythioether prepolymers having terminal thiol groups. Thus, a dithiol of Formula (7) or a mixture of at least two different dithiols of Formula (7), can be reacted with of a divinyl ether of Formula (4) or a mixture of at least two different divinyl ethers of Formula (4) in relative amounts such that the molar ratio of thiol groups to vinyl groups is greater than 1:1, such as from 1.1:1.0 to 2.0:1.0.

The reaction between compounds of dithiols and divinyl ethers may be catalyzed by a free radical catalyst. Suitable free radical catalysts include, for example, azo compounds, for example azobisnitriles such as azo(bis)isobutyronitrile (AIBN); organic peroxides such as benzoyl peroxide and t-butyl peroxide; and inorganic peroxides such as hydrogen peroxide. The catalyst may be, for example, a free-radical catalyst, an ionic catalyst, or ultraviolet radiation. A catalyst may not comprise an acidic or basic compound, and may not produce acidic or basic compounds upon decomposition. Examples of suitable free-radical catalysts include azo-type catalyst, such as Vazo®-57 (Du Pont), Vazo®-64 (Du Pont), Vazo®-67 (Du Pont), V-70® (Wako Specialty Chemicals), and V-65B® (Wako Specialty Chemicals). Examples of other suitable free-radical catalysts include alkyl peroxides, such as t-butyl peroxide. The reaction may also be effected by irradiation with ultraviolet light either with or without a cationic photoinitiating moiety.

Thiol-terminated polythioether prepolymers provided by the present disclosure may be prepared by combining at least one dithiol of Formula (7) and at least one divinyl ether of Formula (4) followed by addition of an appropriate catalyst, and carrying out the reaction at a temperature from 30° C. to 120° C., such as 70° C. to 90° C., for a time from 2 hours to 24 hours, such as from 2 hours to 6 hours.

The backbone of sulfur-containing poly(alkenyl) ether-containing polythioether prepolymers can be modified to improve the properties such as adhesion, tensile strength, elongation, UV resistance, hardness, and/or flexibility of sealants and coatings prepared using polythioether prepolymers. For example, adhesion promoting groups, antioxidants, metal ligands, and/or urethane linkages can be incorporated into the backbone of a polythioether prepolymer to improve one or more performance attributes. Examples of backbone-modified polythioethers are disclosed, for example, in U.S. Pat. No. 8,138,273 (urethane containing), U.S. Application Publication No. 2015/0240122 (sulfone-containing), U.S. Pat. No. 8,952,124 (bis(sulfonyl)alkanol-containing), U.S. Application Publication No. 2015/0240140 (metal-ligand containing), U.S. Application Publication No. 2017/0114208 (antioxidant containing), and PCT International Application No. PCT/US2017/45871 filed on Aug. 8, 2017 (urethane-containing), each of which is incorporated by reference in its entirety.

In addition to a sulfur-containing poly(alkenyl) ether-containing provided by the present disclosure, a composition may comprise a sulfur-containing prepolymer such as a polythioether prepolymer, a polysulfide prepolymer, a sulfur-containing polyformal prepolymer, a monosulfide prepolymer, a perfluoroether, a perfluorosilicone prepolymer, or a combination of any of the foregoing.

A sulfur-containing prepolymer can comprise a polythioether, a polysulfide, a sulfur-containing polyformal, or a combination of any of the foregoing. A sulfur-containing prepolymer can comprise a polythioether or a sulfur-containing polymer can comprise a polysulfide. A sulfur-containing polymer may comprise a combination of different polythioethers and/or polysulfides, and the polythioethers and/or polysulfides may have the same or different functionality. A sulfur-containing polymer can have an average functionality from 2 to 6, from 2 to 4, from 2 to 3, from 2.3 to 2.8, or from 2.05 to 2.5. For example, a sulfur-containing prepolymer can be selected from a difunctional sulfur-containing prepolymer, a trifunctional sulfur-containing prepolymer, and a combination thereof. A sulfur-containing prepolymer can comprise a sulfur-containing polyformal.

A sulfur-containing prepolymer can be thiol-terminated. Examples of thiol-terminated polythioethers are disclosed, for example, in U.S. Pat. No. 6,172,179. A thiol-terminated polythioether can comprise Permapol® P3.1E, and Permapol® L56086, or a combination of any of the foregoing, each of which is available from PPG Aerospace.

Examples of suitable polysulfides are disclosed, for example, in U.S. Pat. Nos. 4,623,711; 6,172,179; 6,509,418; 7,009,032; and 7,879,955, each of which is incorporated by reference in its entirety.

As used herein, the term polysulfide refers to a prepolymer that contains one or more polysulfide linkages, i.e., $-S_x-$ linkages, where x is from 2 to 4, in the prepolymer backbone and/or in pendant positions on the prepolymer chain. A polysulfide prepolymer can have two or more sulfur-sulfur linkages. Suitable polysulfides are commercially available, for example, from AkzoNobel and Toray Fine Chemicals under the names Thiokol-LP® and Thioplast®. Thioplast® products are available in a wide range of molecular weights ranging, for example, from less than 1,100 Daltons to over 8,000 Daltons, with molecular weight being the number average molecular weight in grams per mole. In some cases, the polysulfide has a number average molecular weight of 1,000 Daltons to 4,000 Daltons. The crosslink density of these products also varies, depending on the amount of crosslinking agent used. The —SH content, i.e., thiol or mercaptan content, of these products can also vary. The mercaptan content and molecular weight of the polysulfide can affect the cure speed of the prepolymer, with cure speed increasing with molecular weight.

A sulfur-containing prepolymer curing agent can comprise a polysulfide selected from a Thiokol-LP® polysulfide, a Thioplast® polysulfide, and a combination thereof, such as Thioplast® G131, Thioplast® G21 and a combination thereof.

A thiol-terminated sulfur-containing prepolymer can comprise a thiol-terminated sulfur-containing polyformal. Sulfur-containing polyformal prepolymers useful in aerospace sealant applications are disclosed, for example, in U.S. Pat. No. 8,729,216 and in U.S. Pat. No. 8,541,513, each of which is incorporated by reference in its entirety.

A thiol-terminated sulfur-containing prepolymer can comprise a thiol-terminated sulfur-containing polyformal comprising a moiety of Formula (12):

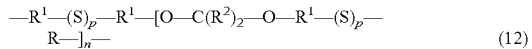
(12)

where n is an integer from 1 to 50; each p is independently selected from 1 and 2; each $R^1$ can be $C_{2-6}$ alkanediyl; and each $R^2$ can independently be selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl.

A thiol-terminated sulfur-containing polyformal prepolymer can have the structure of Formula (12a):

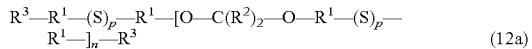
(12a)

where n is an integer from 1 to 50; each p is independently selected from 1 and 2; each $R^1$ is $C_{2-6}$ alkanediyl; each $R^2$ is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; and each $R^3$ comprises a thiol-terminated group.

In sulfur-containing polyformal prepolymers of Formula (12) and Formula (12a), each $R^1$ can independently be selected from $C_{2-6}$ alkanediyl, $C_{2-4}$ alkanediyl, $C_{2-3}$ alkanediyl, and ethane-1,2-diyl. In sulfur-containing polyformal prepolymers of Formula (12), each $R^1$ can be ethane-1,2-diyl.

In sulfur-containing polyformal prepolymers of Formula (12) and Formula (12a), each $R^2$ can independently be selected from hydrogen, $C_{1-6}$ alkyl, $C_{1-4}$ alkyl, $C_{1-3}$ alkyl, and $C_{1-2}$ alkyl. In sulfur-containing polyformal prepolymers of Formula (12), each $R^2$ can be selected from hydrogen, methyl, and ethyl.

In sulfur-containing polyformal prepolymers of Formula (12) and Formula (12a), each $R^1$ is the same and can be selected from $C_{2-3}$ alkanediyl such as ethane-1,2-diyl and propane-1,3-diyl; and each $R^2$ is the same and can be selected from hydrogen and $C_{1-3}$ alkyl such as methyl, ethyl, or propyl. In sulfur-containing polyformal prepolymers of Formula (12) and Formula (12a), each $R^1$ can be ethane-1,2-diyl. In sulfur-containing polyformal prepolymers of Formula (12) and Formula (12a), each $R^2$ can be hydrogen. In sulfur-containing polyformal prepolymers of Formula (12) and Formula (12a), each $R^1$ can be ethane-1,2-diyl and each $R^2$ can be hydrogen.

In sulfur-containing polyformal prepolymers of Formula (12) and Formula (12a), n can be an integer selected from 1 to 50, an integer from 2 to 40, an integer from 4 to 30, or n can be an integer from 7 to 30.

In sulfur-containing polyformal prepolymers of Formula (12) and Formula (12a), each p is the same and can be 1, and each p is the same and can be 2.

In sulfur-containing polyformal prepolymers of Formula (12) and Formula (12a) can have a number average molecular weight from 200 Daltons to 6,000 Daltons, from 500 Daltons to 5,000 Daltons, from 1,000 Daltons to 5,000 Daltons, from 1,500 Daltons to 4000 Daltons, or from 2,000 Daltons to 3,600 Daltons.

In sulfur-containing polyformal prepolymers of Formula (12a), each $R^3$ can be a thiol-terminated group and can be a group of Formula (a), Formula (b), Formula (c), Formula (d), Formula (e), or Formula (f):

 (a)

 (b)

 (c)

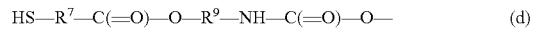 (d)

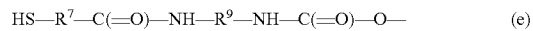 (e)

 (f)

where each $R^6$ comprises a moiety derived from a diisocyanate or a moiety derived from an ethylenically unsaturated monoisocyanate; each $R^7$ can be selected from $C_{2-14}$ alkanediyl and $C_{2-14}$ heteroalkanediyl; and each $R^9$ can be selected from $C_{2-6}$ alkanediyl, $C_{2-6}$ heteroalkanediyl, $C_{6-12}$ arenediyl, substituted $C_{6-12}$ arenediyl, $C_{6-12}$ heteroarenediyl, substituted $C_{6-12}$ heteroarenediyl, $C_{3-12}$ cycloalkanediyl, substituted $C_{3-12}$ cycloalkanediyl, $C_{3-12}$ heterocycloalkanediyl, substituted $C_{3-12}$ heterocycloalkanediyl, $C_{7-18}$ alkanearenediyl, substituted $C_{7-18}$ heteroalkanearenediyl, $C_{4-18}$ alkanecycloalkanediyl, and substituted $C_{4-18}$ alkanecycloalkanediyl.

Sulfur-containing polyformal prepolymers provided by the present disclosure can have the structure of Formula (12b):

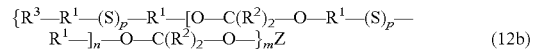
(12b)

where each n is an integer selected from 1 to 50; m is an integer selected from 3 to 6; p is independently selected from 1 and 2; each $R^1$ can independently be $C_{2-6}$ alkanediyl; each $R^2$ can independently be selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; each $R^3$ comprises a thiol-terminated group; and Z is derived from the core of an m-valent parent polyol $Z(OH)_m$.

In sulfur-containing polyformal prepolymers of Formula (12b), each $R^1$ can independently be selected from $C_{2-6}$ alkanediyl, $C_{2-4}$ alkanediyl, $C_{2-3}$ alkanediyl, and ethane-1,2-diyl. In sulfur-containing polyformal prepolymers of Formula (12b), each $R^1$ can be ethane-1,2-diyl.

In sulfur-containing polyformal prepolymers of Formula (12b), each $R^2$ can independently be selected from hydrogen, $C_{1-6}$ alkyl, $C_{1-4}$ alkyl, $C_{1-3}$ alkyl, and $C_{1-2}$ alkyl. In sulfur-containing polyformal prepolymers of Formula (12b), each $R^2$ can be selected from hydrogen, methyl, and ethyl.

In sulfur-containing polyformal prepolymers of Formula (12b), each $R^1$ can be the same and can be selected from $C_{2-3}$ alkanediyl such as ethane-1,2-diyl or propane-1,3-diyl; and each $R^2$ is the same and can be selected from hydrogen and $C_{1-3}$ alkyl such as methyl, ethyl, or propyl. In sulfur-containing polyformal prepolymers of Formula (12b), each $R^1$ can be ethane-1,2-diyl. In sulfur-containing polyformal prepolymers of Formula (12b), each $R^2$ can be hydrogen. In sulfur-containing polyformal prepolymers of Formula (12b), each $R^1$ can be ethane-1,2-diyl and each $R^2$ can be hydrogen.

In sulfur-containing polyformal prepolymers of Formula (12b), m can be 1, m can be 2, m can be 3, m can be 4, m can be 5, or m can be 6.

In sulfur-containing polyformal prepolymers of Formula (12b) where m is 3, the parent polyol $Z(OH)_m$ is a triol of Formula (13):

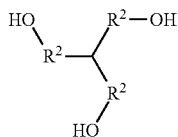
(13)

where each $R^2$ is independently $C_{1-6}$ alkanediyl, or a triol of Formula (14):

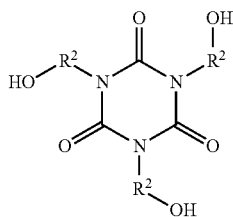
(14)

where each $R^2$ is independently $C_{1-6}$ alkanediyl. Accordingly, in these embodiments Z can have the structure of Formula (14a) or Formula (14b):

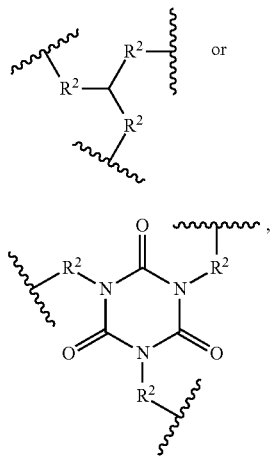

respectively, where each $R^2$ is independently $C_{1-6}$ alkanediyl.

In sulfur-containing polyformal prepolymers of Formula (12b), each n is an integer selected from 1 to 50, an integer selected from 2 to 40, an integer selected from 4 to 30, or an integer selected from 7 to 30.

In sulfur-containing polyformal prepolymers of Formula (12b), each p is the same and is 1, and each p is the same and is 2.

In sulfur-containing polyformal prepolymers of Formula (12b) has a number average molecular weight from 200 Daltons to 6,000 Daltons, from 500 Daltons to 5,000 Daltons, from 1,000 Daltons to 5,000 Daltons, from 1,500 Daltons to 4,000 Daltons, or from 2,000 Daltons to 3,600 Daltons.

In sulfur-containing polyformal prepolymers of Formula (12b), $R^3$ can be bonded to a polyfunctionalizing agent $B(V)_z$ through a moiety of Formula (12).

In sulfur-containing polyformal prepolymers of Formula (12b), each $R^3$ can be the same.

In sulfur-containing polyformal prepolymers of Formula (12b), each $R^3$ can comprise a thiol-terminated group of Formula (a), Formula (b), Formula (c), Formula (d), Formula (e), or Formula (f):

$$HS-R^7-R^6-O- \quad (a)$$

$$HS-R^7-O- \quad (b)$$

$$HS-R^7-NH-C(O)-O- \quad (c)$$

$$HS-R^7-C(O)-O-R^9-NH-C(O)-O- \quad (d)$$

$$HS-R^7-C(O)-NH-R^9-NH-C(O)-O- \quad (e)$$

$$HS-R^7-C(O)-O- \quad (f)$$

where each $R^6$ comprises a moiety derived from a diisocyanate or a moiety derived from an ethylenically unsaturated monoisocyanate; each $R^7$ can be selected from $C_{2-14}$ alkanediyl and $C_{2-14}$ heteroalkanediyl; and each $R^9$ can be selected from $C_{2-6}$ alkanediyl, $C_{2-6}$ heteroalkanediyl, $C_{6-12}$ arenediyl, substituted $C_{6-12}$ arenediyl, $C_{6-12}$ heteroarenediyl, substituted $C_{6-12}$ heteroarenediyl, $C_{3-12}$ cycloalkanediyl, substituted $C_{3-12}$ cycloalkanediyl, $C_{3-12}$ heterocycloalkanediyl, substituted $C_{3-12}$ heterocycloalkanediyl, $C_{7-18}$ alkanearenediyl, substituted $C_{7-18}$ heteroalkanearenediyl, $C_{4-18}$ alkanecycloalkanediyl, and substituted $C_{4-18}$ alkanecycloalkanediyl.

A thiol-terminated sulfur-containing prepolymer can comprise a thiol-terminated monosulfide prepolymer.

A thiol-terminated monosulfide prepolymer can comprise a thiol-terminated monosulfide prepolymer comprising a moiety of Formula (15):

$$-S-R^2-[S-(R-X)_p-(R^1-X)_q-R^2-]_n-S- \quad (15)$$

wherein, each R can independently be selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{8-10}$ alkylarenediyl;

each $R^1$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{8-10}$ alkylarenediyl;

each $R^2$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl group; $C_{6-14}$ alkylcycloalkanediyl, such as a $C_{6-10}$ alkylcycloalkanediyl; and $C_{8-10}$ alkylarenediyl;

each X can independently be selected from O or S;

p is an integer from 1 to 5;

q is an integer from 0 to 5; and n is an integer from 1 to 60, such as from 2 to 60, from 3 to 60, or from 25 to 35.

In thiol-terminated monosulfide prepolymers of Formula (14), each X can independently be selected from S and O; p is an integer from 1 to 5; q is an integer from 0 to 5; n is an integer from 1 to 60; each R can independently be selected from $C_{2-10}$ alkanediyl, $C_{6-8}$ cycloalkanediyl, $C_{1-4}$ alkylcycloalkanediyl, and $C_{8-10}$ alkylarenediyl; each $R^1$ can independently be selected from $C_{1-10}$ alkanediyl, $C_{6-8}$ cycloalkanediyl, $C_{1-4}$ alkylcycloalkanediyl, and $C_{8-10}$ alkylarenediyl; and each $R^2$ can independently be selected from $C_{2-10}$ alkanediyl, $C_{6-8}$ cycloalkanediyl, $C_{1-4}$ alkylcycloalkanediyl, and $C_{8-10}$ alkylarenediyl.

A thiol-terminated monosulfide prepolymer can comprise a thiol-terminated monosulfide prepolymer of Formula (15a), a thiol-terminated monosulfide prepolymer of Formula (15b), a thiol-terminated monosulfide prepolymer of Formula (15c), or a combination of any of the foregoing:

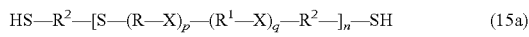

$$HS-R^2-[S-(R-X)_p-(R^1-X)_q-R^2-]_n-SH \quad (15a)$$

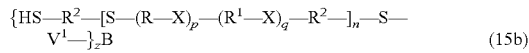

$$\{HS-R^2-[S-(R-X)_p-(R^1-X)_q-R^2-]_n-S-V^1-\}_zB \quad (15b)$$

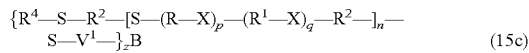

$$\{R^4-S-R^2-[S-(R-X)_p-(R^1-X)_q-R^2-]_n-S-V^1-\}_zB \quad (15c)$$

wherein, each R can independently be selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{8-10}$ alkylarenediyl;

each $R^1$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{8-10}$ alkylararenediyl;

each $R^2$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl group; $C_{6-14}$ alkylcycloalkanediyl, such as a $C_{6-10}$ alkylcycloalkanediyl; and $C_{8-10}$ alkylararenediyl;

each X can independently be selected from O and S;

p is an integer from 1 to 5;

q is an integer from 0 to 5; and n is an integer from 1 to 60, such as from 2 to 60, from 3 to 60, or from 25 to 35 and B represents a core of a z-valent polyfunctionalizing agent $B(-V)_z$ wherein:

z is an integer from 3 to 6; and each V is a moiety comprising a terminal group reactive with a thiol group;

each $-V^1-$ is derived from the reaction of $-V$ with a thiol; and each $R^4$ is independently selected from hydrogen and a bond to a polyfunctionalizing agent $B(-V)_z$ through a moiety of Formula (15).

In thiol-terminated monosulfide prepolymers of Formula (15)-(15c):

each X can independently be selected from S and O;

p is an integer from 1 to 5;

q is an integer from 0 to 5;

n is an integer from 1 to 60;

each R can independently be selected from $C_{2-10}$ alkanediyl, $C_{6-8}$ cycloalkanediyl, $C_{1-4}$ alkylcycloalkanediyl, and $C_{8-10}$ alkylarenediyl;

each $R^1$ can independently be selected from $C_{1-10}$ alkanediyl, $C_{6-8}$ cycloalkanediyl, $C_{1-4}$ alkylcycloalkanediyl, and $C_{8-10}$ alkylarenediyl;

each $R^2$ can independently be selected from $C_{2-10}$ alkanediyl, $C_{6-8}$ cycloalkanediyl, $C_{1-4}$ alkylcycloalkanediyl, and $C_{8-10}$ alkylarenediyl;

B represents a core of a z-valent polyfunctionalizing agent $B(-V)_z$ wherein:

z is an integer from 3 to 6; and each V is a moiety comprising a terminal group reactive with a thiol group;

each $-V^1-$ is derived from the reaction of $-V$ with a thiol; and each $R^4$ is independently selected from hydrogen and a bond to a polyfunctionalizing agent $B(-V)_z$ through a moiety of Formula (15).

In thiol-terminated monosulfide prepolymers of Formula (15)-(15c), each X can independently be S or O, each X can be S, or each X can be O.

In thiol-terminated monosulfide prepolymers of Formula (15)-(15c), p can be an integer from 2 to 5, or p can be 2, 3, 4, or 5.

In thiol-terminated monosulfide prepolymers of Formula (15)-(15c), q can be an integer from 1 to 5, q can be an integer from 2 to 5, or q can be 0, 1, 2, 3, 4, or 5.

In thiol-terminated monosulfide prepolymers of Formula (15)-(15c), n can be an integer from 2 to 60, from 3 to 60, or from 25 to 35.

In thiol-terminated monosulfide prepolymers of Formula (15)-(15c), each R can independently be selected from $C_{2-10}$ alkanediyl and $C_{6-8}$ cycloalkanediyl, each R can be $C_{2-10}$ alkanediyl, or each R can be $C_{6-8}$ cycloalkanediyl.

In thiol-terminated monosulfide prepolymers of Formula (15)-(15c), each R can be selected from $C_{2-6}$ alkanediyl, $C_{2-4}$ alkanediyl, $C_{3-10}$ alkanediyl, and $C_{3-6}$ alkanediyl.

In thiol-terminated monosulfide prepolymers of Formula (15)-(15c), each R can be selected from ethanediyl, 1,3-propanediyl, 1,2-propanediyl, 1,4-butanediyl, and 1,3-butanediyl.

In thiol-terminated monosulfide prepolymers of Formula (15)-(15c), each $R^1$ can independently be selected from $C_{1-10}$ alkanediyl and $C_{6-8}$ cycloalkanediyl, each R can be $C_{1-10}$ alkanediyl, or each $R^1$ can be $C_{6-8}$ cycloalkanediyl.

In thiol-terminated monosulfide prepolymers of Formula (15)-(15c), each $R^1$ can be selected from $C_{1-6}$ alkanediyl, $C_{1-4}$ alkanediyl, $C_{2-10}$ alkanediyl, and $C_{2-6}$ alkanediyl.

In thiol-terminated monosulfide prepolymers of Formula (15)-(15c), each $R^1$ can be selected from methanediyl, ethanediyl, 1,3-propanediyl, 1,2-propanediyl, 1,4-butanediyl, and 1,3-butanediyl.

In thiol-terminated monosulfide prepolymers of Formula (15)-(15c), each $R^2$ can independently be selected from $C_{2-10}$ alkanediyl and $C_{6-8}$ cycloalkanediyl, each $R^2$ can be $C_{2-10}$ alkanediyl, or each $R^2$ can be $C_{6-8}$ cycloalkanediyl.

In thiol-terminated monosulfide prepolymers of Formula (15)-(15c), each $R^2$ can be selected from $C_{2-6}$ alkanediyl, $C_{2-4}$ alkanediyl, $C_{3-10}$ alkanediyl, and $C_{3-6}$ alkanediyl.

In thiol-terminated monosulfide prepolymers of Formula (15)-(15c), each $R^2$ can be selected from ethanediyl, 1,3-propanediyl, 1,2-propanediyl, 1,4-butanediyl, and 1,3-butanediyl.

In thiol-terminated monosulfides of Formula (15)-(15c), p can be 2, q can be 1 or 2, n can be an integer from 1 to 60 or an integer from 25 to 35, each X can be O or S, each R can be $C_{2-4}$ alkanediyl, each $R^1$ can be $C_{1-4}$ alkanediyl, and each $R^2$ can be $C_{2-4}$ alkanediyl.

In thiol-terminated monosulfide prepolymers of Formula (15)-(15c), p can be 2, q can be 1 or 2, n can be an integer from 1 to 60 or an integer from 25 to 35, each X can be O or S, each R can be $C_2$ alkanediyl, each $R^1$ can be $C_1$ alkanediyl, and each $R^2$ can be $C_2$ alkanediyl.

In thiol-terminated monosulfide prepolymers of Formula (15)-(15c), p can be 2, q can be 1 or 2, n can be an integer from 1 to 60 or an integer from 25 to 35, each X can be O, each R can be $C_2$ alkanediyl, each $R^1$ can be $C_1$ alkanediyl, and each $R^2$ can be $C_2$ alkanediyl.

In thiol-terminated monosulfide prepolymers of Formula (15)-(15c), $B(-V)_z$ can be derived from 1,2,3-trichloropropane, 1,1,1-tris(chloromethyl)propane, 1,1,1-tris(chloromethyl)ethane, 1,3,5-tris(chloromethyl)benzene, and a combination of any of the foregoing.

In thiol-terminated monosulfide prepolymers of Formula (15c) each $R^4$ can independently be selected from hydrogen and a bond to a polyfunctionalizing agent $B(V)_z$ through a moiety of Formula (15). In thiol-terminated monosulfide prepolymer can have an average thiol functionality, for example, from 2.05 to 2.9, such as from 2.1 to 2.8, or from 2.2 to 2.6.

Thiol-terminated monosulfide prepolymers of Formula (15)-(15c) can be prepared by reacting an α,ω-dihalo organic compounds, a metal hydrosulfide, a metal hydroxide, and an optional polyfunctionalizing agent. Examples of suitable α,ω-dihalo organic compounds include bis(2-chloroethyl)formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene. Methods of synthesizing thiol-terminated monosulfide prepolymers of Formula (14)-(14c) are disclosed, for example, in U.S. Pat. No. 7,875,666, which is incorporated by reference in its entirety.

A thiol-terminated monosulfide prepolymer can comprise a thiol-terminated monosulfide prepolymer comprising a moiety of Formula (16):

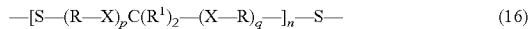  (16)

wherein,
each R can independently be selected from $C_{2-10}$ alkanediyl, such as $C_{2-6}$ alkanediyl; a $C_{3-10}$ branched alkanediyl, such as a $C_{3-6}$ branched alkanediyl or a $C_{3-6}$ branched alkanediyl having one or more pendant groups which can be, for example, alkyl groups, such as methyl or ethyl groups; a $C_{6-8}$ cycloalkanediyl; a $C_{6-14}$ alkylcycloalkyanediyl, such as a $C_{6-10}$ alkylcycloalkanediyl; and a $C_{8-10}$ alkylarenediyl;
each $R^1$ can independently be selected from hydrogen, $C_{1-10}$ alkyl, such as a $C_{1-6}$ n-alkyl, $C_{3-10}$ branched alkyl, such as a $C_{3-6}$ branched alkyl having one or more pendant groups which can be, for example, alkyl groups, such as methyl or ethyl groups; a $C_{6-8}$ cycloalkyl group; a $C_{6-14}$ alkylcycloalkyl, such as a $C_{6-10}$ alkylcycloalkyl; and a $C_{8-10}$ alkylaryl;
each X can independently be selected from O and S;
p is an integer from 1 to 5;
q is an integer from 1 to 5; and
n is an integer from 1 to 60, such as from 2 to 60, from 3 to 60, or from 25 to 35.

A thiol-terminated monosulfide prepolymer can comprise a thiol-terminated monosulfide prepolymer of Formula (16a), a thiol-terminated monosulfide prepolymer of Formula (16b), a thiol-terminated monosulfide prepolymer of Formula (16c), or a combination of any of the foregoing:

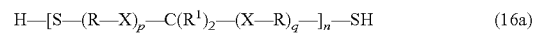  (16a)

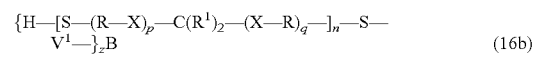  (16b)

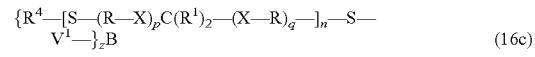  (16c)

wherein,
each R can independently be selected from $C_{2-10}$ alkanediyl, such as $C_{2-6}$ alkanediyl; a $C_{3-10}$ branched alkanediyl, such as a $C_{3-6}$ branched alkanediyl or a $C_{3-6}$ branched alkanediyl having one or more pendant groups which can be, for example, alkyl groups, such as methyl or ethyl groups; a $C_{6-8}$ cycloalkanediyl; a $C_{6-14}$ alkylcycloalkyanediyl, such as a $C_{6-10}$ alkylcycloalkanediyl; and a $C_{5-10}$ alkylarenediyl;
each $R^1$ can independently be selected from hydrogen, $C_{1-10}$ alkyl, such as a $C_{1-6}$ n-alkyl, $C_{3-10}$ branched alkyl, such as a $C_{3-6}$ branched alkyl having one or more pendant groups which can be, for example, alkyl groups, such as methyl or ethyl groups; a $C_{6-8}$ cycloalkaneyl group; a $C_{6-14}$ alkylcycloalkaneyl, such as a $C_{6-10}$ alkylcycloalkaneyl; and a $C_{8-10}$ alkylarenediyl;
each X can independently be selected from O and S;
p is an integer from 1 to 5;
q is an integer from 1 to 5;
n is an integer from 1 to 60, such as from 2 to 60, from 3 to 60, or from 25 to 35;
B represents a core of a z-valent polyfunctionalizing agent $B(-V)_z$ wherein:
z is an integer from 3 to 6; and
each V is a moiety comprising a terminal group reactive with a thiol group;
each $-V^1-$ is derived from the reaction of $-V$ with a thiol; and
each $R^4$ is independently selected from hydrogen and a bond to a polyfunctionalizing agent $B(-V)_z$ through a moiety of Formula (16).

In thiol-terminated monosulfide prepolymers of Formula (16)-(16c) each X can independently be selected from S and O; p is an integer from 1 to 5; q is an integer from 1 to 5; n is an integer from 1 to 60; each R can independently be $C_{2-10}$ alkanediyl; each $R^1$ can be independently selected from hydrogen and $C_{1-10}$ alkanediyl; B represents a core of a z-valent polyfunctionalizing agent $B(-V)_z$ wherein: z is an integer from 3 to 6; and each V is a moiety comprising a terminal group reactive with a thiol group; each $-V^1-$ is derived from the reaction of $-V$ with a thiol; and each $R^4$ is independently hydrogen or is bonded to a polyfunctionalizing agent $B(-V)_z$ through a moiety of Formula (16).

In thiol-terminated monosulfide prepolymers of Formula (16)-(16c), each X can be S, or each X can be O.

In thiol-terminated monosulfide prepolymers of Formula (16)-(16c), p can be an integer from 2 to 5, or q can be 1, 2, 3, 4, or 5.

In thiol-terminated monosulfide prepolymers of Formula (16)-(16c), p can be an integer from 2 to 5, or q can be 1, 2, 3, 4, or 5.

In thiol-terminated monosulfide prepolymers of Formula (16)-(16c), n can be an integer from 2 to 60, from 3 to 60, or from 25 to 35.

In thiol-terminated monosulfide prepolymers of Formula (16)-(16c), each R can independently be selected from $C_{2-6}$ alkanediyl and $C_{2-4}$ alkanediyl.

In thiol-terminated monosulfide prepolymers of Formula (16)-(16c), each R can be selected from ethanediyl, 1,3-propanediyl, 1,2-propanediyl, 1,4-butanediyl, and 1,3-butanediyl.

In thiol-terminated monosulfide prepolymers of Formula (16)-(16c), each R can be selected from $C_{2-10}$ n-alkyl, $C_{3-10}$ branched alkyl, and a combination thereof.

In thiol-terminated monosulfide prepolymers of Formula (16)-(16c), each $R^1$ can independently be selected from hydrogen and $C_{2-6}$ alkyl.

In thiol-terminated monosulfide prepolymers of Formula (16)-(16c), each $R^1$ can independently be selected from hydrogen, methyl, ethyl, propyl, isopropyl, butyl, isobutyl, and tert-butyl.

In thiol-terminated monosulfide prepolymers of Formula (16)-(16c), each $R^1$ can be selected from $C_{1-10}$ n-alkyl, $C_{1-10}$ branched alkyl, and a combination thereof.

In thiol-terminated monosulfide prepolymers of Formula (16)-(16c), each X is O, p is 1 or 2, q is 1 or 2, n is 1 to 60 such as 2 to 60, each R is $C_{2-4}$ alkanediyl such as ethanediyl, and each $R^1$ is hydrogen.

In thiol-terminated monosulfide prepolymers of Formula (16)-(16c), each X is O, p is 1, q is 1, n is 1 to 60 such as 2 to 60, each R is $C_{2-4}$ alkanediyl such as ethanediyl, and each $R^1$ is hydrogen.

In thiol-terminated monosulfide prepolymers of Formula (16)-(16c), each X is O, p is 2, q is 2, n is 1 to 60 such as 2 to 60, each R is $C_{2-4}$ alkanediyl such as ethanediyl, and each $R^1$ is hydrogen.

In thiol-terminated monosulfide prepolymers of Formula (16)-(16c), B(—V)$_z$ can be derived from 1,2,3-trichloropropane, 1,1,1-tris(chloromethyl)propane, 1,1,1-tris(chloromethyl)ethane, 1,3,5-tris(chloromethyl)benzene, and a combination of any of the foregoing.

Thiol-terminated monosulfide prepolymers of Formula (16)-(16c) can be prepared by reacting an α,ω-dihalo organic compound, a metal hydrosulfide, a metal hydroxide, and an optional polyfunctionalizing agent. Examples of suitable α,ω-dihalo organic compounds include bis(2-chloroethyl)formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene. Methods of synthesizing thiol-terminated monosulfides of Formula (16)-(16c) are disclosed, for example, in U.S. Pat. No. 8,466,220, which is incorporated by reference in its entirety.

Thiol-terminated monosulfide prepolymers can have a number average molecular weight within a range from 300 Daltons to 10,000 Daltons, such as within a range 1,000 Daltons to 8,000 Daltons, where the molecular weight is determined by gel-permeation. Thiol-terminated monosulfide prepolymers can have a glass transition temperature $T_g$ less than −40° C., less than −55° C., or less than −60° C. The glass transition temperature $T_g$ is determined by Dynamic Mechanical Analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

A thiol-terminated sulfur-containing prepolymer can comprise a thiol-terminated polysulfide prepolymer. A polysulfide prepolymer refers to a prepolymer that contains one or more polysulfide linkages, i.e., —S$_x$— linkages, where x is from 2 to 4, in the prepolymer backbone and/or in pendant positions on the prepolymer chain. A polysulfide prepolymer can have two or more sulfur-sulfur linkages. Suitable polysulfides are commercially available, for example, from AkzoNobel and Toray Industries, Inc. under the names Thioplast® and from Thiokol-LP®, respectively.

Examples of suitable polysulfide prepolymers are disclosed, for example, in U.S. Pat. Nos. 4,623,711; 6,172,179; 6,509,418; 7,009,032; and 7,879,955, each of which is incorporated by reference in its entirety.

Examples of suitable thiol-terminated polysulfides include Thioplast™ G polysulfides such as Thioplast™ G1, Thioplast™ G4, Thioplast™ G10, Thioplast™ G12, Thioplast™ G21, Thioplast™ G22, Thioplast™ G44, Thioplast™ G122, and Thioplast™ G131, which are commercially available from AkzoNobel. Thioplast™ G resins are liquid polysulfide polymers that are blends of di- and tri-functional molecules where the difunctional polysulfide polymers have the structure of Formula (17):

SH—(—R—S—S—)$_n$—R—SH        (17)

and the trifunctional polysulfide polymers have the structure of Formula (18):

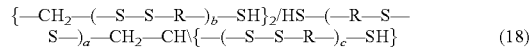

{—CH$_2$—(—S—S—R—)$_b$—SH}$_2$/HS—(—R—S—S—)$_a$—CH$_2$—CH\{—(—S—S—R—)$_c$—SH}        (18)

where each R is —(CH$_2$)$_2$—O—CH$_2$—O—(CH$_2$)$_2$—, and n=a+b+c, where the value for n may be from 7 to 38 depending on the amount of the trifunctional cross-linking agent (1,2,3,-trichloropropane; TCP) used during synthesis of the polysulfide polymer. Thioplast™ G polysulfides can have a number average molecular weight from less than 1,000 Daltons to 6,500 Daltons, a SH content from 1% to greater than 5.5%, and a cross-linking density from 0% to 2.0%. Sulfur content can be determined using the methods described in ASTM D4294

Examples of suitable thiol-terminated polysulfide prepolymers also include Thiokol™ LP polysulfides available from Toray Industries, Inc. such as Thiokol™ LP2, Thiokol™ LP3, Thiokol™ LP12, Thiokol™ LP23, Thiokol™ LP33, and Thiokol™ LP55. Thiokol™ LP polysulfides have a number average molecular weight from 1,000 Daltons to 7,500 Daltons, a SH content from 0.8% to 7.7%, and a cross-linking density from 0% to 2%. Thiokol LP® polysulfides have the general structure of Formula (19):

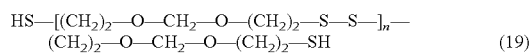

HS—[(CH$_2$)$_2$—O—CH$_2$—O—(CH$_2$)$_2$—S—S—]$_n$—(CH$_2$)$_2$—O—CH$_2$—O—(CH$_2$)$_2$—SH        (19)

where n can be such that the number average molecular weight from 1,000 Daltons to 7,500 Daltons, such a, for example an integer from 8 to 80.

A thiol-terminated sulfur-containing prepolymer can comprise a Thiokol-LP® polysulfide, a Thioplast® G polysulfide, or a combination thereof.

A thiol-terminated polysulfide prepolymer can comprise a thiol-terminated polysulfide prepolymer of Formula (20):

HS—R—(S$_y$—R)$_t$—SH        (20)

where, t is an integer from 1 to 60;

each R can independently be selected from branched alkanediyl, branched arenediyl, and a moiety having the structure —(CH$_2$)$_p$—O—(CH$_2$)$_q$—O—(CH$_2$)$_r$—;

q is an integer from 1 to 8;
p is an integer from 1 to 10;
r is an integer from 1 to 10; and
y has an average value within a range from 1.0 to 1.5.

In thiol-terminated polysulfide prepolymers of Formula (20), t can be, for example, an integer from 2 to 60, from 1 to 40, or from 1 to 20.

In thiol-terminated polysulfide prepolymers of Formula (20), q can be, for example, an integer from 1 to 6, or an integer from 1 to 4. For example, q can be 1, 2, 3, 4, 5 or 6.

In thiol-terminated polysulfide prepolymers of Formula (20), each p can be, for example, an integer from 1 to 6 or from 1 to 4. For example, each p can be 1, 2, 3, 4, 5, 6, 7, 8, 9, or 10.

In thiol-terminated polysulfide prepolymers of Formula (20), each r can be, for example, an integer from 1 to 6 or from 1 to 4. For example, each p can be 1, 2, 3, 4, 5, 6, 7, 8, 9, or 10.

In thiol-terminated polysulfide prepolymers of Formula (20), y can have a value of 1.

In thiol-terminated polysulfide prepolymers of Formula (20), y can have an average value, for example, of 1, such as from 1.05 to 2, or from 1.1 to 1.8.

In thiol-terminated polysulfide prepolymers of Formula (20), R can be —$(CH_2)_p$—O—$(CH_2)_q$—O—$(CH_2)_r$—.

In thiol-terminated polysulfide prepolymers of Formula (20), R can be —$(CH_2)_p$—O—$(CH_2)_q$—O—$(CH_2)_r$—, each q can be 1, 2, 3, or 4, and each p and r can be 1 or 2.

In thiol-terminated polysulfide prepolymers of Formula (20), 0% to 20% of the R groups can comprise branched alkanediyl or branched arenediyl, and 80% to 100% of the R groups can be —$(CH_2)_p$—O—$(CH_2)_q$—O—$(CH_2)_r$—.

In thiol-terminated polysulfide prepolymers of Formula (20), a branched alkanediyl or a branched arenediyl can be —$R^1(-A)_n$- where $R^1$ is a hydrocarbon group, n is 1 or 2, and A is a branching point. A branched alkanediyl can have the structure —$CH_2$(—CH(—$CH_2$—)—.

Thiol-terminated polysulfide prepolymers of Formula (20) can be prepared by reacting an α,ω-dihalo organic compound, a metal hydrosulfide, a metal hydroxide, and an optional polyfunctionalizing agent. Examples of suitable α,ω-dihalo organic compounds include bis(2-chloroethyl) formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene.

Examples of thiol-terminated polysulfide prepolymers of Formula (20) are disclosed, for example, in U.S. Application Publication No. 2016/0152775, in U.S. Pat. No. 9,079,833, and in U.S. Pat. No. 9,663,619.

A thiol-terminated polysulfide prepolymer can comprise a thiol-terminated polysulfide prepolymer of Formula (21):

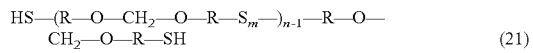

(21)

where R is $C_{2-4}$ alkanediyl, m is an integer from 1 to 8, and n is an integer from 2 to 370.

In thiol-terminated polysulfide prepolymers of Formula (21), m can have an average value, for example, greater than 1, such as from 1.05 to 2, or from 1.1 to 1.8.

In thiol-terminated polysulfide prepolymers of Formula (21), m can be, for example, an integer from 1 to 6, and integer from 1 to 4, or the integer 1, 2, 3, 4, 5, 6, 7, or 8.

In thiol-terminated polysulfide prepolymers of Formula (21), n can be, for example, an integer from 2 to 200 or an integer from 2 to 100.

In thiol-terminated polysulfide prepolymers of Formula (21), each R can independently be selected from ethanediyl, 1,3-propanediyl, 1,1-propanediyl, 1,2-propanediyl, 1,4-butanediyl, 1,1-butanediyl, 1,2-butanediyl, and 1,3-butanediyl.

Examples of thiol-terminated polysulfide prepolymers of Formula (21) are disclosed, for example, in Japanese Application Publication No. JP 62-53354.

Thiol-terminated polysulfide prepolymers can be liquid at room temperature. Thiol-terminated monosulfide prepolymers can have a viscosity, at 100% solids, of no more than 1,500 poise (150 Pa-sec), such as 40 poise to 500 poise (4 Pa-sec to 50 Pa-sec), at a temperature of about 25° C. and a pressure of about 760 mm Hg (101 kPa) determined according to ASTM D-2849 § 79-90 using a Brookfield CAP 2000 viscometer.

Thiol-terminated polysulfide prepolymers can have a number average molecular weight within a range from 300 Daltons to 10,000 Daltons, such as from 1,000 Daltons to 8,000 Daltons, where the molecular weight is determined by gel-permeation chromatography using a polystyrene standard. Thiol-terminated polysulfide prepolymers can have a glass transition temperature $T_g$ less than −40° C., less than −55° C., or less than −60° C. The glass transition temperature $T_g$ is determined by Dynamic Mechanical Analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

A sulfur-containing prepolymer can comprise a sulfur-containing perfluoroether, a perfluorosilicone prepolymer, or a combination thereof.

Compositions provided by the present disclosure can comprise a suitable curing agent. A curing agent can be selected to react with the terminal group of a polythioether prepolymer provided by the present disclosure.

For example, for a thiol-terminated prepolymer provided by the present disclosure, a suitable curing agent can be a polyalkenyl compound, a polyepoxide, a polyisocyanate, or a polyfunctional Michael addition donor.

Examples of useful curing agents that are reactive with alkenyl groups include dithiols and polythiols, examples of which are disclosed herein.

Sulfur-containing bis(alkenyl) ethers and sulfur-containing multifunctional(alkenyl) ethers provided by the present disclosure may also be used as curing agents. For example, a polyalkenyl curing agent may comprise a sulfur-containing bis(alkenyl) ether of Formula (3) and/or a sulfur-containing multifunctional(alkenyl) ether of Formula (10). A polyalkenyl curing agent may comprise a sulfur-containing bis (alkenyl) ether provided by the present disclosure and one or more additional polyalkenyl curing agents such as any of those disclosed herein, including any of the divinyl ethers disclosed herein, such as divinyl ethers of Formula (4).

Examples of useful curing agents that are reactive with isocyanate groups include diamines, polyamines, polythiols, and polyols, including those disclosed herein.

Examples of useful curing agents that are reactive with hydroxyl groups include diisocyanates and polyisocyanates, examples of which are disclosed herein.

Compositions provided by the present disclosure may contain from about 90% to about 150% of the stoichiometric amount, from about 95% to about 125%, or from about 95% to about 105% of the amount of the selected curing agent(s).

Thiol-terminated sulfur-containing bis(alkenyl) ether-containing prepolymers provided by the present disclosure such as the thiol-terminated sulfur-containing bis(alkenyl) ether-containing prepolymers of Formula (2c) and Formula (2d) may also be used with polyalkenyl reactants.

Curing agents can be monomeric low molecular weight compounds or can be polymeric. A low molecular curing agent can have a calculated molecular weight, for example, less than 700 Daltons, less than 500 Daltons, less than 400 Daltons, less than 300 Daltons, or less than 200 Daltons.

A composition can include an approximately equal equivalent number of thiol groups to functional groups of the curing agent such as, for example, within ±10 mol %, within ±5 mol %, within ±2 mol % or within ±1 mol %.

Compositions provided by the present disclosure can be formulated as a sealant or coating, such as a sealant or coating suitable for use in the aerospace industry. For example, a composition formulated as a sealant may comprise fillers, antioxidants, pigments, reactive diluents, adhesion promoters, catalysts, solvents, and combinations of any of the foregoing.

Compositions provided by the present disclosure can include a filler. A filler can be included to improve the physical properties of a cured composition, to reduce the weight of a cured composition, to impart electrical conductivity to a cured composition, or to impart RFI/EMI shielding effectiveness to a cured composition.

Compositions provided by the present disclosure may comprise one or more catalysts. A suitable catalyst can be selected depending on the particular curing chemistry employed by the composition.

For example, for a thermally activated thiol-ene curing chemistry, a suitable catalyst can comprise a primary or secondary amine. For a UV activated thiol-ene curing chemistry, a suitable catalyst can comprise a photoinitiator.

For a thiol-epoxy curing chemistry, a suitable catalyst can comprise an amine such as a tertiary amine.

A catalyst can comprise a blocked catalyst such as a moisture-activated blocked amine catalyst.

For a Michael addition curing chemistry, a suitable catalyst can be an amine catalyst. Examples of suitable amine catalysts for a Michael addition reaction include triethylenediamine (1,4-diazabicyclo[2.2.2]octane, DABCO), dimethylcyclohexylamine (DMCHA), dimethylethanolamine (DMEA), bis-(2-dimethylaminoethyl)ether, N-ethylmorpholine, triethylamine, 1,8-diazabicyclo[5.4.0]undecene-7 (DBU), pentamethyldiethylenetriamine (PMDETA), benzyldimethylamine (BDMA), N,N,N'-trimethyl-N'-hydroxyethyl-bis(aminoethyl)ether, and N'-(3-(dimethylamino)propyl)-N,N-dimethyl-1,3-propanediamine.

Compositions provided by the present disclosure can comprise a sulfur-containing alkenyl ether provided by the present disclosure such as a bifunctional sulfur-containing bis(alkenyl) ether of Formula (3), a sulfur-containing multifunctional(alkenyl) of Formula (10) or a combination thereof. A sulfur-containing bis(alkenyl) ether and/or a sulfur-containing multifunctional(alkenyl) ether may be used, for example, as a curing agent in a composition comprising a thiol-terminated sulfur-containing prepolymer such as a thiol-terminated polythioether, a thiol-terminated polysulfide, a thiol-terminated sulfur-containing polyformal, a thioether, a monosulfide, or a combination of any of the foregoing. A sulfur-containing bis(alkenyl) ether and/or a sulfur-containing multifunctional(alkenyl) ether may be used, for example, as a curing agent in a composition comprising a thiol-terminated sulfur-containing prepolymer, a thiol-terminated polythioether prepolymer of Formula (1c), a thiol-terminated polythioether prepolymer of (1d), or a combination thereof. In such compositions, a sulfur-containing poly(alkenyl) ether may be used in combination with other polyalkenyl curing agents.

Compositions provided by the present disclosure may be formulated as sealants. By formulated is meant that in addition to the reactive species forming the cured polymer network, additional material can be added to a composition to impart desired properties to the uncured sealant and/or to the cured sealant. For the uncured sealant, these properties can include viscosity, pH, and/or rheology. For cured sealants, these properties can include weight, adhesion, corrosion resistance, color, glass transition temperature, electrical conductivity, cohesion, and/or physical properties such as tensile strength, elongation, and hardness. Compositions provided by the present disclosure may comprise one or more additional components suitable for use in aerospace sealants and depend at least in part on the desired performance characteristics of the cured sealant under conditions of use.

Compositions provided by the present disclosure can comprise one or more adhesion promoters. The composition may contain from 0.1 wt % to 15 wt % of an adhesion promoter, less than 5 wt %, less than 2 wt %, or less than 1 wt % of an adhesion promoter, based on the total dry weight of the composition. Examples of adhesion promoters include phenolics, such as Methylon® phenolic resin, and organosilanes, such as epoxy-, mercapto- or amino-functional silanes, including, for example, Silquest® A-187 and Silquest® A-1100. Other useful adhesion promoters are known in the art.

Suitable adhesion promoters include sulfur-containing adhesion promoters such as those disclosed in U.S. Pat. Nos. 8,513,339; 8,952,124; and 9,056,949; and U.S. Application Publication No. 2014/0051789, each of which is incorporated by reference.

Compositions provided by the present disclosure may comprise one or more different types of filler. Suitable fillers include those commonly known in the art, including inorganic fillers, such as carbon black and calcium carbonate ($CaCO_3$), silica, polymer powders, and lightweight fillers. Examples of electrically non-conductive fillers include materials such as, but not limited to, calcium carbonate, mica, polyamide, fumed silica, molecular sieve powder, microspheres, titanium dioxide, chalks, alkaline blacks, cellulose, zinc sulfide, heavy spar, alkaline earth oxides, and alkaline earth hydroxides. A composition can include 5 wt % to 60 wt % of a filler or combination of fillers, 10 wt % to 50 wt %, or from 20 wt % to 40 wt %, based on the total dry weight of the composition. Compositions provided by the present disclosure may further include one or more colorants, thixotropic agents, accelerators, fire retardants, adhesion promoters, solvents, masking agents, or a combination of any of the foregoing. As can be appreciated, fillers and additives employed in a composition may be selected so as to be compatible with each other as well as the polymeric component, curing agent, and or catalyst.

Compositions provided by the present disclosure can include low density filler particles. Low density particles refer to particles that have a specific gravity of no more than 0.7, no more than 0.25, or no more than 0.1. Suitable lightweight filler particles often fall within two categories—microspheres and amorphous particles. The specific gravity of microspheres may range from 0.1 to 0.7 and include, for example, polystyrene foam, microspheres of polyacrylates and polyolefins, and silica microspheres having particle sizes ranging from 5 microns to 100 microns and a specific gravity of 0.25 (Eccospheres®). Other examples include alumina/silica microspheres having particle sizes in the range of 5 to 300 microns and a specific gravity of 0.7 (Fillite®), aluminum silicate microspheres having a specific gravity of from about 0.45 to about 0.7 (Z-Light®), calcium carbonate-coated polyvinylidene copolymer microspheres having a specific gravity of 0.13 (Dualite® 6001AE), and calcium carbonate coated acrylonitrile copolymer microspheres such as Dualite® E135, having an average particle size of about 40 µm and a density of 0.135 g/cc (Henkel). Suitable fillers for decreasing the specific gravity of the composition include, for example, hollow microspheres such as Expancel® microspheres (available from AkzoNobel) or Dualite® low density polymer microspheres (available from Henkel). Compositions provided by the present disclosure can include lightweight filler particles comprising an exterior surface coated with a thin coating, such as those described in U.S. Application Publication No. 2010/0041839, which is incorporated by reference in its entirety. Suitable lightweight fillers are also disclosed in U.S. Pat. No. 6,525,168. A light weight filler can comprise polyphenylene sulfide such as disclosed in U.S. Application Publication No. 2016/0257819, which is incorporated by reference in its entirety.

A composition can comprise less than 2 wt % of lightweight particles, less than 1.5 wt %, less than 1.0 wt %, less than 0.8 wt %, less than 0.75 wt %, less than 0.7 wt %, or less than 0.5 wt % of a composition, where wt % is based on the total dry solids weight of the composition.

A composition provided by the present disclosure can comprise light weight fillers that reduce the specific gravity of the composition. For example, a composition can have a specific gravity from 0.8 to 1, 0.7 to 0.9, from 0.75 to 0.85, from 0.9 to 1.2, from 1.0 to 1.2, or about 0.8 or about 1.1. A composition can have a specific gravity from 1.02 to 1.22, from 1.04 to 1.20, from 1.06 to 1.18, from 1.08 to 1.16, from 1.10 to 1.14, or from 1.11 to 1.13. The specific gravity of a composition can be less than about 1.2, less than about 1.1, less than about 1.0, less than 0.9, less than about 0.8, less than about 0.75, less than about 0.7, less than about 0.65, less than about 0.6, or less than about 0.55. Specific gravity refers to the ratio of the density of a substance to the density of water at room temperature and pressure. Density can be measured according to ASTM D 792 Method A.

A composition provided by the present disclosure can comprise an electrically conductive filler. Electrical conductivity and EMI/RFI shielding effectiveness can be imparted to a composition by incorporating conductive materials. The conductive elements can include, for example, metal or metal-plated particles, fabrics, meshes, fibers, and combinations thereof. The metal can be in the form of, for example, filaments, particles, flakes, or spheres. Examples of suitable metals include copper, nickel, silver, aluminum, tin, and steel. Other conductive materials that can be used to impart EMI/RFI shielding effectiveness to polymer compositions include conductive particles or fibers comprising carbon or graphite. Conductive polymers such as polythiophenes, polypyrroles, polyaniline, poly(p-phenylene) vinylene, polyphenylene sulfide, polyphenylene, and polyacetylene can also be used.

Electrically conductive fillers also include high band gap materials such as zinc sulfide and inorganic barium compounds.

Fillers used to impart electrical conductivity and EMI/RFI shielding effectiveness to polymer compositions are well known in the art. Examples of electrically conductive fillers further include electrically conductive noble metal-based fillers such as pure silver; noble metal-plated noble metals such as silver-plated gold; noble metal-plated non-noble metals such as silver plated cooper, nickel or aluminum, for example, silver-plated aluminum core particles or platinum-plated copper particles; noble-metal plated glass, plastic or ceramics such as silver-plated glass microspheres, noble-metal plated aluminum or noble-metal plated plastic microspheres; noble-metal plated mica; and other such noble-metal conductive fillers. Non-noble metal-based materials can also be used and include, for example, non-noble metal-plated non-noble metals such as copper-coated iron particles or nickel-plated copper; non-noble metals, e.g., copper, aluminum, nickel, cobalt; non-noble-metal-plated-non-metals, e.g., nickel-plated graphite and non-metal materials such as carbon black and graphite. Combinations of electrically conductive fillers can also be used to meet the desired conductivity, EMI/RFI shielding effectiveness, hardness, and other properties suitable for a particular application.

The shape and size of the electrically conductive fillers used in compositions of the present disclosure can be any appropriate shape and size to impart EMI/RFI shielding effectiveness to the cured composition. For example, fillers can be of any shape that is generally used in the manufacture of electrically conductive fillers, including spherical, flake, platelet, particle, powder, irregular, fiber, and the like. In certain sealant compositions of the disclosure, a base composition can comprise Ni-coated graphite as a particle, powder or flake. The amount of Ni-coated graphite in a base composition can range from 40 wt % to 80 wt %, or can range from 50 wt % to 70 wt %, based on the total weight of the base composition. An electrically conductive filler can comprise Ni fiber. Ni fiber can have a diameter ranging from 10 µm to 50 µm and have a length ranging from 250 µm to 750 µm. A base composition can comprise, for example, an amount of Ni fiber ranging from 2 wt % to 10 wt %, or from 4 wt % to 8 wt %, based on the total weight of the base composition.

Carbon fibers, particularly graphitized carbon fibers, can also be used to impart electrical conductivity to sealant compositions. Carbon fibers formed by vapor phase pyrolysis methods and graphitized by heat treatment and which are hollow or solid with a fiber diameter ranging from 0.1 micron to several microns, have high electrical conductivity. As disclosed in U.S. Pat. No. 6,184,280, carbon microfibers, nanotubes or carbon fibrils having an outer diameter of less than 0.1 µm to tens of nanometers can be used as electrically conductive fillers. An example of graphitized carbon fiber suitable for conductive compositions of the present disclosure include Panex® 3OMF (Zoltek Companies, Inc., St. Louis, Mo.), a 0.921 µm diameter round fiber having an electrical resistivity of 0.00055 Ω-cm.

The average particle size of an electrically conductive filler can be within a range useful for imparting electrical conductivity to a polymer-based composition. For example, the particle size of the one or more fillers can range from 0.25 µm to 250 µm, from 0.25 µm to 75 µm, or from 0.25 µm to 60 m. Compositions of the present disclosure can comprise Ketjenblack® EC-600 JD (Akzo Nobel, Inc., Chicago, Ill.), an electrically conductive carbon black characterized by an iodine absorption of 1000 mg/g to 11500 mg/g (J0/84-5 test method), and a pore volume of 480 cm$^3$/100 gm to 510 cm$^3$/100 gm (DBP absorption, KTM 81-3504). An electrically conductive carbon black filler can comprise Black Pearls 2000 (Cabot Corporation, Boston, Mass.).

Compositions of the present disclosure can comprise more than one electrically conductive filler and the more than one electrically conductive filler can be of the same or different materials and/or shapes. For example, a sealant composition can comprise electrically conductive Ni fibers, and electrically conductive Ni-coated graphite in the form of powder, particles and/or flakes. The amount and type of electrically conductive filler can be selected to produce a sealant composition which, when cured, exhibits a sheet resistance (four-point resistance) of less than 0.50 $\Omega/cm^2$, or a sheet resistance less than 0.15 $\Omega/cm^2$. The amount and type of filler can also be selected to provide effective EMI/RFI shielding over a frequency range from 1 MHz to 18 GHz.

Galvanic corrosion of dissimilar metal surfaces and the conductive compositions of the present disclosure can be minimized or prevented by adding corrosion inhibitors to the composition, and/or by selecting appropriate conductive fillers. The non-chromate corrosion inhibitors provided by the present disclosure can increase the corrosion resistance of sealants comprising an electrically conductive filler U.S. Pat. Nos. 5,284,888 and 5,270,364 disclose the use of aromatic triazoles to inhibit corrosion of aluminum and steel surfaces that can also be included in a sealant composition provided by the present disclosure. A sacrificial oxygen scavenger such as Zn can be used as a corrosion inhibitor. A corrosion inhibitor can comprise less than 10% by weight of the total weight of the electrically conductive composition. A corrosion inhibitor can comprise an amount ranging from 2 wt % to 8 wt % of the total weight of the electrically conductive composition. Corrosion between dissimilar metal surfaces can also be minimized or prevented by the selection of the type, amount, and properties of the conductive fillers comprising the composition.

An electrically conductive filler can be added to the base component or the accelerator component of a two-part sealant composition. An electrically conductive base composition can comprise an amount of electrically nonconductive filler from 2 wt % to 10 wt % based on the total weight of the base composition, or can range from 3 wt % to 7 wt %. An accelerator composition can comprise an amount of electrically non-conductive filler from less than 6 wt % or from 0.5% to 4% by weight, based on the total weight of the accelerator composition.

A sealant composition can comprise from about 50 wt % to about 90 wt % of a thiol-terminated polythioether prepolymer, from about 60 wt % to about 90 wt %, from about 70 wt % to about 90 wt %, or from about 80 wt % to about 90 wt % of a thiol-terminated polythioether prepolymer, where wt % is based on the total dry solids weight of the sealant composition.

A sealant composition may also include additives such as plasticizers, pigments, surfactants, adhesion promoters, thixotropic agents, fire retardants, masking agents, accelerators (such as amines, including 1,4-diaza-bicyclo[2.2.2]octane, DABCO®), and combinations of any of the foregoing. When used, the additives may be present in a composition in an amount ranging, for example, from about 0 wt % to about 60 wt %. Additives may be present in a composition in an amount ranging from about 25 wt % to 60 wt %.

Uncured sealants provided by the present disclosure can be provided as a two-part system comprising a base component and an accelerator component which can be prepared and stored separately, combined, and mixed at the time of use.

The base component or composition can comprise the thiol-terminated polythioether prepolymer, a catalyst and a first portion of the non-chromate corrosion inhibitor. The accelerator component or composition can comprise the polyepoxide curing agent and a second portion of the non-chromate corrosion inhibitor. The first and second portions can comprise different components of the non-chromate corrosion inhibitor.

The base component and the accelerator component can be formulated to be rendered compatible when combined such that the constituents of the base and accelerator components can intermix and be homogeneously dispersed to provide a sealant composition for application to a substrate. Factors affecting the compatibility of the base and accelerator components include, for example, viscosity, pH, density, and temperature.

Curable compositions provided by the present disclosure can be used as sealants, and in particular, as sealants where low temperature, for example, temperatures less than 0° C., less than −20° C., or less than −40° C., flexibility and resistance to fuel are desirable attributes. For example, curable compositions can be used as aviation and aerospace sealants. A sealant refers to a curable composition that has the ability when cured to resist atmospheric conditions such as moisture and temperature and at least partially block the transmission of materials such as water, water vapor, fuel, solvents, and/or liquids and gases.

Uncured sealant compositions provided by the present disclosure can be formulated as suitable for a particular aerospace sealant application. For example, sealant compositions can be formulated as Class A, Class B, or as Class C fuel resistant aerospace sealants.

A Class A sealant can be formulated for use at service temperatures from −65° F. (−54° C.) to 250° F. (121° C.) with intermittent excursions to 275° F. (135° C.). A Class A sealant is intended to be applied by brushing and can be used, for example, for as brush sealing fasteners in fuel tanks and other aircraft fuselage sealing applications. A Class A sealant can have an initial viscosity from 1 poise to 500 poise (50 Pa-sec).

A Class B sealant can be formulated for use at service temperatures from −65° F. to 250° F. (−54° C. to 121° C.) and is intended for fillet sealing and other aircraft fuselage sealing applications. A Class B sealant can have an initial viscosity from 4,500 poise to 20,000 poise (450 Pa-sec to 2,000 Pa-sec). A Class B sealant can be applied by extrusion, injection gun, or spatula.

A Class C sealant can be formulated for use at service temperatures from −65° F. to 250° F. (−54° C. to 121° C.) and is intended for brush and fay sealing of fuel tanks and other aircraft fuselage sealing applications. A Class C sealant can have an initial viscosity from 500 poise to 4,500 poise (50 Pa-sec to 4,500 Pa-sec). A Class C sealant can be applied by brush, roller, spatula, or extrusion.

Compositions provided by the present disclosure may also comprise sulfur-containing bis(alkenyl) ethers and/or sulfur-containing multifunctional(alkenyl) ethers provided by the present disclosure. The sulfur-containing poly(alkenyl) ethers may function as curing agents or as co-reactants. A sulfur-containing poly(alkenyl) ether curing agent or co-reactant can comprise a difunctional sulfur-containing bis(alkenyl) ether provided by the present disclosure, a sulfur-containing multifunctional(alkenyl) ether provided by the present disclosure, or a combination thereof.

For example, in thiol-ene reactions, some or all of the alkenyl component can comprise a sulfur-containing bis (alkenyl) ether and/or sulfur-containing multifunctional(alkenyl) ether provided the present disclosure. These compositions can be UV-curable compositions or can be cured with an amine catalyst such as a latent amine catalyst.

A sulfur-containing bis(alkenyl) ether and/or sulfur-containing multifunctional(alkenyl) ether provided by the present disclosure may be reacted with a stoichiometric excess of a dithiol or other suitable compound having a terminal functional group and a group reactive with an alkenyl group to provide a terminal-modified sulfur-containing bis(alkenyl) ether and/or terminal-modified sulfur-containing multifunctional(alkenyl) ether.

For example, a sulfur-containing bis(alkenyl) ether of Formula (3) can be reacted with a dithiol of Formula (7) to provide a thiol-terminated sulfur-containing bis(alkenyl) ether of Formula (13):

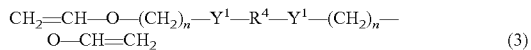 (3)

 (7)

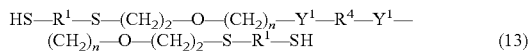 (13)

where n, $Y^1$, $R^4$, $R^1$ in Formula (13) are defined as in Formula (3) and Formula (7).

A terminal-modified alkenyl ether may be added to a composition comprising a terminal-modified polythioether prepolymer, where the terminal-modified alkenyl ether and the terminal-modified polythioether prepolymer have the same terminal functional groups.

A terminal-modified alkenyl ether may be added to a composition comprising a terminal-modified polythioether prepolymer, where the terminal-modified alkenyl ether and the terminal-modified polythioether prepolymer have different terminal functional groups that are co-reactive with the other functional group.

Compositions comprising the polythioether prepolymers provided by the present disclosure can be used as coatings and sealants useful in aerospace applications.

Compositions provided by the present disclosure may be used, for example, in sealants, coatings, encapsulants, and potting compositions. A sealant includes a composition capable of producing a film that has the ability to resist operational conditions, such as moisture and temperature, and at least partially block the transmission of materials, such as water, fuel, and other liquid and gases. A coating composition includes a covering that is applied to the surface of a substrate to, for example, improve the properties of the substrate such as the appearance, adhesion, wettability, corrosion resistance, wear resistance, fuel resistance, and/or abrasion resistance. A potting composition includes a material useful in an electronic assembly to provide resistance to shock and vibration and to exclude moisture and corrosive agents. In particular, sealant compositions provided by the present disclosure are useful as aerospace sealants and can be used, for example, in linings for fuel tanks.

Compositions, such as sealants, may be provided as multi-part compositions, such as two-part compositions, where one part comprises one or more thiol-terminated polythioether prepolymers and a second part comprises one or more polyepoxides. Additives and/or other materials may be added to either part as desired or necessary. The two parts may be combined and mixed prior to use. The working time of the mixed sealant composition can be at least 12 hours, at least 24 hours, at least 48 hours, or more than 48 hours, where working time refers to the period of time the mixed composition remains malleable, e.g., has a sufficiently low viscosity, for application to a surface after mixing.

A composition cures to a tack-free cure within about 24 hours to about 72 hours at a temperature of about 25° C. or higher after the composition is no longer workable. The tack-free time can be determined by the time at which a cotton ball does not adhere to the curing composition. The time to form a viable seal using moisture-curable compositions provide by the present disclosure can depend on several factors as can be appreciated by those skilled in the art, and as defined by the requirements of applicable standards and specification. In general, curable compositions provided by the present disclosure can develop adhesion strength within about 3 days to about 7 days following application to a surface. In general, full adhesion strength as well as other properties of cured compositions provided by the present disclosure can become fully developed within 7 days following mixing and application of a curable composition to a surface.

Compositions provided by the present disclosure can have a working time greater than about 12 hours, and can cure to a hardness of 25 Shore A in from about 150 hours to about 250 hours.

Compositions, including sealants, provided by the present disclosure may be applied to any of a variety of substrates. Examples of substrates to which a composition may be applied include metals such as titanium, stainless steel, steel alloy, aluminum, and aluminum alloy, any of which may be anodized, primed, organic-coated or chromate-coated; epoxy; urethane; graphite; fiberglass composite; Kevlar®; acrylics; and polycarbonates. Compositions provided by the present disclosure may be applied to a substrate such as aluminum and aluminum alloy.

Sealant compositions provided by the present disclosure may be formulated as Class A, Class B, or Class C sealants. A Class A sealant refers to a brushable sealant having a viscosity of 1 poise to 500 poise and is designed for brush application. A Class B sealant refers to an extrudable sealant having a viscosity from 4,500 poise to 20,000 poise (450 Pa-sec to 2,000 Pa-sec) and is designed for application by extrusion via a pneumatic gun. A Class B sealant can be sued to form fillets and sealing on vertical surfaces or edges where low slump/slag is required. A Class C sealant has a viscosity from 500 poise to 4,500 poise (50 Pa-sec to 450 Pa-sec) and is designed for application by a roller or combed tooth spreader. A Class C sealant can be used for fay surface sealing. Viscosity is determined according to ASTM D-2849 § 79-90 at a temperature of 25° C. and a pressure of 760 mm Hg using a Brookfield CAP 2000 viscometer.

Compositions provided by the present disclosure may be applied directly onto the surface of a substrate or over an underlayer by any suitable coating process known to those of ordinary skill in the art.

Furthermore, methods are provided for sealing an aperture utilizing a composition provided by the present disclosure. These methods comprise, for example, providing the curable composition of the present disclosure; applying the curable composition to at least one surface of a part; and curing the applied composition to provide a sealed part.

A composition provided by the present disclosure may be cured under ambient conditions, where ambient conditions refers to a temperature from 20° C. to 25° C., and atmospheric humidity. A composition may be cured under conditions encompassing a temperature from a 0° C. to 100° C. and humidity from 0% relative humidity to 100% relative humidity. A composition may be cured at a higher temperature such as at least 30° C., at least 40° C., or at least 50° C. A composition may be cured at room temperature, e.g., 25° C. A composition may be cured upon exposure to actinic radiation, such as ultraviolet radiation. As will also be appreciated, the methods may be used to seal apertures on aerospace vehicles including aircraft and aerospace vehicles.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within about 3 days to about 7 days following mixing and application to a surface. In general, full adhesion strength as well as other properties of cured compositions of the present disclosure becomes fully developed within 7 days following mixing and application of a curable composition to a surface.

Compositions containing a sulfur-containing bis(alkenyl) ether-containing prepolymer provided by the present disclosure and an polyepoxide curing agent can cure, for example, in from 0.5 hours to 3 hours, from 1 hour to 2.5 hours, or from 1 hour to 2 hours, where time to cure refers the time after mixing the prepolymer and curing agent to the time at which the composition exhibits a Shore A hardness of 30. The curing time to exhibit a hardness of 40 Shore A can range, for example, from 1 hour to 4 hours, from 1.5 hour to 3.5 hour, or from 2 hours to 3 hours. Shore A hardness can be measured according to ASTM D2240.

Cured compositions provided by the present disclosure, such as cured sealants, exhibit properties acceptable for use in aerospace sealant applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF for 7 days, and following immersion in a solution of 3% NaCl according to AMS 3265B test specifications; tensile strength between 300 pounds per square inch (psi) and 400 psi; tear strength greater than 50 pounds per linear inch (pli); elongation between 250% and 300%; and hardness greater than 40 Durometer A. These and other cured sealant properties appropriate for aviation and aerospace applications are disclosed in AMS 3265B, the entirety of which is incorporated by reference. It is also desirable that, when cured, compositions of the present disclosure used in aviation and aircraft applications exhibit a percent volume swell not greater than 25% following immersion for one week at 60° C. (140° F.) and ambient pressure in Jet Reference Fluid (JRF) Type 1. Other properties, ranges, and/or thresholds may be appropriate for other sealant applications.

Cured compositions provided by the present disclosure can be fuel-resistant. The term "fuel resistant" means that a composition, when applied to a substrate and cured, can provide a cured product, such as a sealant, that exhibits a percent volume swell of not greater than 40%, in some cases not greater than 25%, in some cases not greater than 20%, and in other cases not more than 10%, after immersion for one week at 140° F. (60° C.) and ambient pressure in JRF Type I according to methods similar to those described in ASTM D792 (American Society for Testing and Materials) or AMS 3269 (Aerospace Material Specification). JRF Type I, as employed for determination of fuel resistance, has the following composition:toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, § 3.1.1 etc., available from SAE (Society of Automotive Engineers)).

Compositions provided by the present disclosure provide a cured product, such as a sealant, exhibiting a tensile elongation of at least 200% and a tensile strength of at least 200 psi (1.38 MPa) when measured in accordance with the procedure described in AMS 3279, § 3.3.17.1, test procedure AS5127/1, § 7.7. In general, for a Class A sealant there is no tensile and elongation requirement. For a Class B sealant, as a general requirement, tensile strength is equal to or greater than 200 psi (1.38 MPa) and elongation is equal to or greater than 200%. Acceptable elongation and tensile strength can be different depending on the application.

Compositions provide a cured product, such as a sealant, that exhibits a lap shear strength of greater than 200 psi (1.38 MPa), such as at least 220 psi (1.52 MPa), at least 250 psi (1.72 MPa), and, in some cases, at least 400 psi (2.76 MPa), when measured according to the procedure described in SAE AS5127/1 paragraph 7.8.

A cured sealant prepared from a composition provided by the present disclosure meets or exceeds the requirements for aerospace sealants as set forth in AMS 3277.

Apertures, surfaces, joints, fillets, fay surfaces including apertures, surfaces, fillets, joints, and fay surfaces of aerospace vehicles, sealed with compositions provided by the present disclosure are also disclosed. A composition provided by the present disclosure can be used to seal a part. A part can include multiple surfaces and joints. A part can include a portion of a larger part, assembly, or apparatus. A portion of a part can be sealed with a composition provided by the present disclosure or the entire part can be sealed.

Compositions provided by the present disclosure can be used to seal parts exposed or potentially exposed to fluids such as solvents, hydraulic fluids, and/or fuel.

Compositions provided by the present disclosure can be used to seal a part including a surface of a vehicle.

The term "vehicle" is used in its broadest sense and includes all types of aircraft, spacecraft, watercraft, and ground vehicles. For example, a vehicle can include, aircraft such as airplanes including private aircraft, and small, medium, or large commercial passenger, freight, and military aircraft; helicopters, including private, commercial, and military helicopters; aerospace vehicles including, rockets and other spacecraft. A vehicle can include a ground vehicle such as, for example, trailers, cars, trucks, buses, vans, construction vehicles, golf carts, motorcycles, bicycles, trains, and railroad cars. A vehicle can also include watercraft such as, for example, ships, boats, and hovercraft.

A composition provided by the present disclosure can be used in a F/A-18 jet or related aircraft such as the F/A-18E Super Hornet and F/A-18F (produced by McDonnell Douglas/Boeing and Northrop); in the Boeing 787 Dreamliner, 737, 747, 717 passenger jet aircraft, an related aircraft (produced by Boeing Commercial Airplanes); in the V-22 Osprey; VH-92, S-92, and related aircraft (produced by NAVAIR and Sikorsky); in the G650, G600, G550, G500, G450, and related aircraft (produced by Gulfstream); and in the A350, A320, A330, and related aircraft (produced by Airbus). Compositions provided by the present disclosure can be used in any suitable commercial, military, or general aviation aircraft such as, for example, those produced by Bombardier Inc. and/or Bombardier Aerospace such as the Canadair Regional Jet (CRJ) and related aircraft; produced by Lockheed Martin such as the F-22 Raptor, the F-35 Lightning, and related aircraft; produced by Northrop Grumman such as the B-2 Spirit and related aircraft; produced by Pilatus Aircraft Ltd.; produced by Eclipse Aviation Corporation; or produced by Eclipse Aerospace (Kestrel Aircraft).

Compositions provided by the present disclosure can be used to seal parts and surfaces of vehicles such as fuel tank surfaces and other surfaces exposed to or potentially exposed to aerospace solvents, aerospace hydraulic fluids, and aerospace fuels.

The present invention includes parts sealed with a composition provided by the present disclosure, and assemblies and apparatus comprising a part sealed with a composition provided by the present disclosure.

The present invention includes vehicles comprising a part such as a surface sealed with a composition provided by the present disclosure. For example, an aircraft comprising a fuel tank or portion of a fuel tank sealed with a sealant provided by the present disclosure is included within the scope of the invention.

An electrically conductive sealant composition provided by the present disclosure can exhibit the following properties measured at room temperature following exposure at 500° F. (260° C.) for 24 hours: a surface resistivity of less than 1 Ω/square, a tensile strength greater than 200 psi (1.38 MPa), an elongation greater than 100%, and a cohesive failure of 100% measured according to MIL-C-27725.

ASPECTS OF THE INVENTION

Aspect 1. A sulfur-containing bis(alkenyl) ether comprises a structure of Formula (3):

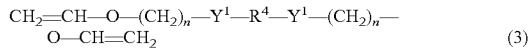  (3)

wherein,
each n is independently an integer from 1 to 4;
each $Y^1$ is independently selected from —O— and —S—; and
$R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and —[(CH$_2$)$_p$—X—]$_q$—(CH$_2$)$_r$—, wherein,
each X is independently selected from —O—, —S—, and —S—S—;
each p is independently an integer from 2 to 6;
q is an integer from 1 to 5; and
r is an integer from 2 to 10; and
at least one $Y^1$ is —S—, or $R^4$ is —[(CH$_2$)$_p$—X—]$_q$—(CH$_2$)$_r$— and at least one X is selected from —S— and —S—S—.

Aspect 2. The sulfur-containing bis(alkenyl) ether of aspect 1, wherein,
each n is 2; and
$R^4$ is selected from $C_{2-6}$ n-alkanediyl and —[(CH$_2$)$_p$—X—]$_q$—(CH$_2$)$_r$—, wherein,
each X is independently selected from —O—, —S—, and —S—S—;
each p is 2;
q is an integer from 1 to 5; and
r is 2.

Aspect 3. The sulfur-containing bis(alkenyl) ether of any one of aspects 1 to 2, wherein the sulfur-containing bis(alkenyl) ether comprises a sulfur-containing bis(alkenyl) ether of Formula (3b), Formula (3d), Formula (3d), Formula (3e), Formula (3f), Formula (3g), Formula (3h), Formula (3i), or a combination of any of the foregoing:

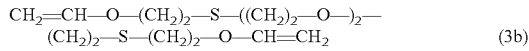  (3b)

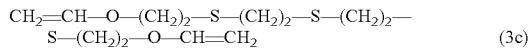  (3c)

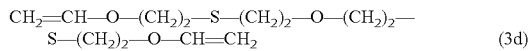  (3d)

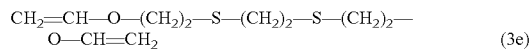  (3e)

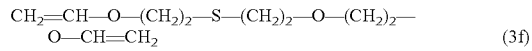  (3f)

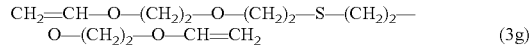  (3g)

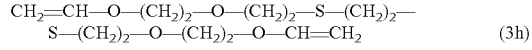  (3h)

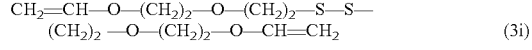  (3i)

Aspect 4. The sulfur-containing bis(alkenyl) ether of any one of aspects 1 to 3, wherein the sulfur-containing bis(alkenyl) ether comprises reaction products of reactants comprising:
(a) a compound of Formula (8):

Y—R$^4$—Y  (8)

wherein,
each Y is independently selected from —OH and —SH; and
$R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and —[(CH$_2$)$_p$—X—]$_q$—(CH$_2$)$_r$—, wherein,
each X is independently selected from —O—, —S—, and —S—S—;
each p is independently an integer from 2 to 6;
q is an integer from 1 to 5; and
r is an integer from 2 to 10; and
at least one Y is —SH, or $R^4$ is —[(CH$_2$)$_p$—X—]$_q$—(CH$_2$)$_r$— and at least one X is selected from —S— and —S—S—; and
(b) a compound of Formula (9):

  (9)

wherein n is an integer from 1 to 4.

Aspect 5. The sulfur-containing bis(alkenyl) ether of aspect 4, wherein,
each n is 2;
$R^4$ is selected from $C_{2-6}$ n-alkanediyl and —[(CH$_2$)$_p$—X—]$_q$—(CH$_2$)$_r$—, wherein,
each X is independently selected from —O—, —S—, and —S—S—;
each p is 2;
q is an integer from 1 to 5; and
r is 2; and
n is 2.

Aspect 6. The sulfur-containing bis(alkenyl) ether of any one of aspects 4 to 5, wherein the sulfur-containing bis(alkenyl) ether comprises a compound of Formula (8a), Formula (8b), Formula (8c), Formula (8d), Formula (8e), Formula (8f), Formula (8g), Formula (8h), or a combination of any of the foregoing:

  (8a)

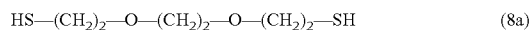  (8b)

  (8c)

  (8d)

  (8e)

  (8f)

HO—(CH₂)₂—S—(CH₂)₂—S—(CH₂)₂—OH         (8g)

HO—(CH₂)₂—S—S—(CH₂)₂—OH         (8h)

Aspect 7. A sulfur-containing multifunctional(alkenyl) ether having the structure of Formula (10):

{CH₂=CH—O—(CH₂)ₙ—Y¹—R⁴—Y¹—(CH₂)ₙ—O—(CH₂)₂—V¹—}ᵤB         (10)

wherein,
each n is independently an integer from 1 to 4;
each $Y^1$ is independently selected from —O— and —S—; and
each $R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and —[(CH₂)ₚ—X—]_q—(CH₂)ᵣ—, wherein,
each X is independently selected from —O—, —S—, and —S—S—;
each p is independently an integer from 2 to 6;
q is an integer from 1 to 5;
r is an integer from 2 to 10;
at least one $Y^1$ is —S—, or $R^4$ is —[(CH₂)ₚ—X—]_q—(CH₂)ᵣ— and at least one X is selected from —S— and —S—S—; and
B comprises a core of a z-valent polyfunctionalizing agent B(—V)_z wherein:
z is an integer from 3 to 6; and
each V is a moiety comprising a terminal group reactive with a terminal alkenyl group; and
each —V¹— is derived from the reaction of —V with an alkenyl group.

Aspect 8. The sulfur-containing multifunctional(alkenyl) ether of aspect 7, wherein, each n is 2;
$R^4$ is selected from $C_{2-6}$ n-alkanediyl and —[(CH₂)ₚ—X—]_q—(CH₂)ᵣ—, wherein,
each X is independently selected from —O—, —S—, and —S—S—;
each p is 2;
q is an integer from 1 to 5; and
r is 2.

Aspect 9. A polythioether prepolymer comprising a moiety of Formula (2):

—S—R¹—[S-A-S—R¹—]ₛ—S—         (2)

wherein,
s is an integer from 1 to 60;
each $R^1$ is independently selected from $C_{2-10}$ alkanediyl, $C_{6-8}$ cycloalkanediyl, $C_{6-10}$ alkanecycloalkanediyl, and —[(CHR)ₚ—X—]_q—(CHR)ᵣ—, wherein each R is independently selected from hydrogen and methyl, wherein,
each X is independently selected from —O— and —S—
each p is independently an integer from 2 to 6;
q is an integer from 1 to 5; and
r is an integer from 2 to 10;
each A is independently selected from a sulfur-containing moiety of Formula (3a) and a moiety of Formula (4a):

—(CH₂)₂—O—(CH₂)ₙ—Y¹—R⁴—Y¹—(CH₂)ₙ—O—(CH₂)₂—         (3a)

—(CH₂)₂—O—(R²—O)ₘ—(CH₂)₂—         (4a)

wherein,
each n is independently an integer from 1 to 4;
each $Y^1$ is independently selected from —O— and —S—;
m is an integer from 0 to 50; and
each $R^2$ is selected from $C_{2-6}$ n-alkanediyl, $C_3$-6 branched alkanediyl, $C_{6-8}$ cycloalkanediyl, $C_{6-10}$ alkanecycloalkanediyl, and —[(CH₂)ₚ—X—]_q—(CH₂)ᵣ—, wherein,
each p is independently an integer from 2 to 6;
q is an integer from 1 to 5; and
r is an integer from 2 to 10;
$R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and —[(CH₂)ₚ—X—]_q—(CH₂)ᵣ—, wherein,
each X is independently selected from —O—, —S—, and —S—S—;
each p is an integer from 2 to 6;
q is an integer from 1 to 5; and
r is an integer from 2 to 10; and
at least one $Y^1$ is —S— or $R^4$ comprises —[(CH₂)ₚ—X—]_q—(CH₂)ᵣ— and at least one X is selected from —S— and —S—S—; and
at least one A comprises a sulfur-containing moiety of Formula (2a).

Aspect 10. The polythioether prepolymer of aspect 9, wherein the polythioether prepolymer comprises from 40 mol % to 60 mol % of the A moieties comprise a moiety of Formula (3a).

Aspect 11. The polythioether prepolymer of any one of aspects 9 to 10, wherein the polythioether prepolymer comprises a terminal group selected from thiol, hydroxyl, isocyanate, alkenyl, epoxy, polyalkoxysilyl, amino, and a Michael acceptor.

Aspect 12. The polythioether prepolymer of any one of aspects 9 to 11, wherein the polythioether prepolymer comprises a difunctional polythioether prepolymer of Formula (2a), a polyfunctional polythioether prepolymer of Formula (2b), or a combination thereof:

R⁶—S—R¹—[S-A-S—R¹—]ₛ—S—R⁶         (2a)

{R⁶—S—R¹—[S-A-S—R¹—]ₛ—S—V¹—}ᵤB         (2b)

wherein,
each $R^6$ is selected from hydrogen and a moiety comprising a terminal functional group;
B comprises a core of a z-valent polyfunctionalizing agent B(—V)_z wherein:
z is an integer from 3 to 6; and
each V is a moiety comprising a terminal group reactive with terminal thiol groups; and
each —V¹— is derived from the reaction of —V with a thiol group.

Aspect 13. The polythioether prepolymer of any one of aspects 9 to 12, wherein the polythioether prepolymer comprises a thiol-terminated polythioether prepolymer of Formula (2c), a thiol-terminated polythioether prepolymer of Formula (2d), or a combination thereof:

HS—R¹—[S-A-S—R¹—]ₛ—SH         (2c)

{HS—R¹—[S-A-S—R¹—]ₛ—S—V¹—}ᵤB         (2d)

wherein,
B comprises a core of a z-valent polyfunctionalizing agent B(—V)_z wherein:
z is an integer from 3 to 6; and
each V is a moiety comprising a terminal group reactive with terminal thiol groups; and
each —V¹— is derived from the reaction of —V with a thiol group.

Aspect 14. A polythioether prepolymer comprising reaction products of reactants comprising:
(a) a polythiol comprising a dithiol of Formula (7):

$$HS-R^1-SH \quad (7)$$

wherein,
$R^1$ is selected from $C_{2-10}$ alkanediyl, $C_{6-8}$ cycloalkanediyl, $C_{6-10}$ alkanecycloalkanediyl, $C_{5-8}$ heterocycloalkanediyl, and $-[(CHR)_p-X-]_q-(CHR)_r-$, wherein:
each p is independently an integer from 2 to 6;
q is an integer from 1 to 5;
r is an integer from 2 to 10;
each R is independently selected from hydrogen and methyl; and
each X is independently selected from $-O-$, $-S-$, and $-NR^5-$, wherein $R^5$ is selected from hydrogen and methyl; and
(b) a sulfur-containing bis(alkenyl) ether of Formula (3):

$$CH_2=CH-O-(CH_2)_n-Y^1-R^4-Y^1-(CH_2)_n-O-CH=CH_2 \quad (3)$$

wherein,
each n is independently an integer from 1 to 4;
each $Y^1$ is independently selected from $-O-$ and $-S-$; and
$R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and $-[(CH_2)_p-X-]_q-(CH_2)_r-$, wherein,
each X is independently selected from $-O-$, $-S-$, and $-S-S-$;
each p is independently an integer from 2 to 6;
q is an integer from 1 to 5;
r is an integer from 2 to 10; and
at least one $Y^1$ is $-S-$, or $R^4$ is $-[(CH_2)_p-X-]_q-(CH_2)_r-$ and at least one X is selected from $-S-$ and $-S-S-$.

Aspect 15. The polythioether prepolymer of aspect 14, wherein the reactants further comprise a divinyl ether of Formula (4):

$$CH_2=CH-O-(R^2-O-)_m-CH=CH_2 \quad (4)$$

wherein,
m is 0 to 50; and
each $R^2$ is selected from $C_{2-6}$ n-alkanediyl, $C_{3-6}$ branched alkanediyl, $C_{6-8}$ cycloalkanediyl, $C_{6-10}$ alkanecycloalkanediyl, and $-[(CH_2)_p-X-]_q-(CH_2)_r-$, wherein,
each X is independently selected from $-O-$, $-S-$, and $-S-S-$;
each p is independently an integer from 2 to 6;
q is an integer from 1 to 5; and
r is an integer from 2 to 10.

Aspect 16. The polythioether prepolymer of any one of aspects 14 to 15, wherein the reactants further comprise a polyfunctionalizing agent of Formula (1):

$$B(-V)_z \quad (1)$$

wherein,
B comprises a core of a z-valent polyfunctionalizing agent $B(-V)_z$;
z is an integer from 3 to 6; and
each $-V$ is independently a moiety comprising a terminal thiol group, a terminal alkenyl group, or a combination thereof.

Aspect 17. The polythioether prepolymer of aspects 15 and 16, wherein the reactants comprise the combination of:
a divinyl ether of Formula (4):

$$CH_2=CH-O-(R^2-O-)_m-CH=CH_2 \quad (4)$$

wherein,
m is an integer from 0 to 50; and
each $R^2$ is selected from $C_{2-6}$ n-alkanediyl, $C_3$-6 branched alkanediyl, $C_{6-8}$ cycloalkanediyl, $C_{6-10}$ alkanecycloalkanediyl, and $-[(CH_2)_p-X-]_q-(CH_2)_r-$, wherein,
each p is independently an integer from 2 to 6;
q is an integer from 1 to 5; and
r is an integer from 2 to 10; and
a polyfunctionalizing agent of Formula (1):

$$B(-V)_z \quad (1)$$

wherein,
B comprises a core of a z-valent polyfunctionalizing agent $B(-V)_z$;
z is an integer from 3 to 6; and
each $-V$ is independently a moiety comprising a terminal thiol group, a terminal alkenyl group, or a combination thereof.

Aspect 18. The polythioether prepolymer of any one of aspects 14 to 17, wherein the reactants further comprise a sulfur-containing multifunctional(alkenyl) ether of Formula (10):

$$\{CH_2=CH-O-(CH_2)_n-Y^1-R^4-Y^1-(CH_2)_n-O-(CH_2)_2-V^1-\}_zB \quad (10)$$

wherein,
each n is independently an integer from 1 to 4;
each $Y^1$ is independently selected from $-O-$ and $-S-$; and
each $R^4$ is independently selected from $C_{2-6}$ n-alkanediyl, $C_{3-6}$ branched alkanediyl, $C_{6-8}$ cycloalkanediyl, $C_{6-10}$ alkanecycloalkanediyl, and $-[(CH_2)_p-X-]_q-(CH_2)_r-$, wherein,
each X is independently selected from $-O-$, $-S-$, and $-S-S-$;
each p is independently an integer from 2 to 6;
q is an integer from 1 to 5;
r is an integer from 2 to 10;
at least one $Y^1$ is $-S-$ or $R^4$ is $-[(CH_2)_p-X-]_q-(CH_2)_r-$ and at least one X is selected from $-S-$ and $-S-S-$;
B comprises a core of a z-valent polyfunctionalizing agent $B(-V)_z$ wherein:
z is an integer from 3 to 6; and
each V is a moiety comprising a terminal group reactive with a terminal alkenyl group; and
each $-V^1-$ is derived from the reaction of $-V$ with an alkenyl group;

Aspect 19. A composition comprising:
(a) a sulfur-containing bis(alkenyl) ether of Formula (3):

$$CH_2=CH-O-(CH_2)_n-Y^1-R^4-Y^1-(CH_2)_n-O-CH=CH_2 \quad (3)$$

wherein,
each n is independently an integer from 1 to 4;
each $Y^1$ is independently selected from $-O-$ and $-S-$; and
$R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and $-[(CH_2)_p-X-]_q-(CH_2)_r-$, wherein,
each X is independently selected from $-O-$, $-S-$, and $-S-S-$;
each p is independently an integer from 2 to 6;
q is an integer from 1 to 5; and r is an integer from 2 to 6; and
at least one $Y^1$ is —S—, or $R^4$ is —[(CH$_2$)$_p$—X—]$_q$—(CH$_2$)$_r$— and at least one X is selected from —S— and —S—S—; or (b) a sulfur-containing poly(alkenyl) ether of Formula (10):

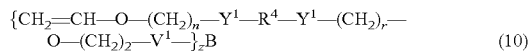
{CH$_2$=CH—O—(CH$_2$)$_n$—Y$^1$—R$^4$—Y$^1$—(CH$_2$)$_r$—O—(CH$_2$)$_2$—V$^1$—}$_z$B  (10)

wherein,
each n is independently an integer from 1 to 4;
each $Y^1$ is independently selected from —O— and —S—; and
each $R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and —[(CH$_2$)$_p$—X—]$_q$—(CH$_2$)$_r$—, wherein,
each X is independently selected from —O—, —S—, and —S—S—;
each p is independently an integer from 2 to 6;
q is an integer from 1 to 5;
r is an integer from 2 to 10;
at least one $Y^1$ is —S—, or $R^4$ is —[(CH$_2$)$_p$—X—]$_q$—(CH$_2$)$_r$— and at least one X is selected from —S— and —S—S—;
B comprises a core of a z-valent polyfunctionalizing agent B(—V)$_z$ wherein:
z is an integer from 3 to 6; and
each V is a moiety comprising a terminal group reactive with a terminal alkenyl group; and
each —V$^1$— is derived from the reaction of —V with an alkenyl group;

(c) or a combination of (a) and (b).

Aspect 20. The composition of aspect 19, wherein the composition further comprises a thiol-terminated sulfur-containing prepolymer.

Aspect 21. A part sealed with a composition comprising the sulfur-containing poly(alkenyl) ether of any one of aspects 1 to 8.

Aspect 22. A method of sealing a part, comprising applying a composition comprising the sulfur-containing poly(alkenyl) ether of any one of aspects 1 to 8 to a part; and curing the applied composition to seal the part.

Aspect 23. A composition comprising the polythioether prepolymer of any one of aspects 9 to 18.

Aspect 24. A part sealed with a composition comprising the polythioether prepolymer of any one of aspects 9 to 18.

Aspect 25. A method of sealing a part, comprising applying a composition comprising the polythioether prepolymer of any one of aspects 9 to 18 to a part; and curing the applied composition to seal the part.

Aspect 1A. A sulfur-containing multifunctional(alkenyl) ether of Formula (10):

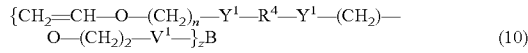
{CH$_2$=CH—O—(CH$_2$)$_n$—Y$^1$—R$^4$—Y$^1$—(CH$_2$)—O—(CH$_2$)$_2$—V$^1$—}$_z$B  (10)

wherein,
each n is independently an integer from 1 to 4;
each $Y^1$ is independently selected from —O— and —S—; and
each $R^4$ is independently selected from $C_{2-6}$ n-alkanediyl, $C_{3-6}$ branched alkanediyl, $C_{6-8}$ cycloalkanediyl, $C_{6-10}$ alkanecycloalkanediyl, and —[(CH$_2$)$_p$—X—]$_q$—(CH$_2$)$_r$—, wherein,
each X is independently selected from —O—, —S—, and —S—S—;
each p is independently an integer from 2 to 6;
q is an integer from 1 to 5;
r is an integer from 2 to 10;
at least one $Y^1$ is —S—, or $R^4$ is —[(CH$_2$)$_p$—X—]$_q$—(CH$_2$)$_r$— and at least one X is selected from —S— and —S—S—; and
B is a core of a z-valent polyfunctionalizing agent B(—V)$_z$ wherein:
z is an integer from 3 to 6; and
each V is a moiety comprising a terminal group reactive with a terminal alkenyl group; and
each —V$^1$— is derived from the reaction of V with an alkenyl group.

Aspect 2A. The sulfur-containing multifunctional(alkenyl) ether of aspect 1A, wherein,
each n is 2; and
each $R^4$ is selected from $C_{2-6}$ n-alkanediyl and —[(CH$_2$)$_p$—X—]$_q$—(CH$_2$)$_r$—, wherein,
each X is independently selected from —O—, —S—, and —S—S—;
each p is 2;
q is an integer from 1 to 5; and
r is 2.

Aspect 3A. The sulfur-containing multifunctional(alkenyl) ether of any one of aspects 1A to 2A, wherein each —Y$^1$—R$^4$—Y$^1$— is independently selected from a moiety of Formula (8a1), Formula (8b1), Formula (8c1), Formula (8d1), Formula (8e1), Formula (8f1), Formula (8g1), Formula (8h1), or a combination of any of the foregoing:

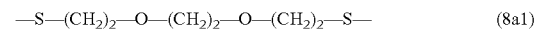
—S—(CH$_2$)$_2$—O—(CH$_2$)$_2$—O—(CH$_2$)$_2$—S—  (8a1)

—S—(CH$_2$)$_2$—S—(CH$_2$)$_2$—S—  (8b1)

—S—(CH$_2$)$_2$—O—(CH$_2$)$_2$—S—  (8c1)

—S—(CH$_2$)$_2$—S—  (8d1)

—S—(CH$_2$)$_2$—O—  (8e1)

—O—(CH$_2$)$_2$—S—(CH$_2$)$_2$—O—  (8f1)

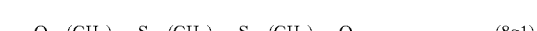
—O—(CH$_2$)$_2$—S—(CH$_2$)$_2$—S—(CH$_2$)$_2$—O—  (8g1)

—O—(CH$_2$)$_2$—S—S—(CH$_2$)$_2$—O—  (8h1)

Aspect 4A. The sulfur-containing multifunctional(alkenyl) ether of any one of aspects 1A to 3A, wherein the sulfur-containing multifunctional(alkenyl) ether comprises reaction products of reactants comprising:
a sulfur-containing bis(alkenyl) ether of Formula (3):

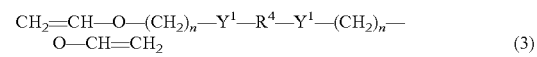
CH$_2$=CH—O—(CH$_2$)$_n$—Y$^1$—R$^4$—Y$^1$—(CH$_2$)$_n$—O—CH=CH$_2$  (3)

and a polyfunctionalizing agent B(—V)$_z$.

Aspect 5A. The sulfur-containing multifunctional(alkenyl) ether of any one of aspects 1A to 4A, wherein the sulfur-containing multifunctional(alkenyl) ether comprises a sulfur-containing multifunctional(alkenyl) ether of Formula (10b), Formula (10c), Formula (10d), Formula (10e), Formula (10f), Formula (10g), Formula (10h), Formula (10i), or a combination of any of the foregoing:

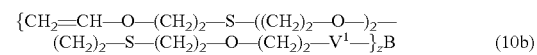
{CH$_2$=CH—O—(CH$_2$)$_2$—S—((CH$_2$)$_2$—O—)$_2$—(CH$_2$)$_2$—S—(CH$_2$)$_2$—O—(CH$_2$)$_2$—V$^1$—}$_z$B  (10b)

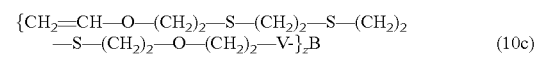
{CH$_2$=CH—O—(CH$_2$)$_2$—S—(CH$_2$)$_2$—S—(CH$_2$)$_2$—S—(CH$_2$)$_2$—O—(CH$_2$)$_2$—V-}$_z$B  (10c)

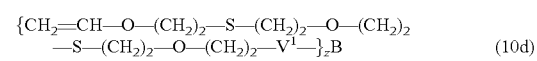
{CH$_2$=CH—O—(CH$_2$)$_2$—S—(CH$_2$)$_2$—O—(CH$_2$)$_2$—S—(CH$_2$)$_2$—O—(CH$_2$)$_2$—V$^1$—}$_z$B  (10d)

$\{CH_2\!=\!CH\!-\!O\!-\!(CH_2)_2\!-\!S\!-\!(CH_2)_2\!-\!S\!-\!(CH_2)_2$
$\quad-\!O\!-\!(CH_2)_2\!-\!V^1\!-\!\}_zB$ (10e)

$\{CH_2\!=\!CH\!-\!O\!-\!(CH_2)_2\!-\!S\!-\!(CH_2)_2\!-\!O\!-\!(CH_2)_2$
$\quad-\!O\!-\!(CH_2)_2\!-\!V^1\!-\!\}_zB$ (10f)

$\{CH_2\!=\!CH\!-\!O\!-\!(CH_2)_2\!-\!O\!-\!(CH_2)_2\!-\!S\!-\!(CH_2)_2$
$\quad-\!O\!-\!(CH_2)_2\!-\!O\!-\!(CH_2)_2\!-\!V^1\!-\!\}_zB$ (10g)

$\{CH_2\!=\!CH\!-\!O\!-\!(CH_2)_2\!-\!O\!-\!(CH_2)_2\!-\!S\!-\!(CH_2)_2$
$\quad-\!S\!-\!(CH_2)_2\!-\!O\!-\!(CH_2)_2\!-\!O\!-\!(CH_2)_2\!-$
$\quad V^1\!-\!\}_zB$ (10h)

$\{CH_2\!=\!CH\!-\!O\!-\!(CH_2)_2\!-\!O\!-\!(CH_2)_2\!-\!S\!-\!S\!-$
$\quad(CH_2)_2\!-\!O\!-\!(CH_2)_2\!-\!O\!-\!(CH_2)_2\!-\!V^1\!-\!\}_zB$ (10i)

Aspect 6A. A polythioether prepolymer comprising a moiety of Formula (2):

$-S\!-\!R^1\!-\![S\text{-A-}S\!-\!R^1\!-\!]_s\!-\!S\!-$ (2)

wherein,
s is an integer from 1 to 60;
each $R^1$ is independently selected from $C_{2-10}$ alkanediyl, $C_{6-8}$ cycloalkanediyl, $C_{6-10}$ alkanecycloalkanediyl, and $-[(-CHR-)_p-X-]_q-(CHR)_r-$, wherein each R is independently selected from hydrogen and methyl, wherein,
each X is independently selected from —O— and —S—;
each p is independently an integer from 2 to 6;
q is an integer from 1 to 5; and
r is an integer from 2 to 10;
each A is independently selected from a sulfur-containing moiety of Formula (3a), a moiety of Formula (4a), and a moiety derived from an alkenyl-terminated polyfunctionalizing agent, wherein from 10 mol % to 90 mol % of the A moieties comprise a sulfur-containing moiety of Formula (3a):

$-(CH_2)_2\!-\!O\!-\!(CH_2)\!-\!Y^1\!-\!R^4\!-\!Y^1\!-\!(CH_2)_n\!-$
$\quad O\!-\!(CH_2)_2\!-$ (3a)

$-(CH_2)_2\!-\!O\!-\!(R^2\!-\!O)_m\!-\!(CH_2)_2\!-$ (4a)

wherein,
each n is independently an integer from 1 to 4;
each $Y^1$ is independently selected from —O— and —S—;
m is an integer from 0 to 50; and
each $R^2$ is independently selected from $C_{2-6}$ n-alkanediyl, $C_{3-6}$ branched alkanediyl, $C_{6-8}$ cycloalkanediyl, $C_{6-10}$ alkanecycloalkanediyl, and $-[(CH_2)_p-X-]_q-(CH_2)_r-$, wherein,
each p is independently an integer from 2 to 6;
q is an integer from 1 to 5; and
r is an integer from 2 to 10;
$R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and $-[(CH_2)_p-X-]_q-(CH_2)_r-$, wherein,
each X is independently selected from —O—, —S—, and —S—S—;
each p is an integer from 2 to 6;
q is an integer from 1 to 5; and
r is an integer from 2 to 10; and
at least one $Y^1$ is —S—, or $R^4$ is $-[(CH_2)_p-X-]_q-(CH_2)_r-$ and at least one X is selected from —S— and —S—S—,
wherein mol % is based on the total moles of A moieties in the prepolymer.

Aspect 7A. The polythioether prepolymer of aspect 6A, wherein each A is further selected from a moiety derived from a polyalkenyl polyfunctionalizing agent, wherein the moiety has the structure of Formula (1a):

$B\{-V^1-\}_2\{-V^1-S-[R^1-S\text{-A-}S-]_u-R^1-$
$\quad SH\}_{z-2}$ (1a)

wherein,
B is a core of a z-valent polyfunctionalizing agent B(—V)$_z$, wherein:
z is an integer from 3 to 6; and
each V is a moiety comprising a terminal group reactive with terminal thiol groups; and
each —$V^1$— is independently derived from the reaction of —V with a thiol group.

Aspect 8A. The polythioether prepolymer of any one of aspects 6A to 7A, wherein, from 20 mol % to 60 mol % of the A moieties comprise a sulfur-containing moiety of Formula (3a); and from 40 mol % to 80 mol % of the A moieties comprise a moiety of Formula (4a).

Aspect 9A. The polythioether prepolymer of any one of aspects 6A to 8A, wherein the polythioether prepolymer comprises a difunctional polythioether prepolymer of Formula (2a):

$R^6\!-\!S\!-\!R^1\!-\![S\text{-A-}S\!-\!R^1\!-\!]_s\!-\!S\!-\!R^6$ (2a)

wherein each $R^6$ is selected from hydrogen and a moiety comprising a terminal functional group.

Aspect 10A. The polythioether prepolymer of aspect 9A, wherein each $R^6$ is selected from hydrogen and a moiety comprising a terminal functional group, wherein the terminal functional group is selected from a thiol, hydroxyl, isocyanate, alkenyl, epoxy, polyalkoxysilyl, amino, and a Michael acceptor.

Aspect 11A. The polythioether prepolymer of any one of aspects 6A to 10A, wherein the polythioether prepolymer comprises a thiol-terminated polythioether prepolymer of Formula (2c), a thiol-terminated polythioether prepolymer of Formula (2d), or a combination thereof:

$HS\!-\!R^1\!-\![S\text{-A-}S\!-\!R^1\!-\!]_s\!-\!SH$ (2c)

$\{HS\!-\!R^1\!-\![S\text{-A-}S\!-\!R^1\!-\!]_s\!-\!S\!-\!V^1\!-\!\}_zB$ (2d)

wherein,
B comprises a core of a z-valent polyfunctionalizing agent B(—V)$_z$ wherein:
z is an integer from 3 to 6; and
each V is a moiety comprising a terminal group reactive with terminal thiol groups; and
each —$V^1$— is derived from the reaction of —V with a thiol group.

Aspect 12A. The polythioether prepolymer of any one of aspects 6A to 11A, wherein the polythioether prepolymer exhibits an onset of solidification at a temperature less than 60° F. (15.5° C.).

Aspect 13A. A polythioether prepolymer comprising reaction products of reactants comprising:
(a) a polythiol comprising a dithiol of Formula (7):

$HS\!-\!R^1\!-\!SH$ (7)

wherein,
$R^1$ is selected from $C_{2-10}$ alkanediyl, $C_{6-8}$ cycloalkanediyl, $C_{6-10}$ alkanecycloalkanediyl, $C_{5-8}$ heterocycloalkanediyl, and $-[(-CHR-)_p-X-]_q-(-CHR-)_r-$, wherein:
each p is independently an integer from 2 to 6;
q is an integer from 1 to 5;
r is an integer from 2 to 10;

each R is independently selected from hydrogen and methyl; and
each X is independently selected from —O— and —S—;
(b) a sulfur-containing bis(alkenyl) ether of Formula (3):

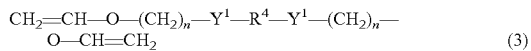     (3)

wherein,
each n is independently an integer from 1 to 4;
each $Y^1$ is independently selected from —O— and —S—; and
$R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and —[(CH$_2$)$_p$—X—]$_q$—(CH$_2$)$_r$—, wherein,
each X is independently selected from —O—, —S—, and —S—S—;
each p is independently an integer from 2 to 6;
q is an integer from 1 to 5;
r is an integer from 2 to 10; and
at least one $Y^1$ is —S—, or $R^4$ is —[(CH$_2$)$_p$—X—]$_q$—(CH$_2$)$_r$— and at least one X is selected from —S— and —S—S—; and
(c) a divinyl ether of Formula (4):

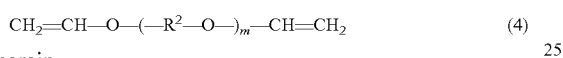     (4)

wherein,
m is an integer from 0 to 50; and
each $R^2$ is independently selected from $C_{2-6}$ n-alkanediyl, $C_{3-6}$ branched alkanediyl, $C_{6-8}$ cycloalkanediyl, $C_{6-10}$ alkanecycloalkanediyl, and —[(CH$_2$)$_p$—X—]$_q$—(CH$_2$)$_r$—, wherein,
each p is independently an integer from 2 to 6;
q is an integer from 1 to 5; and
r is an integer from 2 to 10;
wherein the reactants comprise from 10 mol % to 90 mol % of the sulfur-containing bis(alkenyl) ether of Formula (3), wherein mol % is based on the total moles of the sulfur-containing bis(alkenyl) ether of Formula (3) and the divinyl ether of Formula (4).

Aspect 14A. The polythioether prepolymer of aspect 13A, wherein the reactants further comprise:
(d) a polyfunctionalizing agent of Formula (1):

B(—V)$_z$     (1)

wherein,
B is a core of a z-valent polyfunctionalizing agent B(—V)$_z$;
z is an integer from 3 to 6; and
each —V is independently a moiety comprising a terminal thiol group, a terminal alkenyl group, or a combination thereof.

Aspect 15A. The polythioether prepolymer of any one of aspects 13A to 14A, wherein the reactants further comprise a sulfur-containing multifunctional(alkenyl) ether of Formula (10):

     (10)

wherein,
each n is independently an integer from 1 to 4;
each $Y^1$ is independently selected from —O— and —S—; and
each $R^4$ is independently selected from $C_{2-6}$ n-alkanediyl, $C_{3-6}$ branched alkanediyl, $C_{6-8}$ cycloalkanediyl, $C_{6-10}$ alkanecycloalkanediyl, and —[(CH$_2$)$_p$—X—]$_q$—(CH$_2$)$_r$—, wherein,
each X is independently selected from —O—, —S—, and —S—S—;
each p is independently an integer from 2 to 6;
q is an integer from 1 to 5;
r is an integer from 2 to 10;
at least one $Y^1$ is —S—, or $R^4$ is —[(CH$_2$)$_p$—X—]$_q$—(CH$_2$)$_r$— and at least one X is selected from —S— and —S—S—;
B comprises a core of a z-valent polyfunctionalizing agent B(—V)$_z$ wherein:
z is an integer from 3 to 6; and
each V is a moiety comprising a terminal group reactive with a terminal alkenyl group; and
each —$V^1$— is derived from the reaction of —V with an alkenyl group;

Aspect 16A. The polythioether prepolymer of any one of aspects 13A to 15A, wherein the polythioether prepolymer exhibits an onset of solidification at a temperature less than 60° F. (15.5° C.).

Aspect 17A. A composition comprising the sulfur-containing multifunctional(alkenyl) ether of any one of aspects 1A to 5A.

Aspect 18A. The composition of aspect 16A, further comprising a sulfur-containing bis(alkenyl) ether of Formula (3):

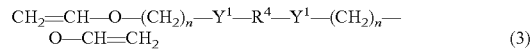     (3)

wherein,
each n is independently an integer from 1 to 4;
each $Y^1$ is independently selected from —O— and —S—; and
$R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and —[(CH$_2$)$_p$—X—]$_q$—(CH$_2$)$_r$—, wherein,
each X is independently selected from —O—, —S—, and —S—S—;
each p is independently an integer from 2 to 6;
q is an integer from 1 to 5; and
r is an integer from 2 to 10; and
at least one $Y^1$ is —S—, or $R^4$ is —[(CH$_2$)$_p$—X—]$_q$—(CH$_2$)$_r$— and at least one X is selected from —S— and —S—S—.

Aspect 19A. The composition of any one of aspects 17A to 18A, further comprising a sulfur-containing bis(alkenyl) ether of Formula (4):

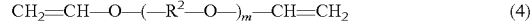     (4)

wherein,
m is an integer from 0 to 50; and
each $R^2$ is independently selected from $C_{2-6}$ n-alkanediyl, $C_{3-6}$ branched alkanediyl, $C_{6-8}$ cycloalkanediyl, $C_{6-10}$ alkanecycloalkanediyl, and —[(CH$_2$)$_p$—X—]$_q$—(CH$_2$)$_r$—, wherein,
each p is independently an integer from 2 to 6;
q is an integer from 1 to 5; and
r is an integer from 2 to 10.

Aspect 20A. The composition of any one of aspects 17A to 19A, further comprising a thiol-terminated sulfur-containing prepolymer.

Aspect 21A. A part sealed with the composition of any one of aspects 17A to 20A.

Aspect 22A. A vehicle, wherein a surface of a vehicle is sealed with the composition of any one of aspects 17A to 20A.

Aspect 23A. A method of sealing a part, comprising applying the composition of any one of aspects 17A to 20A to a part; and curing the applied composition to seal the part.

Aspect 24A. The method of aspect 23A, wherein the part comprises a surface of a vehicle.

Aspect 24A. A composition comprising the polythioether prepolymer of any one of aspects 6A to 11A.

Aspect 25A. A part sealed with the composition of aspect 25A.

Aspect 27A. A vehicle, wherein a surface of the vehicle is sealed with the composition of aspect 25A.

Aspect 28A. A method of sealing a part, comprising: applying the composition of aspect 25A to a part; and curing the applied composition to seal the part.

Aspect 29A. The method of aspect 28A, wherein the part comprises a surface of a vehicle.

Aspect 30A. A composition comprising the polythioether prepolymer of any one of aspects 13A to 15A.

Aspect 31A. A part sealed with the composition of aspect 30A.

Aspect 32A. A vehicle, wherein a surface of the vehicle is sealed with the composition of aspect 30A.

Aspect 33A. A method of sealing a part, comprising applying the composition of aspect 30A to a part; and curing the applied composition to seal the part.

Aspect 34A. The method of aspect 33A, wherein the part comprises a surface of a vehicle.

EXAMPLES

Embodiments provided by the present disclosure are further illustrated by reference to the following examples, which describe the synthesis, properties, and uses of certain sulfur-containing poly(alkenyl) ethers; polythioether prepolymers incorporating sulfur-containing poly(alkenyl) ethers in the prepolymer backbone, and compositions comprising sulfur-containing poly(alkenyl) ether-containing polythioether prepolymers and/or a sulfur-containing poly (alkenyl) ether. It will be apparent to those skilled in the art that many modifications, both to materials, and methods, may be practiced without departing from the scope of the disclosure.

Example 1

Synthesis of Sulfur-Containing Bis(Alkenyl) Ether 1,8-Dimercapto-3,6-dioxaoctane (DMDO) (91.35 g) was added dropwise to a solution of potassium hydroxide (56.11 g) in ethanol (400 mL) at room temperature. The mixture was stirred for 2 h. 2-Chloroethyl vinyl ether (107.52 g) was added dropwise to the mixture. The temperature was then raised to 80° C. After 3 h, the mixture was cooled to room temperature (21° C. to 25° C.) and filtered through Celite® and washed with ethanol. The filtrate was concentrated under reduced pressure on a rotary evaporator to yield a colorless liquid; yield 160 g.

Example 2

Synthesis of Sulfur-Containing Bis(Alkenyl) Ether-Containing Polythioether Prepolymer DMDO (167.47 g) and triallyl cyanurate (TAC) (4.75 g, 0.019 mol) were charged into a flask and heated to 60° C. A mixture of the sulfur-containing bis(alkenyl) ether of Example 1 (50.00 g, 0.164 mol) and diethylene glycol divinyl ether (DEG-DVE) (100.00 g, 0.633 mol) was added and a Vazo®-67 (0.16 g) catalyst was added drop-wise. The temperature was raised to 70° C. and the mixture stirred for several hours until the mercaptan equivalent stopped increasing and no allyl peaks were observed in the Fourier transform infrared (FTIR) spectrum at ~1,618 cm$^{-1}$ and 1,636 cm$^{-1}$. The mixture was stirred at 95° C. for 2 h and then evacuated at a pressure less than 10 torr (1.3 kPa) at a temperature of 85° C. to 90° C. The resulting polythioether had a mercaptan equivalent weight of 1,632, viscosity=72.5 poise (7.25 Pa-sec) (determined using a BrookField Cap 2000 Viscometer, spindle #6, 25° C., 300 rpm), yield 310 g.

Example 3

Curing of Polythioether Prepolymer

An accelerator composition was prepared by mixing the components listed in Table 1 and the mixture was kept at room temperature for 24 h before mixing with the polythioether prepolymer.

TABLE 1

| Accelerator composition. | |
|---|---|
| Component | Weight, g |
| Adhesion Promoter* | 5.7 |
| Calcium carbonate | 50.4 |
| Plasticizer | 40 |
| Carbon black | 24 |
| Epoxy Resin, DEN ® 431 | 50 |
| Epoxy Resin, Epon ® 828 | 50 |

*Adhesion promoter, as T-1601, is available from PRC-Desoto International, Inc.

The polythioether prepolymer of Example 2 (72.22 g) was mixed with the accelerator composition described in Table 1 (18.00 g) using a mixer (Hauschild Speed Mixer, 2800 rpm, 30 s). An amine catalyst, DABCO® 33-LV (0.72 g), was charged and combined using the mixer. The mixture was poured into a curing pan and the curing pan placed in a controlled temperature and humidity chamber (25° C., 50RH %). The curing status with time was monitored and the results are shown in FIG. 1.

The curing status was classified as follows: (1) as mixed; (2) slightly more viscous than initial viscosity; (3) significantly more viscous than initial viscosity; (4) workable but beginning to gel; (5) gelled and not workable; (6) beginning to harden; (7) almost tack-free cure; (8) tack-free; (9) 20 Shore A hardness; and (1) 35 Shore A hardness. The hardness was determined using a Type A durometer in accordance with ASTM D-2240. The tack-free time was determined by the time at which a cotton ball does not adhere to the surface.

Figure 2:
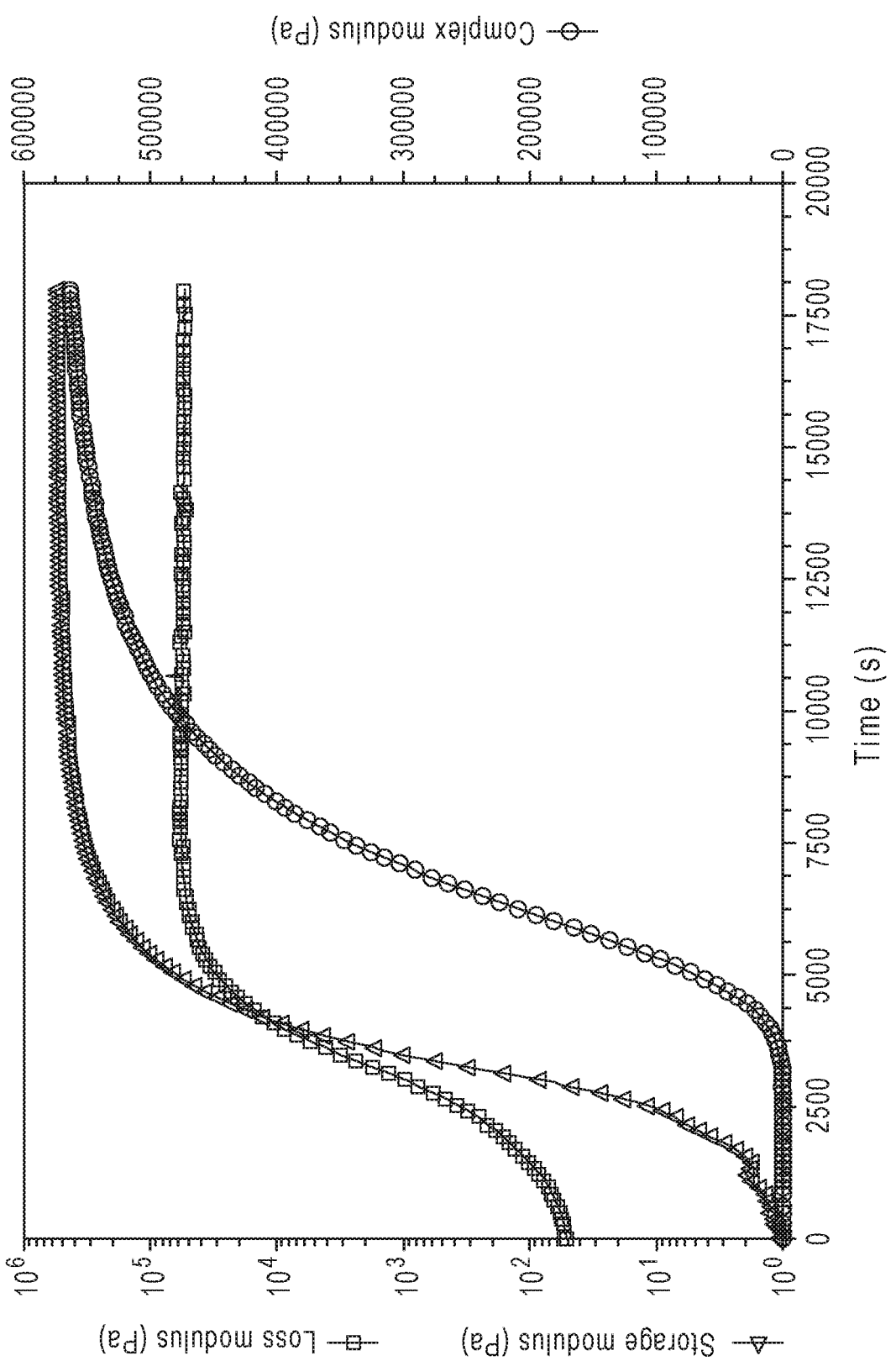
FIG. 2 shows the storage modulus, the loss modulus and the complex modulus of a composition comprising a sulfur-containing bis(alkenyl) ether-containing polythioether prepolymer provided by the present disclosure during cure.

The curing progress of the sealant of Example 3 was also monitored using a rheometer. FIG. 2 shows the storage modulus, the loss modulus and the complex modulus of a composition comprising a sulfur-containing bis(alkenyl) ether-containing polythioether prepolymer provided by the present disclosure during cure.

Example 4

Physical Properties of Cured Sealant

The curable composition of Example 3 was poured into a mold to a thickness about ⅛ inch. The composition was left at room temperature for 2 days and then placed in a 140° F. (60° C.) oven for 1 day to fully cure. Specimens were cut using a Die C as specified in ASTM D-412. Tensile and % elongation measurements were conducted at standard conditions in accordance with ASTM D-412. The cured composition exhibited a tensile strength of 240±19 psi (1.65±0.13 MPa) and a % elongation of 277±25%.

Example 5

Solidification at Low Temperature

Thiol-terminated polythioethers were prepared according to the method described in Example 2. The thiol-terminated polythioether were prepared with different mol % of a sulfur-containing bis(alkenyl) ether. The sulfur-containing bis(alkenyl) ether was prepared as described in Example 1. Diethylene glycol divinyl ether was used as the divinyl ether (without sulfur atoms). Polythioether Prepolymer (1) contained a thiol-terminated polythioether prepolymer without a sulfur-containing bis(alkenyl) ether made according to Example 1 of U.S. Pat. No. 6,172,179; Polythioether Prepolymer (2) contained 20 mol % of the sulfur-containing bis(alkenyl) ether of Example 1; and Polythioether Prepolymer (3) contained 50 mol % of the sulfur-containing bis(alkenyl) ether of Example 1.

The polythioether prepolymers were poured into a cup and cooled to either 23° F. or 45° F. (−5° C. or 7.2° C.). The time for the polythioether prepolymers to solidify was determined by mechanically probing and visually inspecting the samples. Polythioether Prepolymer (1) solidified within less 2 hours at 23° F. (−5° C.) and at 45° F. (7.2° C.) began to solidify at 6 hours. Polythioether Prepolymers (2) and (3) remained liquid at 2 hours at 23° F. (−5° C.) or at 6 hours at 45° F. (7.2° C.).

These results demonstrate that the polythioether prepolymers have a reduced tendency to become solid at low temperatures.

These results suggest that polythioether prepolymers incorporating sulfur-containing bis(alkenyl) ethers in the polythioether backbone have a lower glass transition temperature $T_g$ than similar polythioether prepolymers prepared using only divinyl ethers without sulfur atoms.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled to their full scope and equivalents thereof.

What is claimed is:

1. A polythioether prepolymer comprising a moiety of Formula (2):

$$—S—R^1—[S-A-S—R^1—]_s—S— \quad (2)$$

wherein,
  s is an integer from 1 to 60;
  each $R^1$ is independently selected from $C_{2-10}$ alkanediyl, $C_{6-8}$ cycloalkanediyl, $C_{6-10}$ alkanecycloalkanediyl, and $—[(—CHR—)_p—X—]_q—(CHR)_r—$, wherein each R is independently selected from hydrogen and methyl, wherein,
    each X is independently selected from —O— and —S—;
    each p is an integer from 2 to 6;
    q is an integer from 1 to 5; and
    r is an integer from 2 to 10;
  each A is independently selected from a sulfur-containing moiety of Formula (3a), a moiety of Formula (4a), and a moiety derived from an alkenyl-terminated polyfunctionalizing agent, wherein from 10 mol % to 90 mol % of the A moieties comprise a sulfur-containing moiety of Formula (3a):

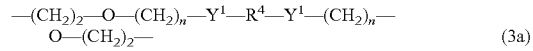

$$—(CH_2)_2—O—(CH_2)_n—Y^1—R^4—Y^1—(CH_2)_n— O—(CH_2)_2— \quad (3a)$$

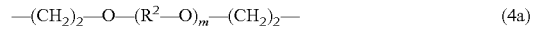

$$—(CH_2)_2—O—(R^2—O)_m—(CH_2)_2— \quad (4a)$$

wherein,
  each n is independently an integer from 1 to 4;
  each $Y^1$ is independently selected from —O— and —S—;
  m is an integer from 0 to 50; and
  each $R^2$ is independently selected from $C_{2-6}$ n-alkanediyl, $C_{3-6}$ branched alkanediyl, $C_{6-8}$ cycloalkanediyl, $C_{6-10}$ alkanecycloalkanediyl, and $—[(CH_2)_p—X—]_q—(CH_2)_r—$, wherein,
    each p is independently an integer from 2 to 6;
    q is an integer from 1 to 5; and
    r is an integer from 2 to 10;
  $R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and $—[(CH_2)_p—X—]_q—(CH_2)_r—$, wherein,
    each X is independently selected from —O—, —S—, and —S—S—;
    each p is an integer from 2 to 6;
    q is an integer from 1 to 5; and
    r is an integer from 2 to 10; and
  at least one $Y^1$ is —S—, or $R^4$ is $—[(CH_2)_p—X—]_q—(CH_2)_r—$ and at least one X is selected from —S— and —S—S—,
wherein mol % is based on the total moles of A moieties in the prepolymer.

2. The polythioether prepolymer of claim 1, wherein each A is further independently selected from a moiety derived from a polyalkenyl polyfunctionalizing agent, wherein the moiety has the structure of Formula (1a):

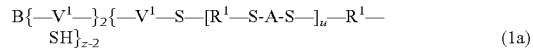

$$B\{—V^1—\}_2\{—V^1—S—[R^1—S-A-S—]_u—R^1—SH\}_{z-2} \quad (1a)$$

wherein,
  B is a core of a z-valent polyfunctionalizing agent $B(—V)_z$, wherein:
    z is an integer from 3 to 6; and
    each V is a moiety comprising a terminal group reactive with terminal thiol groups; and
    each $—V^1—$ is derived from the reaction of —V with a thiol group.

3. The polythioether prepolymer of claim 1, wherein, from 20 mol % to 60 mol % of the A moieties comprise a sulfur-containing moiety of Formula (3a); and from 40 mol % to 80 mol % of the A moieties comprise a moiety of Formula (4a).

4. The polythioether prepolymer of claim 1, wherein the polythioether prepolymer comprises a difunctional polythioether prepolymer of Formula (2a):

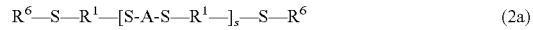

$$R^6—S—R^1—[S-A-S—R^1—]_s—S—R^6 \quad (2a)$$

wherein each $R^6$ is selected from hydrogen and a moiety comprising a terminal functional group.

5. The polythioether prepolymer of claim 4, wherein each $R^6$ is selected from hydrogen and a moiety comprising a terminal functional group, wherein the terminal functional group is selected from a thiol, hydroxyl, isocyanate, alkenyl, epoxy, polyalkoxysilyl, amino, and a Michael acceptor.

6. The polythioether prepolymer of claim 1, wherein the polythioether prepolymer comprises a thiol-terminated polythioether prepolymer of Formula (2c), a thiol-terminated polythioether prepolymer of Formula (2d), or a combination thereof:

$$HS—R^1—[S-A-S—R^1]_s—SH \quad (2c)$$

$$\{HS—R^1—[S-A-S—R^1—]_s—S—V^1—\}_zB \quad (2d)$$

wherein,
B comprises a core of a z-valent polyfunctionalizing agent $B(—V)_z$ wherein:
z is an integer from 3 to 6; and
each V is a moiety comprising a terminal group reactive with terminal thiol groups; and
each $—V^1—$ is derived from the reaction of —V with a thiol group.

7. The polythioether prepolymer of claim 1, wherein the polythioether prepolymer exhibits an onset of solidification at a temperature less than 60° F. (15.5° C.).

8. A polythioether prepolymer comprising reaction products of reactants comprising:
(a) a polythiol comprising a dithiol of Formula (7):

$$HS—R^1—SH \quad (7)$$

wherein,
$R^1$ is selected from $C_{2-10}$ alkanediyl, $C_{6-8}$ cycloalkanediyl, $C_{6-10}$ alkanecycloalkanediyl, $C_{5-8}$ heterocycloalkanediyl, and
$—[—CHR—)_p—X—]_q—(—CHR—)_r—$, wherein:
each p is independently an integer from 2 to 6;
q is an integer from 1 to 5;
r is an integer from 2 to 10;
each R is independently selected from hydrogen and methyl; and
each X is independently selected from —O— and —S—; and
(b) a sulfur-containing bis(alkenyl) ether of Formula (3):

$$CH_2=CH—O—(CH_2)_n—Y^1—R^4—Y^1—(CH_2)_n—O—CH=CH_2 \quad (3)$$

wherein,
each n is independently an integer from 1 to 4;
each $Y^1$ is independently selected from —O— and —S—; and
$R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and $—[(CH_2)_p—X—]_q—(CH_2)_r—$,
wherein,
each X is independently selected from —O—, —S—, and —S—S—;
each p is independently an integer from 2 to 6;
q is an integer from 1 to 5;
r is an integer from 2 to 10; and
at least one $Y^1$ is —S—, or $R^4$ is $—[(CH_2)_p—X—]_q—(CH_2)_r—$ and at least one X is selected from —S— and —S—S—; and
(c) a divinyl ether of Formula (4):

$$CH_2=CH—O—(—R^2—O—)_m—CH=CH_2 \quad (4)$$

wherein,
m is an integer from 0 to 50; and
each $R^2$ is independently selected from $C_{2-6}$ n-alkanediyl, $C_{3-6}$ branched alkanediyl, $C_{6-8}$ cycloalkanediyl, $C_{6-10}$ alkanecycloalkanediyl, and $—[(CH_2)_p—X—]_q—(CH_2)_r—$, wherein,
each p is independently an integer from 2 to 6;
q is an integer from 1 to 5; and
r is an integer from 2 to 10;

wherein the reactants comprise from 10 mol % to 90 mol % of the sulfur-containing bis(alkenyl) ether of Formula (3), wherein mol % is based on the total moles of the sulfur-containing bis(alkenyl) ether of Formula (3) and the divinyl ether of Formula (4).

9. The polythioether prepolymer of claim 8, wherein the reactants further comprise: (d) a polyfunctionalizing agent of Formula (1):

$$B(—V)_z \quad (1)$$

wherein,
B is a core of a z-valent polyfunctionalizing agent $B(—V)_z$;
z is an integer from 3 to 6; and
each —V is independently a moiety comprising a terminal thiol group, a terminal alkenyl group, or a combination thereof.

10. The polythioether prepolymer of claim 8, wherein the reactants further comprise a sulfur-containing multifunctional(alkenyl) ether of Formula (10):

$$\{CH_2=CH—O—(CH_2)_n—Y^1—R^4—Y^1—(CH_2)_n—O—(CH_2)_2—V^1—\}_zB \quad (10)$$

wherein,
each n is independently an integer from 1 to 4;
each $Y^1$ is independently selected from —O— and —S—; and
each $R^4$ is independently selected from $C_{2-6}$ n-alkanediyl, $C_{3-6}$ branched alkanediyl, $C_{6-8}$ cycloalkanediyl, $C_{6-10}$ alkanecycloalkanediyl, and $[(CH_2)_p—X—]_q—(CH_2)_r—$, wherein,
each X is independently selected from —O—, —S—, and —S—S—;
each p is independently an integer from 2 to 6;
q is an integer from 1 to 5;
r is an integer from 2 to 10;
at least one $Y^1$ is —S—, or $R^4$ is $—[(CH_2)_p—X—]_q—(CH_2)_r—$ and at least one X is selected from —S— and —S—S—;
B comprises a core of a z-valent polyfunctionalizing agent $B(—V)_z$
wherein:
z is an integer from 3 to 6; and
each V is a moiety comprising a terminal group reactive with a terminal alkenyl group; and
each $—V^1—$ is derived from the reaction of —V with an alkenyl group.

11. The polythioether prepolymer of claim 8, wherein the polythioether prepolymer exhibits an onset of solidification at a temperature less than 60° F. (15.5° C.).

12. A composition comprising the polythioether prepolymer of claim 1 and a curing agent.

13. A part sealed with the composition of claim 12.

14. A vehicle, wherein a surface of the vehicle is sealed with the composition of claim 12.

15. A method of sealing a part, comprising:
applying the composition of claim 12 to a part; and
curing the applied composition to seal the part.

16. The method of claim 15, wherein the part comprises a surface of a vehicle.

17. A composition comprising the polythioether prepolymer of claim 8 and a curing agent.

18. A part sealed with the composition of claim 17.

19. A vehicle, wherein a surface of a vehicle is sealed with the composition of claim 17.

20. A method of sealing a part, comprising:
applying the composition of claim 17 to a part; and
curing the applied composition to seal the part.

21. The method of claim 20, wherein the part comprises a surface of a vehicle.

\* \* \* \* \*